(12) United States Patent
Kerr et al.

(10) Patent No.: US 12,192,183 B1
(45) Date of Patent: *Jan. 7, 2025

(54) NETWORK BASED HYPERLOCAL AUTHENTICATION WITH A GATEWAY COMPONENT

(71) Applicant: NEXRF CORP., Reno, NV (US)

(72) Inventors: Michael A. Kerr, Reno, NV (US); Jesus P. Espinoza, San Antonio, TX (US)

(73) Assignee: NEXRF CORP., Reno, NV (US)

( * ) Notice: Subject to any disclaimer, the term of this patent is extended or adjusted under 35 U.S.C. 154(b) by 877 days.

This patent is subject to a terminal disclaimer.

(21) Appl. No.: 17/239,520

(22) Filed: Apr. 23, 2021

Related U.S. Application Data

(60) Provisional application No. 63/014,663, filed on Apr. 23, 2020, provisional application No. 63/014,661, (Continued)

(51) Int. Cl.
*H04L 29/06* (2006.01)
*H04L 9/40* (2022.01)
*H04L 12/66* (2006.01)

(52) U.S. Cl.
CPC .......... *H04L 63/0442* (2013.01); *H04L 12/66* (2013.01); *H04L 63/083* (2013.01); *H04L 63/18* (2013.01)

(58) Field of Classification Search
CPC ............... H04L 63/145; H04L 63/0421; H04L 63/0876; H04L 63/1416; H04L 63/20;
(Continued)

(56) References Cited

U.S. PATENT DOCUMENTS 5,761,647 A 6/1998 Boushy
5,768,382 A 6/1998 Schneier et al.
(Continued)

OTHER PUBLICATIONS

GIOBBI/Proxsense, Co-pending U.S. Appl. No. 60/865,596, filed Nov. 13, 2006, p. 3.
(Continued)

*Primary Examiner* — William A Corum, Jr.
(74) *Attorney, Agent, or Firm* — Kerr IP Group, LLC

(57) ABSTRACT

A system and method that authenticates and secures communications between a wireless client device and a remote network component. The system includes a gateway component that establishes a secure communications channel with the remote network component. A client device application, corresponding to the wireless client device, receives local authentication credentials from the gateway component. The client device application uses the local authentication credentials to authenticate to the remote network component. The client device application then requests an exclusive local key from the remote network component, which transmits the exclusive local key to the gateway component, which then transmits the exclusive local key to the client device application. The client device application, having the exclusive local key, requests and receives cryptographic material from the remote network component. The client device application secures communications to the remote network component with a shared secret that includes the exclusive local key received from the gateway component and the cryptographic material received from the network component.

20 Claims, 78 Drawing Sheets

Related U.S. Application Data filed on Apr. 23, 2020, provisional application No. 63/014,662, filed on Apr. 23, 2020, provisional application No. 63/014,664, filed on Apr. 23, 2020.

(58) Field of Classification Search
CPC ..... H04L 65/102; H04L 67/55; H04L 63/061; H04L 63/107; H04L 65/1033; H04L 65/1069; H04W 12/47

See application file for complete search history.

(56) References Cited

U.S. PATENT DOCUMENTS

| | | | |
|---|---|---|---|
| 5,851,149 A | 12/1998 | Xidos et al. | |
| 6,001,016 A | 12/1999 | Walker et al. | |
| 6,230,205 B1 | 5/2001 | Garrity et al. | |
| 6,508,709 B1 | 1/2003 | Karmarkar | |
| 6,640,218 B1 | 10/2003 | Golding et al. | |
| 6,709,333 B1 | 3/2004 | Bradford et al. | |
| 6,719,631 B1 | 4/2004 | Tulley et al. | |
| 6,751,732 B2 | 6/2004 | Strobel et al. | |
| 6,875,110 B1 | 4/2005 | Crumby | |
| 7,830,250 B2 | 11/2010 | Huseth et al. | |
| 8,509,442 B2 | 8/2013 | Gavette | |
| 8,738,024 B1 | 5/2014 | Kerr et al. | |
| 9,680,827 B2 * | 6/2017 | Ronca | H04L 63/062 |
| 2001/0044337 A1 | 11/2001 | Rowe et al. | |
| 2002/0142844 A1 | 10/2002 | Kerr | |
| 2002/0142846 A1 | 10/2002 | Paulsen | |
| 2002/0198775 A1 | 12/2002 | Ryan | |
| 2003/0036425 A1 | 2/2003 | Kaminkow et al. | |
| 2004/0023721 A1 | 2/2004 | Giobbi | |
| 2004/0255137 A1 | 12/2004 | Ying | |
| 2005/0076210 A1 | 4/2005 | Thomas et al. | |
| 2005/0085257 A1 | 4/2005 | Laird et al. | |
| 2005/0152305 A1 | 7/2005 | Ji et al. | |
| 2005/0215233 A1 | 9/2005 | Perera et al. | |
| 2005/0226423 A1 * | 10/2005 | Li | H04L 63/08 380/278 |
| 2005/0261063 A1 | 11/2005 | Boyd et al. | |
| 2006/0125693 A1 | 6/2006 | Recker | |
| 2006/0136742 A1 | 6/2006 | Giobbi | |
| 2006/0189382 A1 | 8/2006 | Muir et al. | |
| 2006/0194633 A1 | 8/2006 | Paulsen | |
| 2006/0252530 A1 | 11/2006 | Oberberger et al. | |
| 2006/0287810 A1 | 12/2006 | Sadri et al. | |
| 2006/0287813 A1 | 12/2006 | Quigley | |
| 2007/0060306 A1 | 3/2007 | Amaitis et al. | |
| 2007/0077981 A1 | 4/2007 | Hungate et al. | |
| 2007/0100963 A1 | 5/2007 | Ban et al. | |
| 2007/0136132 A1 | 6/2007 | Weiser et al. | |
| 2007/0167210 A1 | 7/2007 | Kelly et al. | |
| 2007/0281692 A1 | 12/2007 | Bucher et al. | |
| 2007/0286369 A1 | 12/2007 | Gutt et al. | |
| 2008/0057894 A1 | 3/2008 | Aleksic et al. | |
| 2008/0064492 A1 | 3/2008 | Oosthoek | |
| 2008/0113785 A1 | 5/2008 | Alderucci et al. | |
| 2008/0153515 A1 | 6/2008 | Mock et al. | |
| 2008/0207296 A1 | 8/2008 | Lutnick et al. | |
| 2008/0249833 A1 | 10/2008 | Ali et al. | |
| 2009/0070859 A1 | 3/2009 | Mathur et al. | |
| 2009/0170614 A1 | 7/2009 | Herrmann et al. | |
| 2009/0197684 A1 | 8/2009 | Arezina et al. | |
| 2009/0254824 A1 | 10/2009 | Singh | |
| 2010/0022308 A1 | 1/2010 | Hartmann et al. | |
| 2010/0048242 A1 | 2/2010 | Rhoads et al. | |
| 2010/0211431 A1 | 8/2010 | Lutnick et al. | |
| 2010/0250939 A1 | 9/2010 | Adams et al. | |
| 2011/0078167 A1 | 3/2011 | Sundaresan et al. | |
| 2013/0104204 A1 | 4/2013 | Henry et al. | |
| 2014/0295944 A1 | 10/2014 | Faircloth | |
| 2014/0310513 A1 | 10/2014 | Barney et al. | |
| 2015/0134949 A1 | 5/2015 | Baldwin | |
| 2017/0178157 A1 | 6/2017 | Jayaram | |
| 2017/0186270 A1 | 6/2017 | Acres | |
| 2017/0317981 A1 | 11/2017 | Klein | |
| 2020/0162447 A1 * | 5/2020 | Fletcher | H04L 63/107 |
| 2020/0344847 A1 * | 10/2020 | Nardini | H04W 84/18 |
| 2022/0109663 A1 * | 4/2022 | Swain | H04L 69/24 |

OTHER PUBLICATIONS

Advanced Encryption Standard (AES), Federal Information Processing Standards (FIPS) Publication 197, Nov. 6, 2001, 52 pages.

Chen et al., "SSL/TLS-based Secure Tunnel Gateway System Design and Implementation," International Workshop on Anti-Counterfeiting, Security and Identification, Oct. 5, 2023, 5 pages.

* cited by examiner

* Blockchain transaction record

| 2920 | Attribute | Tracking |
|---|---|---|
| | $T_1$ | Residence time |
| | $T_2$ | Number of associates |
| | $T_3$ | Number of visits |
| | $T_4$ | Indoor location (geofence) |
| | $T_5$ | Device(s) ID(s) |
| | $T_6$ | Number of devices |

| 2922 | Attribute | Demographics |
|---|---|---|
| | $D_1$ | Gender |
| | $D_2$ | Age Group (Under 21, 21+) |
| | $D_3$ | Relationship (Accompanied, Single) |
| | $D_4$ | Children (Yes, No) |
| | $D_5$ | Net worth (Average, Above Average, Very High) |

| 2924 | Attribute | Lifestyle |
|---|---|---|
| | $L_1$ | Activity level (Sedentary, Moderate, Active) |
| | $L_2$ | Exercise (Walking distance, Pace) |
| | $L_3$ | Diet (Types of Cuisine) |

| 2926 | Attribute | Social |
|---|---|---|
| | $S_1$ | Crowd level (Light, Moderate, Heavy) |
| | $S_2$ | Location cost (Average, Expensive, Very Expensive) |
| | $S_3$ | Exclusive services (Yes, No) |

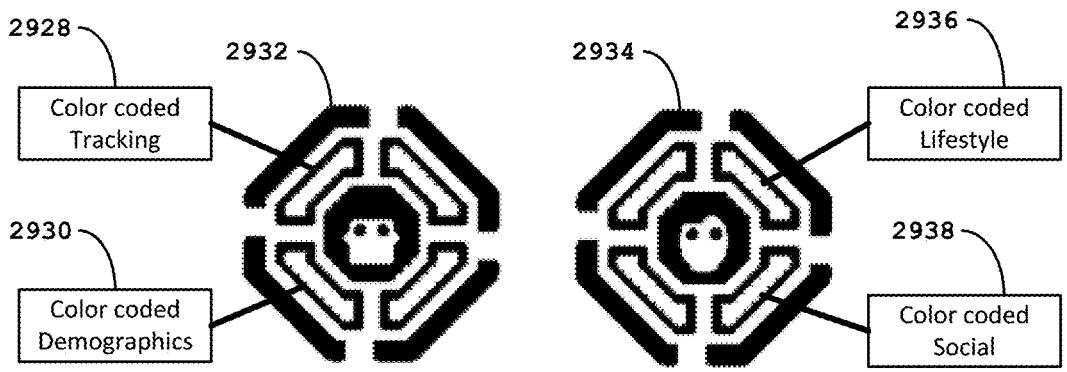

Figure 29B

```
Gateway 1  2  3  4  5
Edge
  a    ⎡  1 -1  0  0  0 ⎤
  b    ⎢ -1  1  0  0  0 ⎥
  c    ⎢ -1  0  1  0  0 ⎥
  d    ⎢  1  0 -1  0  0 ⎥
  e    ⎢ -1  0  0  1  0 ⎥
  f    ⎢  1  0  0 -1  0 ⎥
  g    ⎢  0  1  0  0 -1 ⎥
  h    ⎢  0 -1  0  0  1 ⎥
  i    ⎢  0  0 -1  0  1 ⎥
  j    ⎢  0  0  1  0 -1 ⎥
  k    ⎢  0  0  0 -1  1 ⎥
  l    ⎣  0  0  0  1 -1 ⎦
```

Customer Path: [f,l]

Matrix(x, y) = 1 if edge x is leading away from vertex y (leaving)
Matrix(x, y) = -1 if edge x is leading to vertex y (into)
Matrix(x, y) = 0 otherwise

NETWORK BASED HYPERLOCAL AUTHENTICATION WITH A GATEWAY COMPONENT

CROSS REFERENCE

This patent application claims the benefit of provisional patent application 63/014,661 filed on Apr. 23, 2020 and entitled DUAL CHANNEL LOCATION BASED AUTHENTICATION FOR SECURE DELIVERY OF HYPERLOCAL DATA OBJECTS;
  this patent application also claims the benefit of provisional patent application 63/014,662 filed on Apr. 23, 2020 and entitled DUAL CHANNEL LOCATION-BASED AUTHENTICATION FOR SECURE DELIVERY OF DATA OBJECTS;
  this patent application also claims the benefit of provisional patent application 63/014,663 filed on Apr. 23, 2020 and entitled SYSTEM AND METHOD FOR LOCATION-BASED GAMING;
  this patent application also claims the benefit of provisional patent application 63/014,664 filed on Apr. 23, 2020 and entitled WIRELESS NETWORK-BASED PASSIVE USER PROFILING; and
  all of these patent applications are hereby incorporated by reference.

FIELD

The description relates to a network based hyperlocal authentication system and method with a gateway component that provides a continuous background cryptographic operations including authentication and encryption between a wireless client device and a network component. By way of example and not of limitation, the network based hyperlocal authentication system and method can protect trade secrets and secure communications channels from surreptitious removal or extraction of information, and for endpoint authentication.

BACKGROUND

Intellectual Property (IP) attorneys protect their client's IP by obtaining patents, trademarks, and copyrights on their client's behalf. The process of obtaining patent, trademark and copyright requires interacting with an administrative agency such as the U.S. Patent and Trademark Office and the Copyright Office. However, no such administrative agency exists for the protection of trade secrets.

A "trade secret" is information that has either actual or potential independent economic value by virtue of not being generally known to the public, has value to others who cannot legitimately obtain the information, and is subject to reasonable efforts to maintain its secrecy. All three elements are required, and if any element ceases to exist, then the trade secret will also cease to exist. Otherwise, there is no limit on the amount of time a trade secret is protected.

There are state laws that protect trade secrets. Additionally, at a federal level trade secrets are protected by the Economic Espionage Act of 1996 and the Defend Trade Secrets Act of 2016. The Economic Espionage Act of 1996 criminalizes trade secret theft under two sets of circumstances, namely, the theft of a trade secret "intending or knowing that the offense will benefit any foreign government, foreign instrumentality, or foreign agent," and a theft "that is related to a product or service used in or intended for use in interstate or foreign commerce, to the economic benefit of anyone other than the owner thereof, and intending or knowing that the offense will, injure any owner of that trade secret." The Defend Trade Secrets Act of 2016 (DTSA) amended the Economic Espionage Act to establish a private civil cause of action for the misappropriation of a trade secret. This cause of action provides trade secret owners with a uniform, reliable, and predictable way to protect their valuable trade secrets anywhere in the country. The DTSA does not preempt existing state trade secret law, thus giving trade secret owners the option of state or federal judicial venues. U.S. courts can protect a trade secret by: (a) ordering that the misappropriation stop, (b) that the secret be protected from public exposure, and (c) in extraordinary circumstances, ordering the seizure of the misappropriated trade secret. At the conclusion of a trade secret case, courts can award damages, court costs, reasonable attorneys' fees and a permanent injunction, if warranted.

In spite of the Defend Trade Secrets Act of 2016, the estimated annual cost (in 2017) for the theft of trade secrets was $180 Billion to $540 Billion according to the Commission on the Theft of American Intellectual Property. Additionally, in a 2018 survey of Chief Financial Officers, 21.7% confirmed that IP theft happened to their companies in 2018. Furthermore, the average business cost of an IP data breach in 2020 to small enterprises was $8.64 Million.

Thus, there is a need for a system and method that prevent the misappropriation of trade secrets.

Endpoint authentication is used to verify and track the identity of external devices connected to a network, thereby ensuring the connectivity of only authorized endpoint devices. Endpoint authentication is important for networks that have remote users. Endpoint authentication system not only verifies users but also monitors incoming connections of endpoint devices. Automotive endpoint authentication has arisen in modern cars that are equipped with connectivity options such as Bluetooth and Wi-Fi, which renders them vulnerable to unauthorized access.

Fundamentally, automotive security requires protecting communications, authenticating communications, cryptographic operations (e.g., encrypting data, encryption, decryption, hashing), and simplified system integration of the automotive security solution. Most of the automotive security systems rely on public-key infrastructure (PKI) solutions. Although PKI solutions are effective, there are also various challenges with implementing PKI systems in an automotive environment.

The PKI challenges include using outdated security protocols, using keys that are too short (i.e., short keys), using self-issued keys and certificates, unsecured storage of keys and certificates, and lack of a rotation strategy for PKI certificates, keys, and/or established cryptoperiods. Also, there is the fundamental challenge of establishing trust in the Certificate Authority, which issues the trusted digital certificates.

Thus, there is a need for a system and method that minimizes the risks associated with PKI challenges and trusting the Certificate Authority for automotive endpoint authentication.

Secure communications occur when two entities are communicating and want to prevent third parties from listening or otherwise intercepting the secure communication. Therefore, the two entities need to communicate in a way that is unsusceptible to eavesdropping and interception.

Secure forms of communication include, but are not limited to, secure file-sharing apps, encrypted emails, and other encrypted messaging applications. Additionally, best practices can be used to make communications as secure as possible, such as by using a Virtual Private Network (VPN), choosing strong passwords, changing the strong passwords, and securing communications.

VPN gateways typically implement PKI systems and encounter the various PKI challenges described above. These advanced encryption protocols mask IP addresses for privacy and security. However, the challenge of managing strong passwords is cumbersome for end-users of VPN services. that must choose and remember those strong passwords. Weak passwords, which can more easily be remembered are more easily hacked and not a viable alternative.

Thus, there is a need for a system and method to provide secure communications and password management that do not require a user to remember strong passwords.

SUMMARY

A Network Based Hyperlocal Authentication (NBHA) system and method is described. The NBHA system continuously authenticates and performs cryptographic operations to secure communications between a wireless client device and a remote network component. The system includes a gateway component that establishes a secure broadband communications channel with the remote network component. The gateway component receives authentication credentials from the remote network component. The gateway component, having a short-range wireless transmitter, transmits the authentication credentials to the wireless client device having a short-range wireless receiver. A client device application, corresponding to the wireless client device, receives the local authentication credentials from the gateway component. The client device application registers and authenticates using the local authentication credentials to authenticate to the remote network component.

The client device application then requests an exclusive local key from the remote network component. The remote network component generates the exclusive local key for the wireless client device and transmits the exclusive local key to the gateway component. The gateway component transmits the exclusive local key to the client device application with the gateway short-range wireless transmitter.

The client device application, having the exclusive local key, requests a cryptographic material from the remote network component, and the client device application receives the cryptographic material from the remote network component. The client device application encrypts and decrypts communications to the remote network component with a shared secret that includes the exclusive local key received from the gateway component and the cryptographic material received from the network component.

In one embodiment, the gateway component further includes a scanner that detects one or more client device identifiers and a signal strength for each client device identifier.

In another embodiment, the NBHA system includes a message broker associated with the network component. The message broker communicates with a plurality of gateway components and a plurality of wireless client devices.

In yet another embodiment, the short-range wireless transmitter and short-range wireless receiver include a Bluetooth transceiver.

In a further embodiment, the NBHA system includes a data file that is accessible to the client device application when the client device application transmits the shared secret to the remote network component. Also, the data file is inaccessible to the client device application when the shared secret is not transmitted to the remote network component.

In a still further embodiment, the NBHA system includes a secure communication channel that is secured by the client device application when the client device application transmits the shared secret to the remote network component. Also, the communication channel security is compromised when the client device application is not able to transmit the shared secret to the remote network component.

In an even further embodiment, the gateway component is associated with an automobile and the client device application is associated with a user's wireless client device. The NBHA establishes a secure communication channel, which is secured by the client device application when the client device application transmits the shared secret to the remote network component. Also, the security of the communication channel is compromised when the client device application is not able to transmit the shared secret to the remote network component.

DRAWINGS

The present subject matter will be more fully understood by reference to the following drawings, which are presented for illustrative, not limiting, purposes.

FIG. 29B shows the categories and attributes for wireless network-based passive user profiling.

DESCRIPTION

Figure 1A:
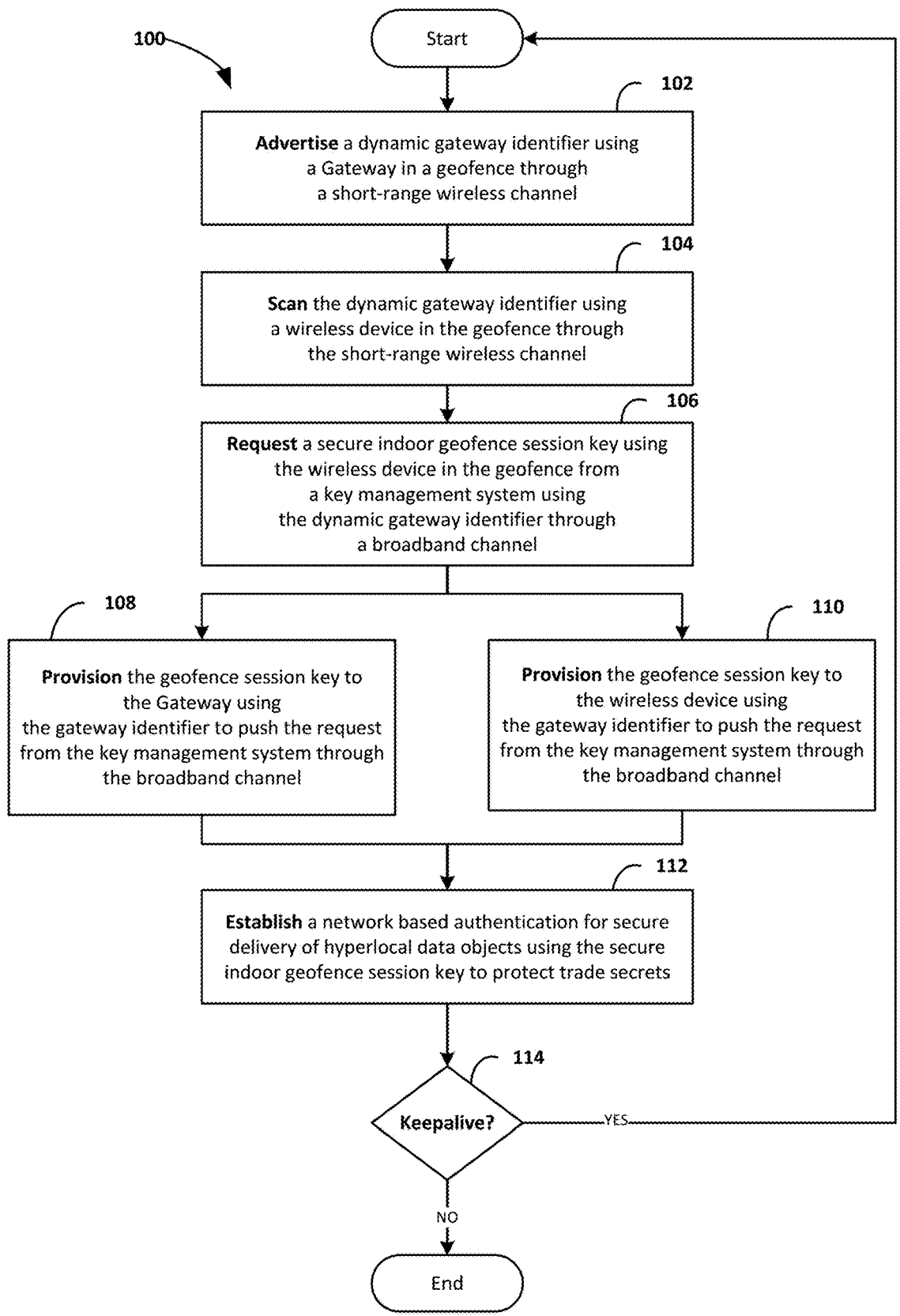
FIG. 1A shows a high level illustrative flowchart of Network Based Hyperlocal Authentication for the delivery of hyperlocal data objects.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus, systems and methods described herein may vary as to configuration and as to details. Additionally, the systems and methods may vary as to details, order of the actions, or other variations without departing from the illustrative methods disclosed herein.

A Network Based Hyperlocal Authentication (NBHA) system and method that is passwordless and provides a continuous background authentication and encryption system is described herein. "Passwordless" is defined as the seamless authentication of devices with a secure, convenient, and efficient proof-of-work from the user. The NBHA system and method provide continuous background authentication and a peer-to-peer encryption system.

The NBHA system and method are capable of satisfying three core requirements, namely, protecting user privacy, protecting physical asset access, and protecting a corporation's trade secrets. The NBHA system includes three hardware elements: a network component (e.g., server), an NBHA gateway, and a mobile application that is executed on a mobile device. The NBHA system and method authenticates (verifies) and secures or encrypts communications using a Secure Indoor Geofence (SIG) protocol. The combination of the NBHA system and SIG protocol produce a seamless authentication process, which dynamically and automatically establishes a strong password in the background operations of the user's device, while protecting users' privacy and corporate trade secrets. Seamless authentication is a method where the user is authenticated towards an entity without the burden of credential request. For high security requirements transparent methods are not applicable but can provide additional security in traditional username/password or PIN-based sessions.

Once the NBHA system and SIG protocol are operational, they can continue to operate in the background so that users can interact securely with a mobile application or a desktop application. Thus, the NBHA system and SIG protocol can be easily integrated with existing applications. Again, the NBHA system and SIG protocol support continuous passwordless authentication and cryptographic operations that are occurring as a background process.

For illustrative purposes, a variety of different use cases are presented that meet the criteria of protecting user privacy while protecting company and/or military trade secrets.

The NBHA system and method in combination with the SIG protocol satisfies the criteria of protecting user privacy by relying substantially on location based authentication instead of the typical user registration process that requires a username and a password. Simply put, if the user is not in proximity to the gateway, the user cannot be tracked. If the user is within proximity to the gateway and initiates communications with the NBHA system using the SIG protocol, the client device is authenticated seamlessly (i.e., without the need for a user to register a username and password). Depending on the mobile application, the user can be known, anonymous, or pseudo-anonymous. The pseudo-anonymous state relates to the user being in an area where access control privileges are limited; for example, a user may be required to show a security identification to enter a secure area and once in the secure area, the user can maintain some degree of anonymity, hence, they are "pseudo-anonymous."

With respect to the protection of company trade secrets, the NBHA system and method, and SIG protocol control and manage access to company trade secrets by requiring the user to be in proximity of a gateway using location based authentication to verify that the client device is a trustworthy device. Also, the NBHA system and SIG Protocol operate as a background process, so the user does not have direct control of the NBHA system.

The NBHA system and method in combination with the SIG protocol relies on symmetric keys and blockchain to establish fast and secure peer-to-peer communications without having the user remember strong passwords.

With respect to automotive endpoint authentication, the NBHA gateway is associated with an automobile, the wireless mobile application operating on the wireless device is associated with the user, and the automotive entity authenticates both communications channels. The NBHA system and method using the SIG protocol verifies and tracks the identity of external devices connected to a network, thereby ensuring the connectivity of only authorized endpoint devices. The NBHA system includes a scanner that constantly scans communications and wireless communications channels for devices trying to access the vehicle/automobile. These devices may be registered, unregistered, registered anonymously, or any combination thereof. Thus certain devices trying to access the vehicle may be unregistered and considered a rogue device and/or user.

The automobile NBHA gateway may be embodied as a stand-alone device or a component of another broader system. A gateway component may include a plug-in hardware (e.g., a USB dongle), a wireless device, or software operating on hardware integrated into the vehicle's operating systems. A stand-alone gateway may be for example, a smartphone or tablet.

In various embodiments, one or more CAs are associated with the automobile and its features. For example, one CA may authorize the use the vehicle in its entirety. In another embodiment, each vehicle feature (e.g., airbags, remote start, XM radio service, etc.) may be associated with and/or authorized by a distinct CA.

Gateway components are applicable to embodiments other than the automotive endpoint embodiment, such a gaming embodiment. In an illustrative gaming embodiment, the gateway component is integrated into a slot machine or a video display.

The SIG protocol includes a SIG challenge that is presented to a remote network component seeking a valid answer in order to authenticate a client device. The SIG challenge includes a plurality of cryptographic material such as one-time passwords, one-time passcodes, one-time PINs, initialization vectors, counters, public keys, hashes, or a combination thereof, all of which may generally be termed "key material". First, a wireless device in a geofence receives the challenge from a gateway, or a component thereof, as proof-of-work. Next, the SIG challenge is submitted to the remote network component for registration or/and authentication.

The SIG protocol operates across a dual channel as opposed to VPN technologies that use a single broadband channel. More specifically, the SIG protocol includes a broadband channel and a short-range wireless channel that can perform as an out-of-band channel. The SIG protocol provides a solution to out-of-band data transferred over an independent channel or short-range wireless channel from the main in-band data stream or broadband channel.

A Virtual Private Network (VPN) encapsulates network data for confidentiality, integrity, and availability. VPNs employ cryptographic algorithms and tunneling protocols as the methods to achieve privacy and security. The plurality of existing VPN protocols includes Internet Protocol Security (IPsec), Wire Guard, Transport Layer Security (SSL/TLS), Secure Shell (SSH) VPN, Microsoft Point-to-Point Encryption (MPPE), Datagram Transport Layer Security (DTLS), closed source VPNs, and open-source projects. VPN authentication includes passwords, biometrics, two-factor authentication, and a combination thereof. Similarly, the SIG protocol encapsulates data at the application layer for confidentiality, integrity, and availability. In addition, the SIG protocol operates in a dual-channel approach that utilizes an out-of-band channel.

Commercial VPN services provide security capabilities for a monthly fee to enhance an endpoint's privacy and security through encrypted channels and proxies. VPN services are commonly used to remove geographic restrictions imposed by an Internet Service Provider (ISP). The data transmitted in plaintext is revealed after leaving the proxy service and visible to a malicious actor. A secure VPN connection is established when the endpoints control the entire data path's encryption process, or the content is encrypted before sending the data over the Commercial VPN service. By comparison, the SIG protocol offers peer-to-peer encryption at the application, presentation, and session layer of the Open Systems Interconnection (OSI) model.

VPN technology is a data-agnostic approach to connect sites and clients securely. Meanwhile, the SIG protocol is data-aware. The SIG protocol can perform decisions depending on the data type (e.g., structured data vs. unstructured data, private information vs. public data). Furthermore, the SIG protocol includes a broadcast channel to reach all clients in a plurality of geofences. In various embodiments, this broadcast channel may be a broadband communications channel.

VPN capabilities and SIG capabilities complement each other for an effective in depth defense strategy to secure a larger network path. The SIG protocol is data type aware with an out-band-channel to deliver a plurality of cryptographic key material (e.g., hashes, tokens, initialization vectors, counters, one-time passwords, one-time passcodes, one-time PINs, public keys, or a combination thereof). Lastly, the SIG protocol offers peer-to-peer encryption and keyed hashing functions for confidentiality, integrity, and availability as described in further detail below.

Referring to FIG. 1A, there is shown an illustrative flowchart of Network Based Hyperlocal Authentication (NBHA) for the delivery of hyperlocal data objects. The flowchart 100 provides for the secure delivery of hyperlocal data objects.

In general, a Secure Indoor Geofence (SIG) session key is used to establish a dual channel communication architecture for secure delivery of hyperlocal data objects. The dual channel is kept alive at predefined intervals by re-authenticating the local users. A Certificate Authority (CA) and a plurality of digital certificates are used to provide identity protection to authenticate the NBHA gateway.

Key material, in the form of a dynamic gateway identifier, is advertised using the NBHA gateway in a geofence through a short-range wireless channel 102. The wireless device actively scans the dynamic gateway identifier in a geofence through the short-range wireless channel 104. Next, the wireless device requests key material, in the form of a secure indoor geofence session key, from a key management system using the dynamic gateway identifier through the broadband channel 106. In some embodiments, the key management system is embodied as a server or remote network component.

Simultaneously, the geofence session key is pushed to the NBHA gateway and wireless device using the dynamic gateway identifier from the key management system through the broadband channels 108 and 110. The network based authentication for secure delivery of hyperlocal data objects is established using the secure indoor geofence session key with a cryptoperiod to protect trade secrets 112. Last, a decision to keep alive the content is used to dynamically access the data objects' plaintext in a geofence or break the link 114.

Figure 1B:
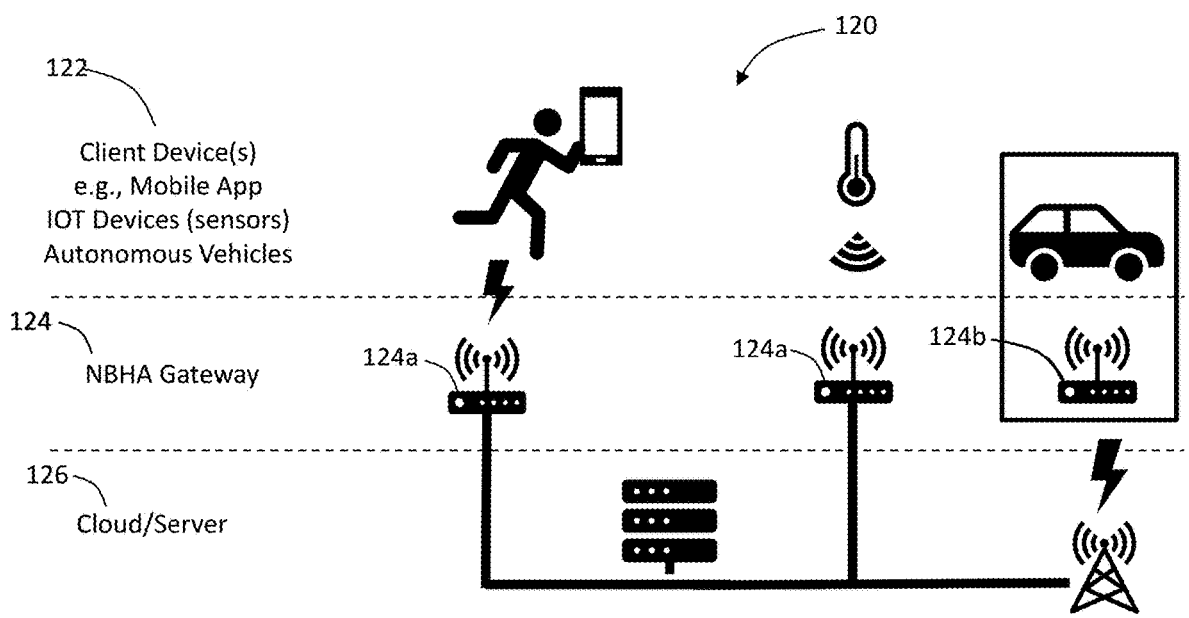
FIG. 1B shows the elements of a Network Based Hyperlocal Authentication (NBHA) system.

Referring to FIG. 1B, there are shown a tiered view of the elements of a NBHA system 120 that includes a remote network component (e.g., server) 126 in a base tier, one or more gateways 124 in a node tier, and one or more client devices 122 executing a client device application in a user tier. The gateway 124 may be mobile, being capable of moving freely or within a certain range, or static and fixed in a certain location. In static gateway 124a embodiments, the gateway is a stand-alone device (1) permanently fixed in place in the user's environment, such as by welding, gluing, or similar methods; (2) temporarily fixed in place in the user's environment, such as by bolts, screws, rails, slats, or similar methods; or (3) merely set in place in the user's environment, able to be immediately moved and set in another predetermined location in the user's environment. In mobile gateway 124b embodiments, the gateway may be integrated into a vehicle or an after-market feature plugged-in to the vehicle, a smart watch, or an electronic identification band, and therefore define its location as the present space occupied by and immediately surrounding a user or a particular vehicle. The illustrative NBHA system 120 components include a client device 122 capable of executing a client device application. The client device 122 is configured to communicate with a NBHA gateway 124 using a short-range communication channel such as Bluetooth or Wi-Fi. In some embodiments, the client device 122 is embodied as a smartphone, a tablet, a laptop computer, a desktop computer, a portable computing device, or any combination thereof.

The client device 122 is also configured to communicate with a network component 126, e.g., a server, network appliance, cloud component, or combination thereof. The client device 122 communicates with the network component 126 using a broadband communications channel, such as a 5G wireless communications channel or a DOCSIS/DSL wired communications channel. Note, for purposes of this patent, the term "broadband" applies to a high bandwidth communications channel.

The NBHA gateway 124 is also configured to communicate with the client device 122 using the short-range communications channel, e.g., Bluetooth, and with the illustrative server 126 using the broadband communications channel. And, of course, the illustrative NBHA server component 126 is configured to communicate with both the NBHA gateway 124 and the client device 122.

For the SIG protocol to operate in an on-line mode, the short-range wireless communications and broadband communications are occurring simultaneously and continuously. When communications along either communication channel or both communications channels are disrupted, then real-time authentication ceases.

In an off-line mode, the NBHA system may be configured to provide access to historical information; however, access privilege to real-time data objects is denied until both communications channels are restored, each of the system elements are authenticated, and the communications channels are secured with the required cryptographic practices and materials.

Figure 1C:
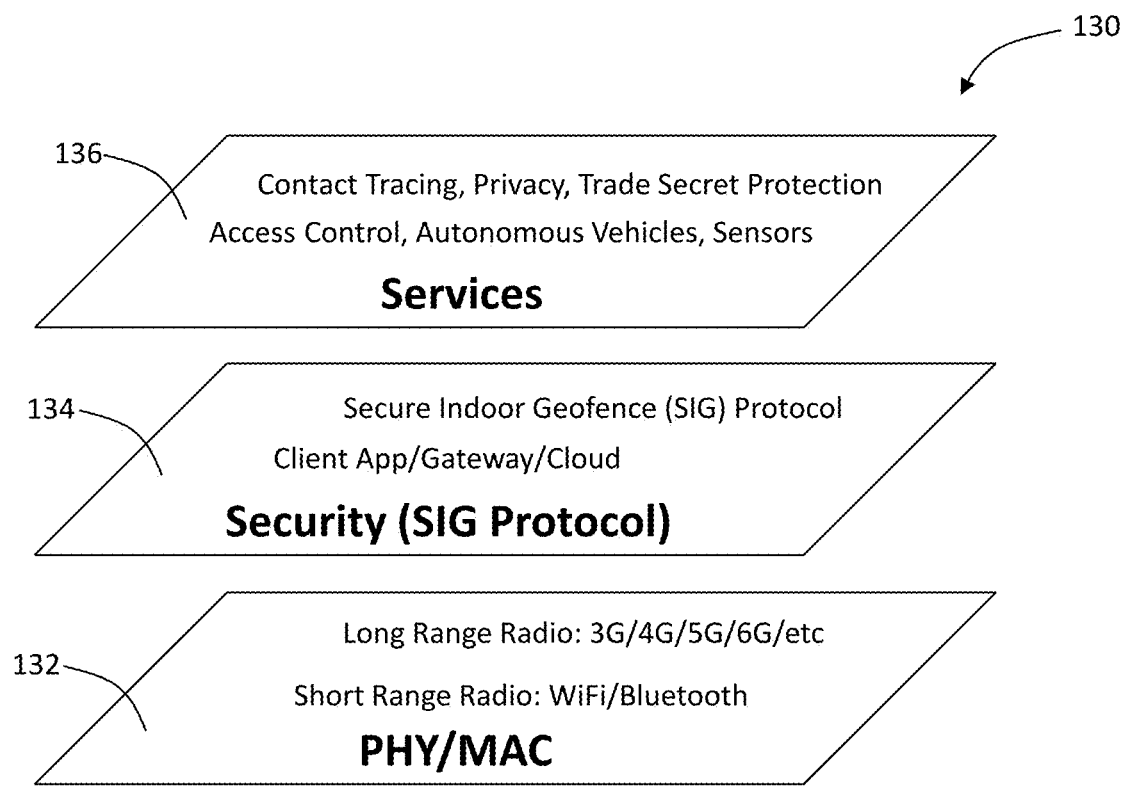
FIG. 1C shows an interconnection model for the NBHA system.

Referring to FIG. 1C, there is shown an interconnection model for the NBHA system. The interconnection model 130 more clearly shows the underlying physical layer and medium access control layer 132 that enables and supports the NBHA system. The SIG protocol 134 is the communication protocol utilized by the NBHA system to authenticate and secure communications in a seamless manner.

Various services 136 are supported by the NBHA system 100 operating the SIG protocol 134 such as anonymous contact tracing, trade secret protection, automotive authentication, securing a communications channel, access control, user privacy in autonomous vehicles, and securing communications with local sensors.

As described in further detail herein, the NBHA system 120 supports the location-based authentication of computing machines and individuals using one-time passcodes or passwords (OTPs) with secret sharing. Location-based one-time passcodes ensure unique registration and authentication based on the physical location of the NBHA gateway, computing machines, and individuals. For anonymity, secret sharing distributes the cryptographic material among the manufacturer, user, device, and database. A "computing machine" is defined as any device capable of rendering, processing, and storing data.

The illustrative NBHA gateway 124 also includes a scanner to locate targets and identify rogue devices for military applications, including force protection. The NBHA gateway scanner may be a payload attached to an unmanned aerial vehicle for reconnaissance and profiling. The NBHA gateway scanner can also be used to manipulate RF communications in the 2.4 GHz spectrum, specifically Bluetooth Classic and BLE, to negate adverse effects from a rogue device.

The NBHA gateways 124 are configured to operate as a mesh network for the secure delivery of content using location and one-time passcodes. The content includes, but is not limited to, email, dating, social media, news, forums, file sharing, and any media summarized and indexed in a cryptographic hash for media identification and retrieval using distributed media delivery.

Additionally, the NBHA system 120 supports the anonymous tracking of devices for contact tracing and to determine if an individual has been in a restricted area, exposed to a contagious disease, or for biowarfare countermeasures.

Furthermore, the NBHA system 120 can be used for access control to industrial control systems. The NBHA systems may also be used for indoor positioning of devices and for private content delivery. The NBHA systems may be used for autonomous vehicle passenger verification. The NBHA system may be used as an IoT framework for developers—and executable client applications may be included in an IoT compiler for IoT computing devices, e.g., IoT sensors. The NBHA systems may be used for anonymous location-based gaming activities such as sports betting, real-time side betting, and scavenger games.

The NBHA system 120 may also be used as a hash manager for retrieving data using hexadecimal values. The encrypted hashes are communicated through natural language in 20 Hz-20 kHz audio. The client device receives the encrypted hash using a microphone. The decrypted hash corresponds to a media object (e.g., PII, health information, patents, intellectual property, art, crypto) that needs to be protected and bonded to a geofence. In an alternate embodiment, the frequency of choice is 2.4 GHz for device-to-device communications.

Further still, the NBHA systems may be used as a pet tracker with access management. Further yet, the NBHA systems can integrate with blockchain and support reliable and secure voting systems on a client device.

Figure 1D:
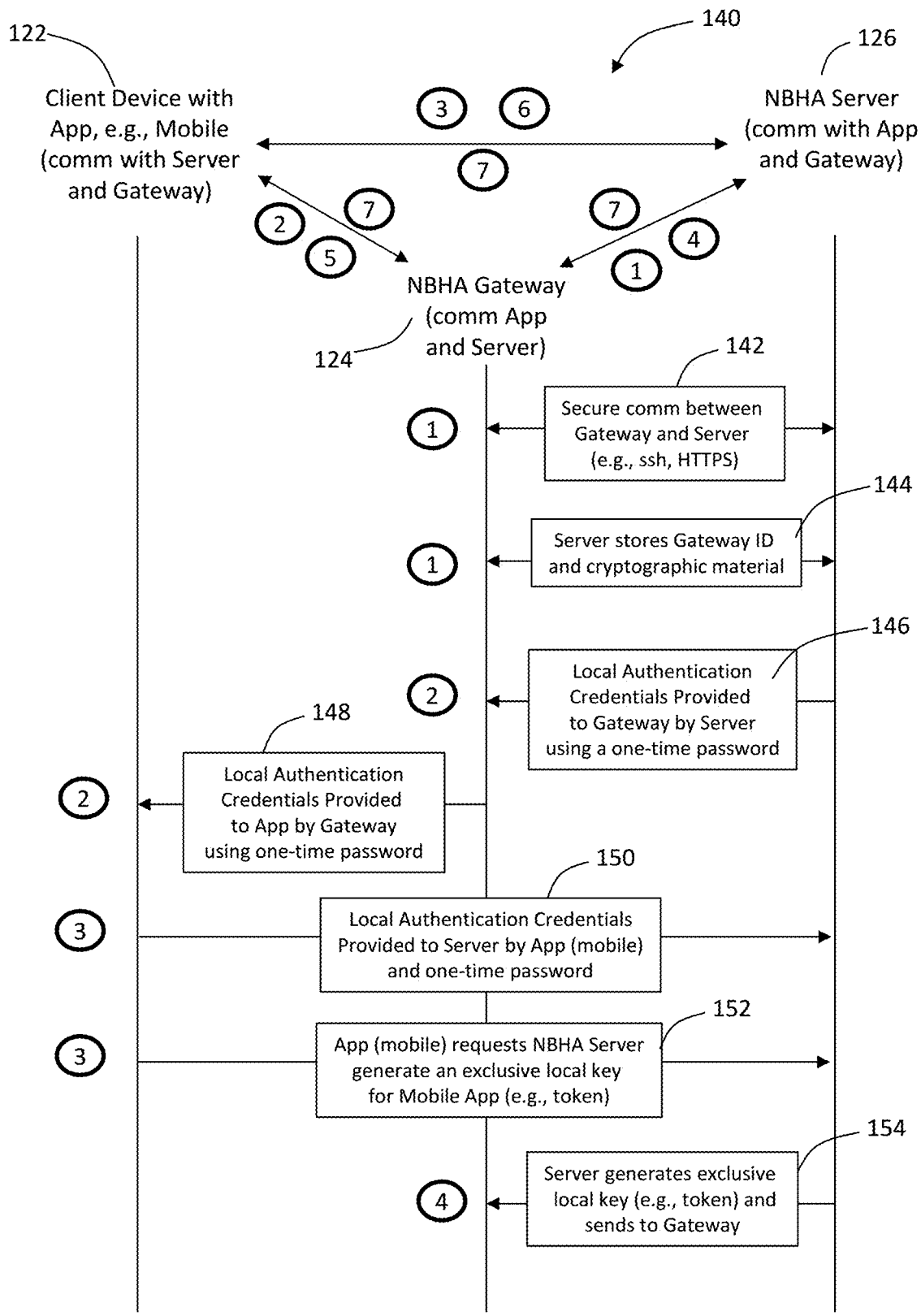
FIGS. 1D and 1E show the process steps of the Secure Indoor Geofence (SIG) Protocol as communication paths among a Client Device, NBHA gateway, and NBHA Server that comprise the NBHA system.

Referring to FIG. 1D, there is shown the process steps of the SIG protocol associated with the NBHA system 120, which together comprise the NBHA method 140. The NBHA method 140 incorporates the NBHA system elements and the SIG protocol. The method steps of the SIG protocol are described in FIGS. 1D and 1E.

The SIG protocol operates as a background process, which is passwordless, continuously authenticates devices, and performs cryptographic operations for secure communications between the wireless client device 122 and the remote network component 126. By way of example and not of limitation, the remote network component 126 may be a "server" having a processor and memory. The SIG protocol method 140 establishes a secure broadband communication channel between the gateway 124 and the remote network component 126 over a Wide Area Network (WAN), e.g., the Internet. In another embodiment, a Local Area Network (LAN) may be used to establish a broadband connection between the gateway 124 and the illustrative server 126.

At block 142, an illustrative broadband communication channel is established between the NBHA gateway 124 and the NBHA server 126 (i.e., "the remote network component"). In some embodiments, the NBHA gateway 124 establishes the secure broadband communication channel. In other embodiments, the NBHA server 126 establishes the secure broadband communication channel. In one embodiment, the broadband communication channel may be secured with a Hardware Security Module (HSM), which is not shown. In another embodiment, the broadband communication channel may be secured with secure socket layers (SSL) and the HTTPS protocol. Other methods of securing a broadband communication channel will readily suggest themselves to those of ordinary skill in the art.

At block 144, the remote network component 126 stores key material comprising a gateway identifier and cryptographic material associated with securing the broadband communications channel between the gateway 124 and the remote network component 126. The gateway identifier is identification information unique to each gateway, such as a factory serial number or a provider serial number assigned and loaded onto each gateway after factory production and prior to installation at a particular location for use. The cryptographic material may include a seed key used to generate hashes, an asymmetric key, private keys, public keys, or any combination thereof.

In some embodiments, the gateway identifier and cryptographic material are stored together or with some association to one another. In other embodiments, the gateway identifier is stored in a dedicated database, while the cryptographic material is stored in a separate database. In certain embodiments, the database(s) are stored on volatile memory (e.g., dynamic random-access memory (DRAM) and static random-access memory (SRAM)), non-volatile memory (e.g., flash memory, read-only memory (ROM), programmable read-only memory (PROM), erasable programmable read-only memory (EPROM), electrically erasable programmable read-only memory (EEPROM)), semi-volatile memory, or combination thereof.

At block 146, the gateway 124 receives key material comprising authentication credentials from the remote network component 126 over the secure broadband communication channel. The authentication credentials are unique to each gateway and can include an initialization vector, a seed key used to create other keys (i.e., hashes), etc. By way of example and not of limitation, a one-time password is communicated with the authentication credentials from the remote network component 126 to the gateway 124 over the secure broadband communication channel.

At block 148, the gateway 124, having a short-range wireless transmitter, transmits the authentication credentials and the illustrative one-time password to the wireless client device 122, which has a short-range wireless receiver, over a short range communications channel. The gateway 124 broadcasts its unique authentication credentials only within the area immediately surrounding the gateway's location due to the limited range of the short-range wireless transmitter. Thus, authentication credentials are "local" to the gateway and not interchangeable with another location's or gateway's authentication credentials. A client device application, which is executed on the wireless client device 122 by a processor and memory included in the wireless client device 122, receives the local authentication credentials from the gateway 124. In the illustrative embodiment, the short-range wireless transmitter and short-range wireless receiver include a Bluetooth transceiver (not shown). In another embodiment, the one-time password is used as proof-of-work to register a new client device 122 at the NBHA server 126. Once a device 122 has been registered, a new one-time password is generated by the NBHA server 126 to register another client device. Devices never share a one-time password even while performing the same proof-of-work (e.g., simultaneously entering a geofence). As a result, the SIG protocol protects against remote connections, distributed denial of service, and external queries due to the hyperlocal requirements for authentication.

At block 150, the client device application operating on wireless client device 122 transmits the local authentication credentials and the illustrative one-time password to the remote network component 126 along a broadband communication channel that may include a cellular network. The broadband communication channel between the client device 122 and remote network component 126 may be authenticated or initialized through an initial transmission of a client device identifier (i.e., factory identifier, media access control (MAC) address, etc.) from the client device to the remote network component 126. Additionally, the wireless client device 122 requests key material comprising an exclusive local key from the remote network component 126 at block 152 along the broadband communication channel. Each exclusive local key is specific to a particular wireless client device 122. In some embodiments, the exclusive local key may be a hash, an initialization vector, a symmetric key, or public cryptographic material. In the illustrative embodiment, the exclusive local key is a token that can include a cryptoperiod and standard 128 bit or 256 bit encryption. In other embodiments, the token may simply comprise an autogenerated random number.

At block 154, the remote network component 126 generates the illustrative exclusive local key, e.g., the token, and communicates the illustrative token to the gateway 124 along the broadband communication channel.

Figure 1E:
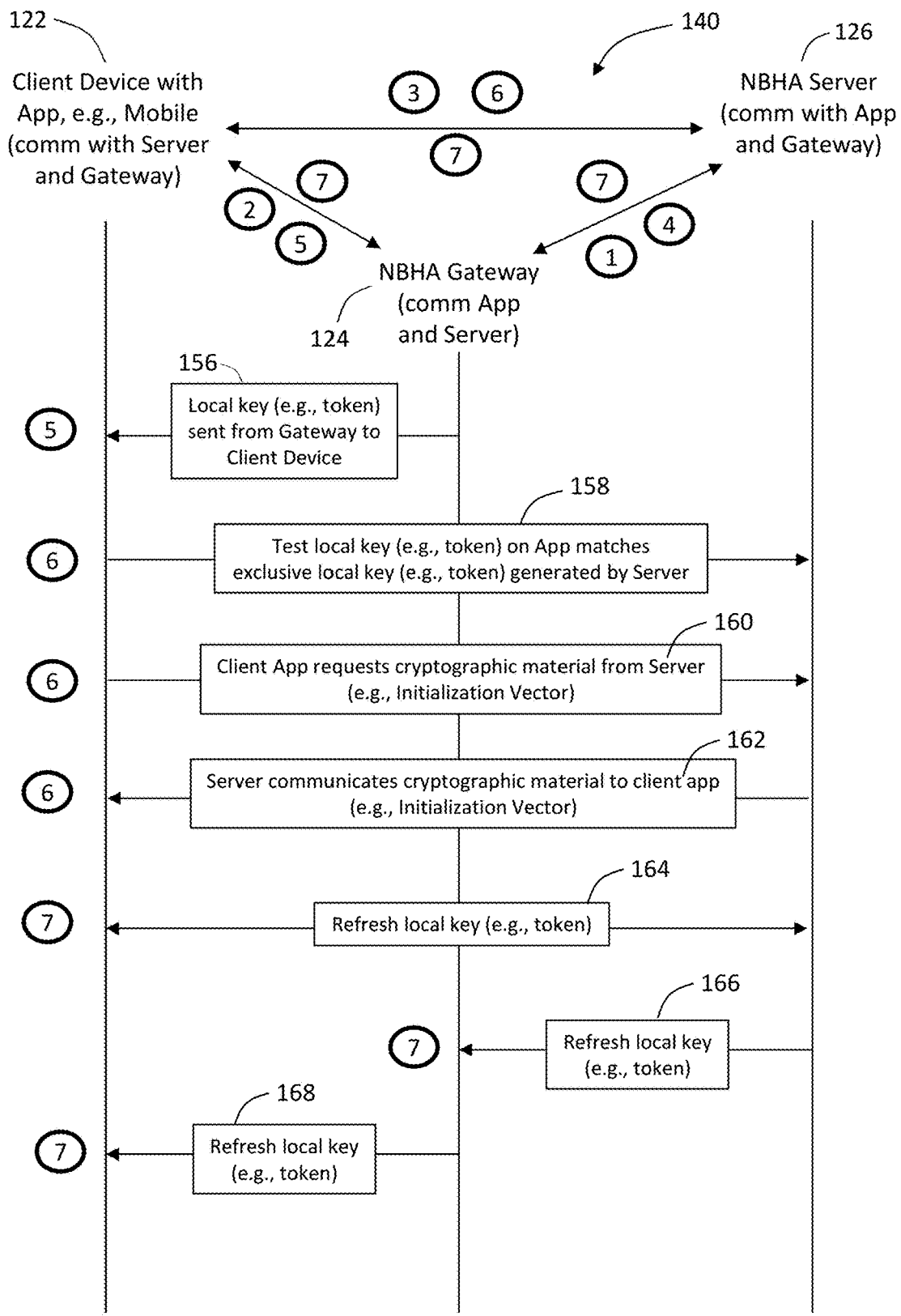

Referring now to FIG. 1E, there are shown additional process steps associated with the SIG protocol. At block 156, the gateway 124 transmits the exclusive local key, e.g., the token, to the wireless client device application running on the wireless client device 122 with the gateway short-range wireless transmitter.

At block 158, the exclusive local key, e.g., token, is tested by having the wireless client device 122 submit a challenge to the remote network component 126, which generated the exclusive local key, e.g., token. Each exclusive key is unique to a particular wireless client device 122. In some embodiments, the exclusive key includes or is based upon an identifier unique to the wireless client device, such that other client devices lack this unique identifying information and are incapable of accessing, using, and/or authenticating an exclusive key generated for another client device. In addition to the SIG challenge characteristics described above, a challenge will determine at the remote network component whether the exclusive key has been issued to and/or received by the remote network component previously. A determination that the exclusive key has been issued to another client device or received from another client device results in a failed challenge and thus a failure to secure communications with the SIG protocol.

At block 160, the client device application, having the exclusive local key, requests a cryptographic material from the remote network component 126 via the broadband communication channel. At block 162, the remote network component 126 generates the cryptographic material and transmits the cryptographic material over the broadband communications channel to the wireless client device 122. Also at block 162, the client device application receives the cryptographic material from the remote network component 126 via the broadband communication channel. The cryptographic material, by way of example and not of limitation, is an initialization vector, hash, key component, symmetric key, token, or any combination thereof. In some embodiments, the initialization vector allows the client device 122 and the remote network component to communicate securely over the broadband communications channel.

The client device application then proceeds to encrypt communications to the remote network component 126 with a shared secret that includes the exclusive local key received from the gateway 124 and the cryptographic material received from the network component 126.

In the illustrative contact tracing mobile application, the client device application gathers contact tracing data and encrypts the contact tracing data with the shared secret, which is then transmitted to the remote network component 126.

With respect to the illustrative contact tracing mobile application, an infection report is received by an infected client device application. The infection report includes an infection report timestamp. The network component identifies other client devices in proximity to the infected client device. A notification module notifies the other client devices about their proximity to the infected client device with a calculated risk factor.

The process of generating the exclusive local key, e.g., token, can be repeated continuously, as shown by blocks 164, 166, and 168. The SIG protocol operates as a background process according to the technical requirements or business requirements for the specific mobile application, access requirements to the remote network component, regulatory requirements, financial transactional requirements, or other such requirements.

At block 164, the key material exchanged between the client device application and the remote network component 126 at block 152 are refreshed via the broadband communication channel. This process may be repeated any number of times to continually authenticate the client device. Similarly, at block 166, the key material exchanged at step 154 are refreshed, which may be repeated successively by generating the illustrative exclusive local key, e.g., the token at the network component 126 and communicating along the secure broadband communication channel to the gateway 124. Finally, at block 168, the key material exchanged at step 156 are refreshed, which may be repeated successively by transmitting the exclusive local key, e.g., the token, to the wireless client device application running on the wireless client device 122 with the gateway short-range wireless transmitter from the gateway 124 over the short range communications channel.

Figure 1F:
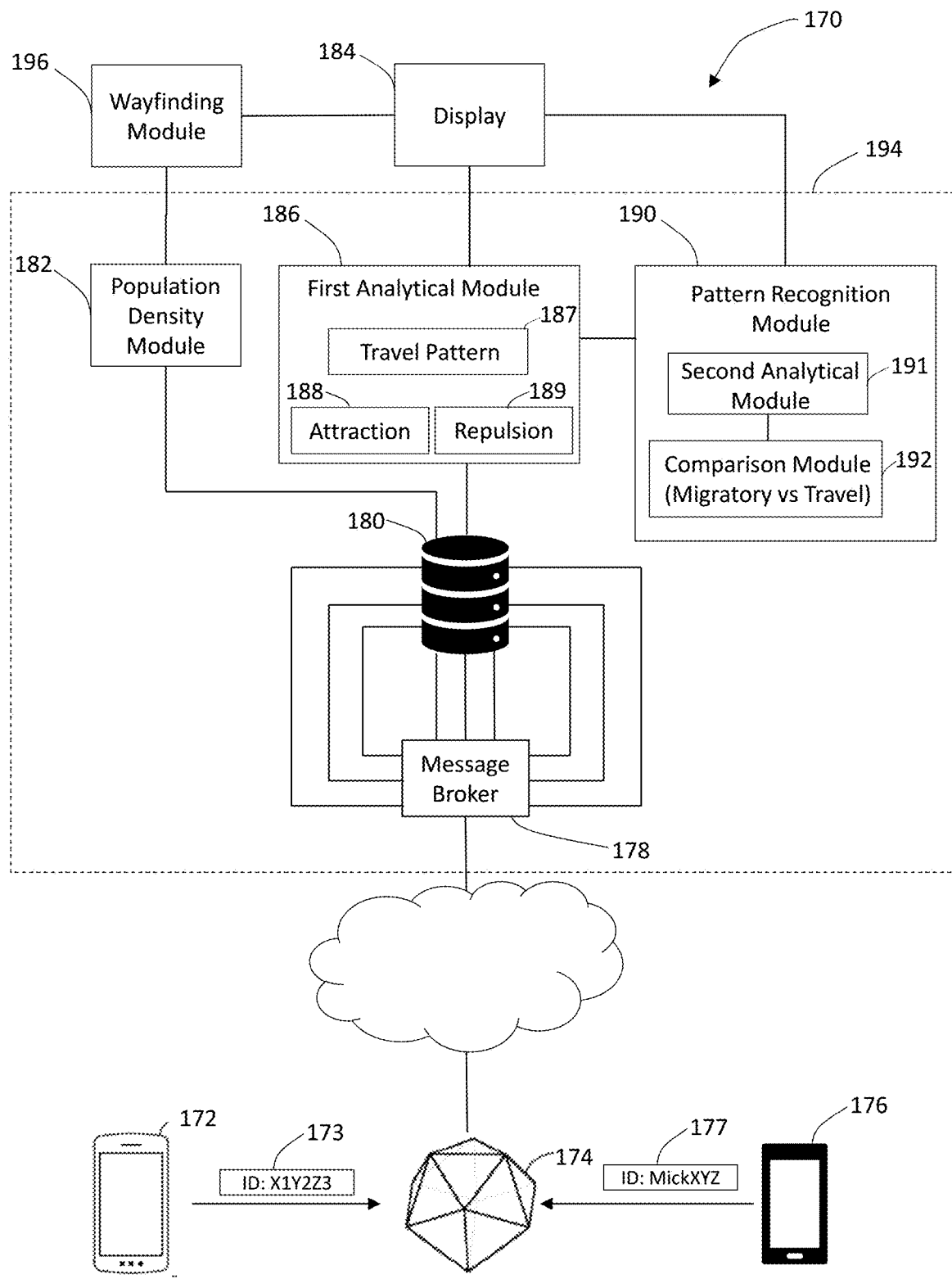
FIG. 1F shows another illustrative system for social distancing that monitors population densities with support from the NBHA system.

Thus, the passwordless capabilities of the NBHA system are constantly tested and updated in the background and not limited by a single authentication step, which is common with the use of biometrics for passwordless authentication. Additionally, the anonymity of the user is preserved because there is no need for a biometric. Instead, the client device is tracked for purposes of implementing the SIG protocol. Although biometrics are not needed, certain embodiments may employ biometrics as an additional layer of security/authentication. Referring to FIG. 1F, there is shown an illustrative NBHA system 170 for social distancing that monitors population densities and is also supported by the NBHA systems. The monitoring performed in this embodiment is based on centralized and anonymous tracking of individuals. Thus, elements of the Decentralized Privacy-Preserving Proximity Tracing (DP-3T) standard are followed for preserving user anonymity, i.e., the individual remains anonymous. However, the NBHA systems centrally determine the location of each client device using network based indoor positioning information that is extracted from the authentication data sets gathered by using the SIG protocol.

The illustrative NBHA system 170 may also be used to anonymously track RF transmissions emitted by an unregistered wireless device. The illustrative NBHA system 170 may also be used for event-based A/B testing, in which the impact of an event is monitored by tracking captured RF transmissions from registered and unregistered wireless devices.

Registered devices are those client devices authenticated through the SIG protocol. Unregistered devices are those client devices identified by the scanning operation of the gateway 124 and/or the remote network component 126 as being physically located in the broadcast range of the gateway 124, but not authenticated by the SIG protocol.

Event-based A/B testing refers to detecting RF leakage or wireless identifiers from registered and unregistered wireless devices with respect to an event location and event time. A travel pattern or migration pattern for the registered and unregistered wireless device determines an attraction and/or repulsion to the event—and the impact of an event is measured by the attraction and/or repulsion to the event. In some embodiments, the repulsion/attraction are determined based upon the determined location of the registered and unregistered wireless device relative to the event location and event time. For example, a degree of repulsion from an event may be attributed to a particular wireless client device if the location of the wireless device at the time of the event is not the event location. In another embodiment, a degree attraction to an event may be attributed to a particular wireless client device if the location of the wireless device at the time of the event is the same as the event location.

The system 170 includes unregistered wireless devices such as illustrative unregistered wireless device 172. Each unregistered wireless device 172 includes a processor, a memory, and transmits at least one wireless device identifier 173. The wireless device identifier 173 may include identification information unique to each wireless device, such as a MAC address, a factory serial number, or a provider serial number assigned and loaded onto each wireless device after factory production.

The system 170 also includes a plurality of stationary transceivers 174, which is also referred to interchangeably as a "gateway." In the illustrative embodiment, each stationary transceiver 174 is disposed in a fixed location. Additionally, each stationary transceiver 174 includes a scanner that detects at least one wireless device identifier corresponding to each unregistered wireless device 172. Additionally, the scanner may also detect registered wireless devices 176. Alternatively, the transceivers 174 may be mobile; however, for purposes of the embodiments presented herein, the transceivers are in a fixed location, i.e., a stationary location.

The message broker 178 is communicatively coupled to each of the stationary transceivers including illustrative gateway 174. The message broker 178 receives the illustrative wireless device identifier 173 from the unregistered wireless device 172 and associates the wireless device identifier 173 with the stationary transceiver 176 that detects the wireless device identifier 173. The message broker 178 may further associate the wireless device identifier 173 with a particular time at which the stationary transceiver 174 detected the wireless device identifier 173.

The message broker 178 is communicatively coupled to a database 180, which stores each wireless device identifier recognized by each stationary transceiver 174. For example, the database 180 stores the location for stationary transceiver 174, the wireless device identifier 173 and the timestamps corresponding to the time the wireless device identifier 173 was detected by the stationary transceiver 174.

Additionally, the database 180 stores or generates the period of time the wireless device identifier remained in a particular location. Wireless device identifiers may be associated with unregistered wireless devices and registered wireless devices. For the event-based A/B testing, the database 180 also stores an event location (or area) and an event time—the event time includes the beginning time for the event, the duration of the event, and/or an ending time for the event.

A population density module 182 is communicatively coupled to the database 180 and receives wireless device identifiers, locations associated with each received wireless device identifier, and timestamps for each wireless device identifier. The population density module 182 determines a number of wireless identifiers in a particular area with the wireless identifiers, the timestamps and the locations associated with the illustrative wireless device identifier 173. The wireless device identifier received by the population density module 182 may be associated with an unregistered wireless device or a registered wireless device. The display 184 presents population densities, determined by the population density module 182, for example on a geographic map or a pixel map.

The system 170 includes a plurality of registered wireless devices such as illustrative registered wireless device 176. Each registered wireless includes a processor and a memory. Additionally, each registered wireless device transmits at least one registered wireless device identifier 177 to the stationary transceiver 174. The illustrative registered wireless device identifier 177 is transmitted to database 180. The database 180 stores the registered wireless identifier 177 and updates the timestamps and location for the registered wireless device identifier 177 based upon the particular gateway 174 from which the database 180 received the registered wireless identifier 177 and the location associated with that gateway.

By way of example and not of limitation, the illustrative wireless devices 172 and 176 repeatedly transmit wireless device identifiers 173 and 177, such as a Bluetooth wireless device identifier. The Bluetooth wireless identifiers 173 and/or 177 are captured by the scanner corresponding to the gateway 174. In operation, the stationary transceiver 174 generates timestamps corresponding to the detection of the Bluetooth wireless device identifiers 173 and/or 177, which are associated with the wireless device identifiers 173 and 177 and/or stored in association with the wireless device identifiers 173 and 177.

In some embodiments, the stationary transceiver 174 may also include a camera (not shown) communicatively coupled to a camera-based pattern recognition module (not shown) that counts persons within a field of view of the camera (not shown).

In still another illustrative embodiment, the system 170 includes a first analytical module 186 that is communicatively coupled to the database 180. The first analytical module 186 generates a travel pattern 187 for each wireless device identifier. The travel pattern 187 indicates the time spent at different locations for each wireless device identifier. The travel pattern 187 associated with one or more wireless device identifiers is presented on display 184. The travel pattern may be generated for registered wireless device identifiers and unregistered wireless device identifiers.

Additionally, the first analytical module 186 includes an attraction indicator 188 that shows one or more wireless device identifier moving towards the event location during the event time based on the travel pattern corresponding to the wireless device identifier. Additionally, the attraction indicator 188 may be based on travel patterns that occur before the event, during the event and after the event. The repulsion indicator 189 operates in a manner similar to the attraction indicator 188, except the repulsion indicator 189 shows one or more wireless device identifiers moving away from the event location. The display 184 shows at least one of the attraction indicator 188 and the repulsion indicator 189 for each wireless device identifier.

The system 170 also supports generating anonymous user profiles based on anonymous migration patterns. In the illustrative embodiment, anonymous migration patterns that correspond to a particular demographic profile are stored in the database 180. Each anonymous migration pattern associates time spent at different locations with a demographic profile.

The system 170 may also include a pattern recognition module 190 that classifies the wireless device identifier as having a particular demographic profile. The pattern recognition module 190 includes a second analytical module 191 and a comparison module 192. The pattern recognition module 190, more generally, compares the travel pattern for each wireless device identifier with the migration pattern associated with the demographic profile—the output is presented on the display 184. Additionally, the display 184 shows at least one of the attraction indicator 188 and the repulsion indicator 189 for each demographic profile at the event location during the event time.

The second analytical module 191 is communicatively coupled to the first analytical module 186 proceeds to compare the travel pattern (associated with a wireless identifier) with the migratory pattern (associated with a demographic profile). The travel pattern is compared with the migratory pattern at the illustrative comparison module 192. If there is a match between the travel pattern (associated with a wireless identifier) and the migratory pattern (associated with a demographic), the wireless identifier is classified as being associated with the demographic profile. By way of example and not of limitation, a wireless identifier may be associated with one or more demographic profiles. The updated migratory patterns are presented on display 184.

The system 170 may also include a server module 194 that includes the message broker 178, the database 180, and the population density module 182. Additionally, the server module 194 may also include the first analytical module 186 and the pattern recognition module 190. The server module 194 may be disposed with a local area network (LAN) or may be disposed in a private cloud, public cloud, or hybrid cloud.

In the illustrative embodiment, the display 184 that presents the population density, the travel patterns or the migratory patterns may be presented on a browser that operates on a personal computer, laptop, or other such electronic devices. Additionally, the display 184 may correspond to a mobile device such as a smartphone that includes a smartphone application that can present the population density, the travel patterns, or the migratory patterns.

In another illustrative embodiment, the population density module 182 may also generate a virtual queue (not shown) when the number of wireless identifiers in a particular area reaches a threshold. The number of wireless identifiers reaching a threshold triggers the formation of a virtual queue, which includes a physically distributed queue and a notification module that indicates an order in the virtual queue. In a social distancing embodiment, the event is associated with social distancing and the population density module 182 generates a virtual queue when the number of wireless identifiers in a particular area reaches a social distancing threshold, which triggers the formation of a virtual queue.

Furthermore, the population density module 182 may be communicatively coupled to a wayfinding module 196. The population density module 182 identifies locations with high population densities and communicates the location for high population densities to the wayfinding module 196. The wayfinding module 196 interprets the high population density locations as traffic congestion in a particular area—so that the wayfinding module generates one or more routes to minimize exposure to high population density locations.

In still another social distancing embodiment, the event is associated with a positive infection result and the database 180 is configured to be updated when the positive infection test result is reported. The database associates the positive infection test result with a corresponding registered wireless device, which may now be identified as infected. The notification module notifies other registered wireless devices that were in proximity to the infected registered device, providing the location and the time that the registered wireless devices were proximate to the infected registered wireless device. In this embodiment, "proximity".

In operation, infection results are reported with the system 170 by updating database 180 when a positive infection test result is reported. The database 180 associates the positive infection test result with a registered wireless device identifier 177, and classifying the corresponding wireless device as an infected wireless device. The population density module 182 is updated and presents the positive infection result and the population density in real-time or near real-time.

Additionally, the systems and methods presented herein report a wireless device's (or its user's) exposure to infection through proximity to another infected user after the infection is detected in that user. In other words, if a healthy person is exposed to an infected person on March 20 and the infection is not detected for five (5) days, i.e., March 25, the healthy person may be notified on March 25 that they were exposed to an infected person on March 20 at a particular time and location and for a particular time period.

In operation, the system 170 reports infection exposure after the infection is detected. The system 170 reports prior exposure to an infected person by having the first analytical module 186 generate the traffic pattern 187 for the infected individuals. The infected individual traffic pattern is then converted to an "infected" demographic profile by the pattern recognition module 190. The pattern recognition module 190 then proceeds to determine if there is a match between the "infected" demographic profile and one or more individual traffic patterns. If there is a match between the infected demographic profile and one or more traffic patterns, then the notification module (not shown) communicates to the affected wireless devices (i.e., wireless devices associated with matching traffic patterns) that the wireless device was in proximity to an infected person at a particular time, a particular location and for a particular time period.

Figure 2A:
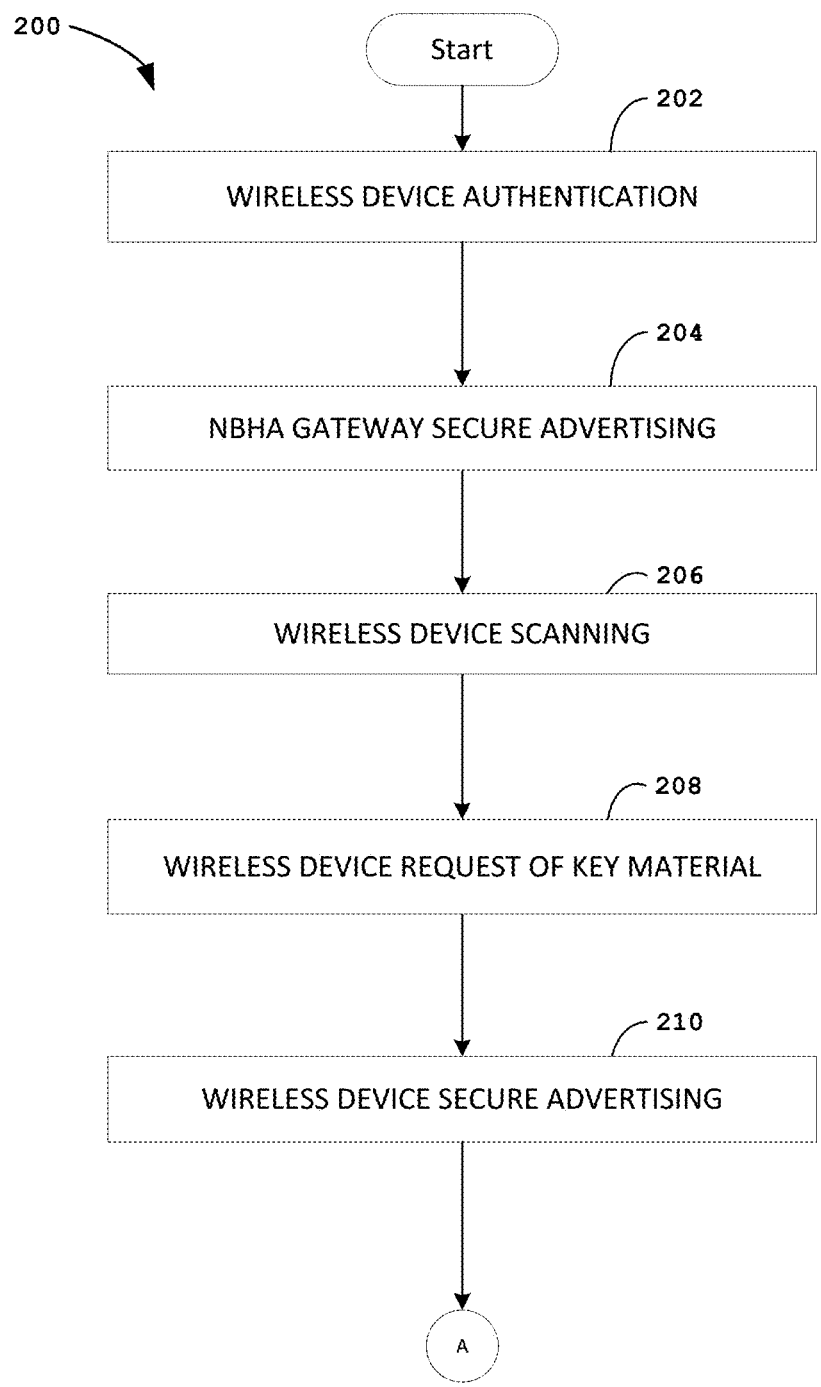
FIG. 2A shows a method of performing the SIG protocol.

Referring to FIG. 2A, there is shown a flowchart 200 for an illustrative method of performing the SIG protocol to establish a secure connection with a wireless device. At block 202, an authenticated user is able to request session keys for a Secure Indoor Geofencing (SIG) module. At block 204, the NBHA gateway advertises data packets with a Gateway ID in the particular area surrounding the location of the gateway, extending radially outward from the gateway to range equal to the effective broadcast range of the gateway. At block 206, a wireless device 206 scans its location for advertised packets and receives the broadcasted gateway IDs. At block 208, a public key is received by an NBHA server over a broadband channel from a verification system using the Gateway ID and verified by a Certificate Authority (CA). Lastly, at block 210 the wireless device requests session keys for a Secure Indoor Geofencing (SIG) module. The Secure Indoor Geofencing (SIG) protocol establishes a secure hyperlocal interactive session using dual channels.

Figure 2B:
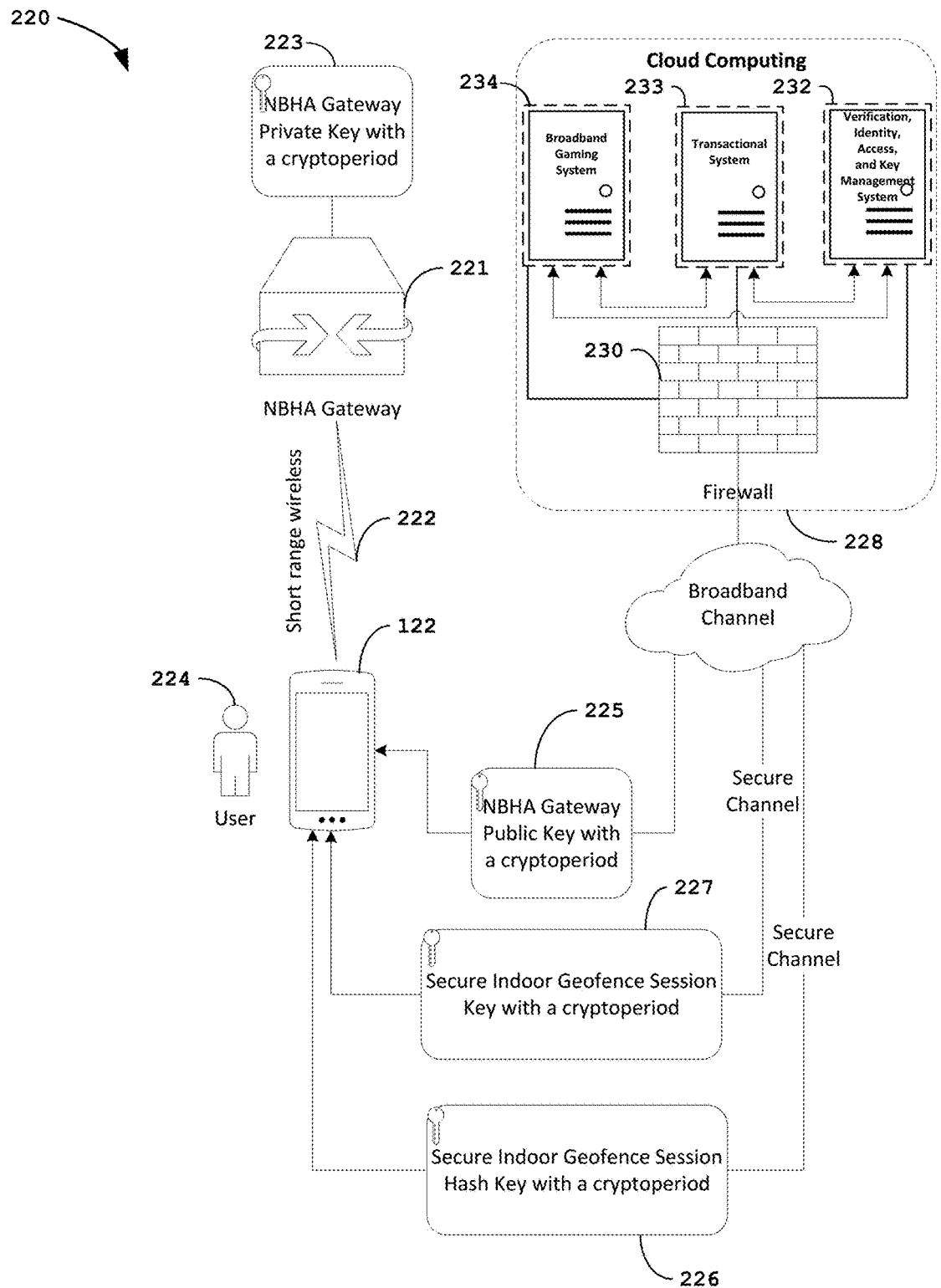
FIG. 2B shows a container-based system for implementing the SIG protocol.

The illustrative architecture shown in FIG. 2B demonstrates a system 220 design for dual channel key provisioning to a wireless device for Secure Indoor Geofencing (SIG) operation. The NBHA gateway 221 is a device with a processing unit, memory, graphics, general purpose I/O for sensors, wireless broadband technologies (e.g., Wi-Fi), mobile broadband technologies (e.g., 3G, 4G, LTE), wired broadband technologies (e.g., Ethernet, coaxial cable, and fiber), a private key having a cryptoperiod 223, and a plurality of low energy short-range wireless radios (e.g., BLE, Zigbee, NFC, RFID) 222. In addition, the NBHA gateway 221 is capable of supporting a plurality of wireless protocols, e.g., 802.11 b/g/n, 802.11 a/n/ac and 802.11 ad, in the 2.4, 5.0, and 60 GHz wireless ranges. A wireless device 221 used by a client 224 within range of the short-range wireless 222 area of effect (AoE) or effective broadcast range. The NBHA gateway public key 225 is distributed publicly through a repository hosted on cloud computing 228 services and digitally signed by a Certificate Authority (CA).

After user identification and user authentication, a symmetric session key with a time to live (TTL) is generated for the SIG module 227. The time to live is defined as a delta determined by a cryptoperiod. According to the National Institute of Standards and Technology (NIST), the Originator Usage Period (OUP) of symmetric authentication key is less than two years, a private authentication key is one to two years, and a public authentication key is one to two years. In this embodiment, the cryptoperiod or time to live of the keys is determined by design which is a delta below the recommended limits by NIST. Also, a hash key is generated with a TTL for a keyed-hash message authentication code (HMAC) for data integrity and authentication 226. A secure channel is established through secure HTTP over a Transport Layer Security.

With respect to the illustrative firewall 230, the firewall 230 may be configured to operate as an appliance capable of packet filtering, deep packet inspection (DPI), intrusion detection system (IDS), and intrusion prevention system (IPS). A broadband gaming system 234, a transactional system 233, and verification system 232 are provided by a virtualized environment. A broadband gaming system 234 is provided to manage the interactions between an application such as casino games (e.g., bingo, slots, table games, sports book, horse racing) and gaming services (e.g., player tracking, logging, generating outcomes, transactions, leaderboards).

HMAC (keyed-hash message authentication code) is a computed signature used to verify the identity of the SIG packet. The HMAC is used to verify (i.e., authenticate) that the SIG packet has not been altered.

The illustrative cloud system 228 of FIG. 2B may be embodied as one of four fundamental cloud service models, namely, infrastructure as a service (IaaS), platform as a service (PaaS), software as a service (SaaS), and network as a service (NaaS). The cloud service models are deployed using different types of cloud deployments that include a public cloud, a community cloud, a hybrid cloud, and a private cloud.

Figure 2C:
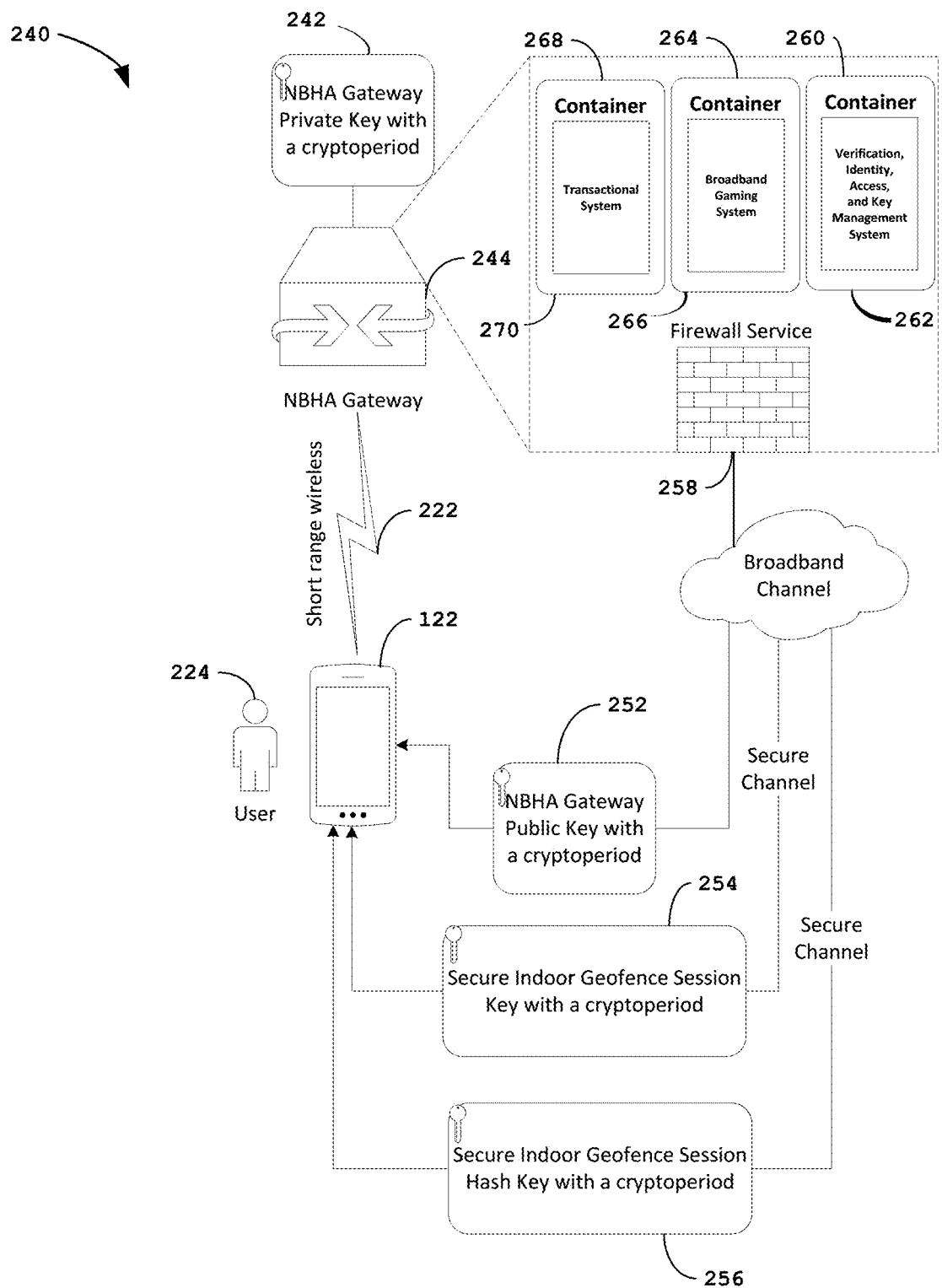
FIG. 2C shows a self-contained NBHA gateway for performing the SIG protocol.

Referring to FIG. 2C, the architecture 240 shows the dual channel provisioning of keys to a wireless device for secure indoor geofencing using a self-contained NBHA gateway 244. The self-contained NBHA gateway 244 includes a digitally signed NBHA gateway private key 242 that is preconfigured from the factory. Container technology 260, 264, and 268 is used to maintain a separate namespace from the Operating System (OS) for additional security.

A broadband gaming system 266, a transactional system 270, and a verification system 262 are provided by a self-contained implementation running on the NBHA gateway 244. Furthermore, networked gateways in a message passing model could provide fault tolerant mechanisms for greater service levels and high availability applications. A NBHA gateway public key 252 is acquired by a wireless device 122 when user 224 is within the AoE or broadcast range of the short-range wireless 222. An authenticated user 224 is able to request, from the verification system 262, the generation of a symmetric session key with a TTL 254 and a hash key with a TTL 256 for the Secure Indoor Geofencing (SIG) module. A secure channel is established through secure HTTP over a Transport Layer Security. With respect to the illustrative firewall service 258, the firewall service may be configured to operate as software capable of packet filtering, deep packet inspection (DPI), intrusion detection system (IDS), and intrusion prevention system (IPS).

Figure 3A:
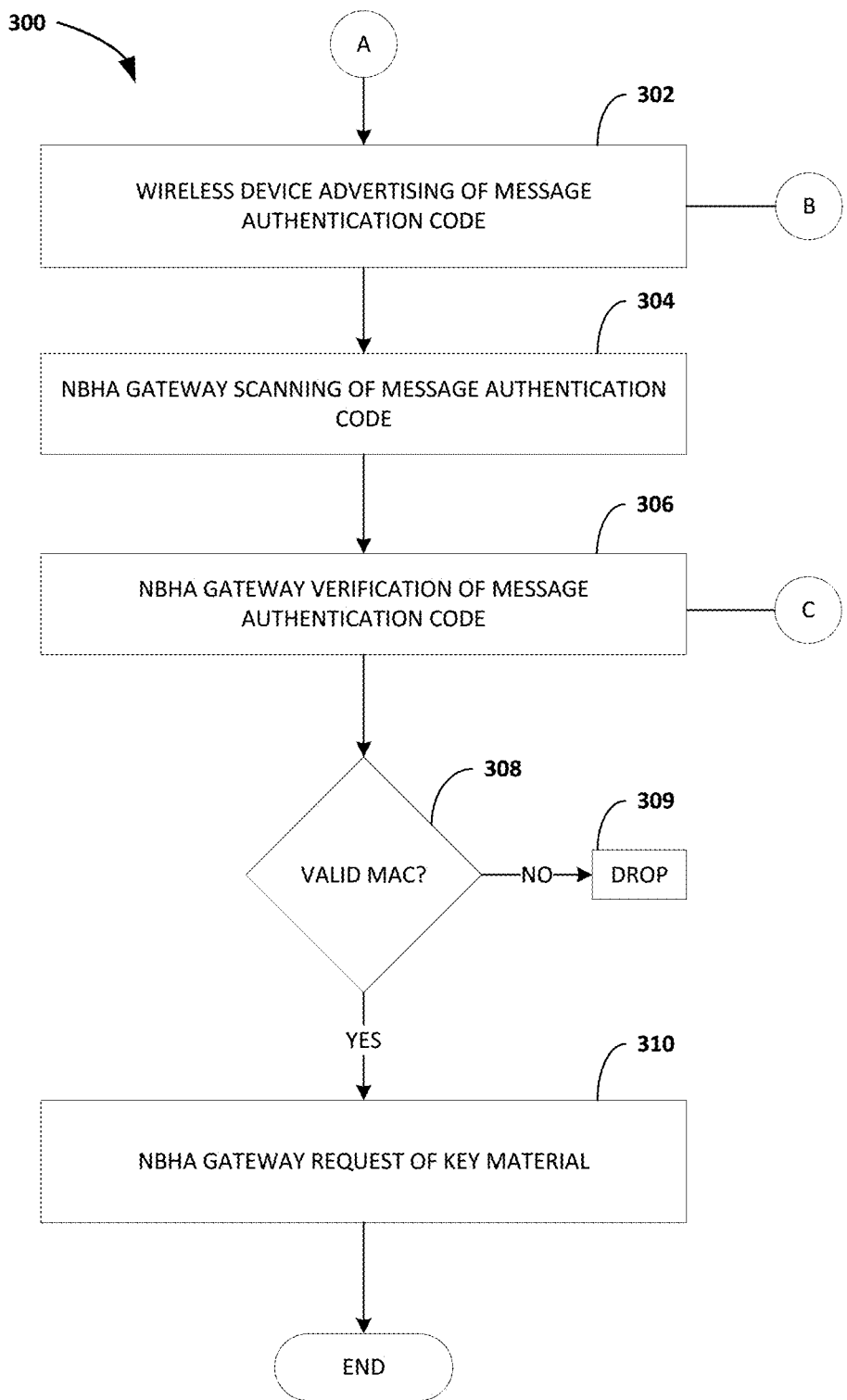
FIG. 3A shows an extension to the method of performing the SIG protocol of FIG. 2A.

Referring to FIG. 3A, there is shown a flowchart 300 continuing the method of performing the SIG protocol from FIG. 2A, where keys are provisioned through dual channel communication to a NBHA gateway for secure indoor geofencing. At block 302, a wireless device advertises an encrypted Message Authentication Code (MAC) of a user session including a device ID using a wireless device and the public key of the NBHA gateway. At block 304, the NBHA gateway scans for encrypted advertisement packets from wireless devices. At block 306, the NBHA gateway verifies the MACs by decrypting the advertised packets and private key(s). At decision diamond 308, the NBHA gateway whether to initiate/continue a session with the wireless device corresponding to the scanned packets and/or MACs or to drop such session. The MAC should correspond to a user session with device identification. If the MAC cannot be located in a transaction log or blockchain, then the request is dropped at block 309. Otherwise, the MAC is located in a transaction log or blockchain, and the session keys, which are stored as data objects, are supplied to the NBHA gateway at block 310.

Subsequent, requests are handled as hash requests of hyperlocal data objects (e.g., images, videos, documents, audio, keys, data blocks) through a secure Application Programming Interface (API). Furthermore, a hash is a one-way function used in this embodiment for data object indexing, filing, searching, identification, and content delivery.

Figure 3B:
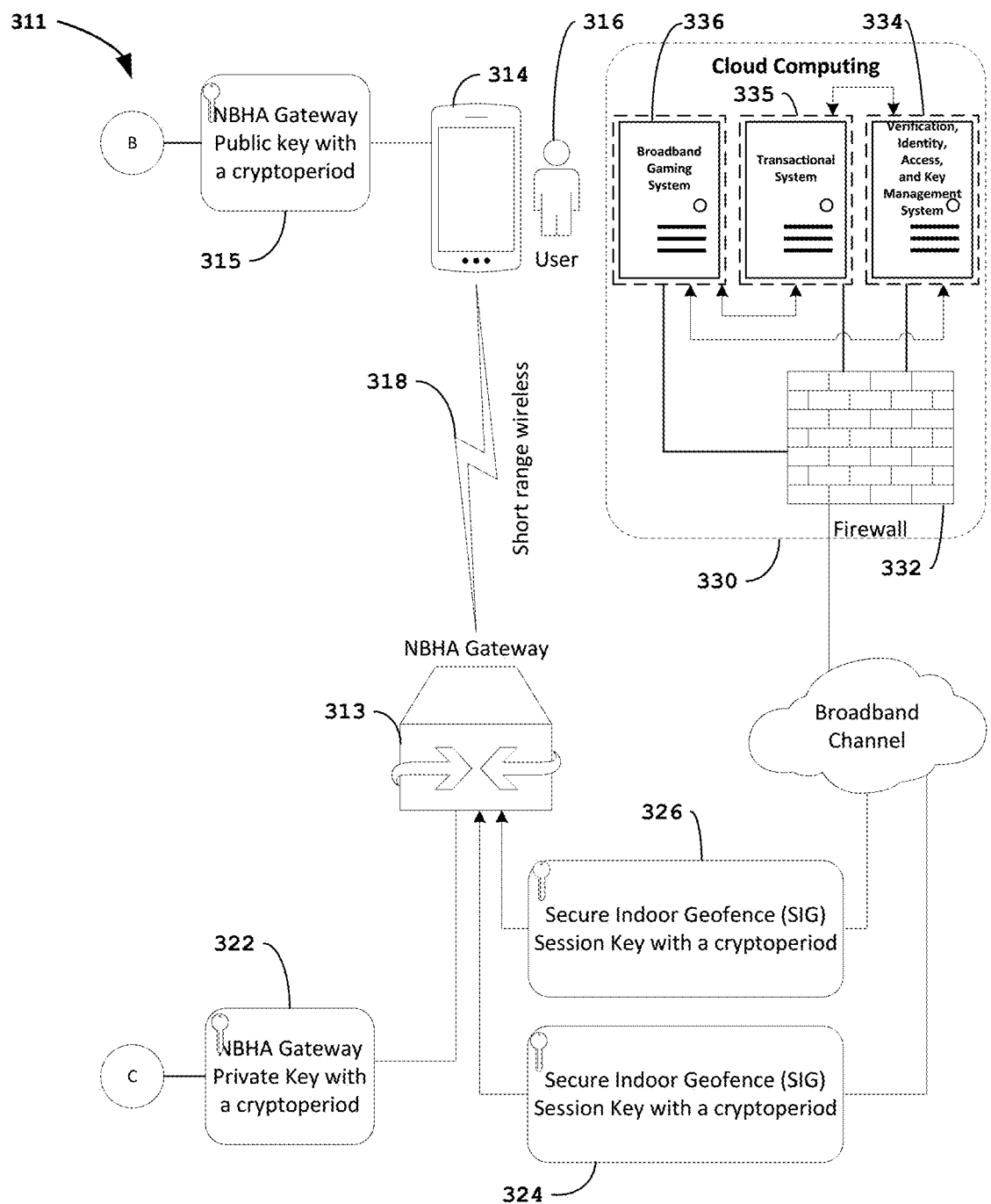
FIG. 3B shows a dual channel key provisioning system architecture for performing the method of FIG. 3A.

Referring now to FIG. 3B there is shown an illustrative architecture 311 for an NBHA system integrated into the method FIG. 3A that facilitates dual channel provisioning of keys to an NBHA gateway 313 for secure indoor geofencing. The architecture is composed of a NBHA gateway Public key 315 stored in a wireless device 314 operated by a user 316. The wireless device 314 and the NBHA gateway 313 are equipped with a short-range wireless 318 radio. An NBHA gateway Private Key 322 is provided at the factory and renewed following the cryptoperiod established by NIST. The user session includes a symmetric session key with TTL 326 and a hash key with TTL 324 for the Secure Indoor Geofencing (SIG) module. A cloud computing environment 330 provides capabilities for virtual machine services such as a Broadband Gaming System 336, a Transactional system 335, and a Verification System 334. The illustrative firewall 332 provides packet filtering, deep packet inspection (DPI), intrusion detection system (IDS), and intrusion prevention system (IPS).

Figure 3C:
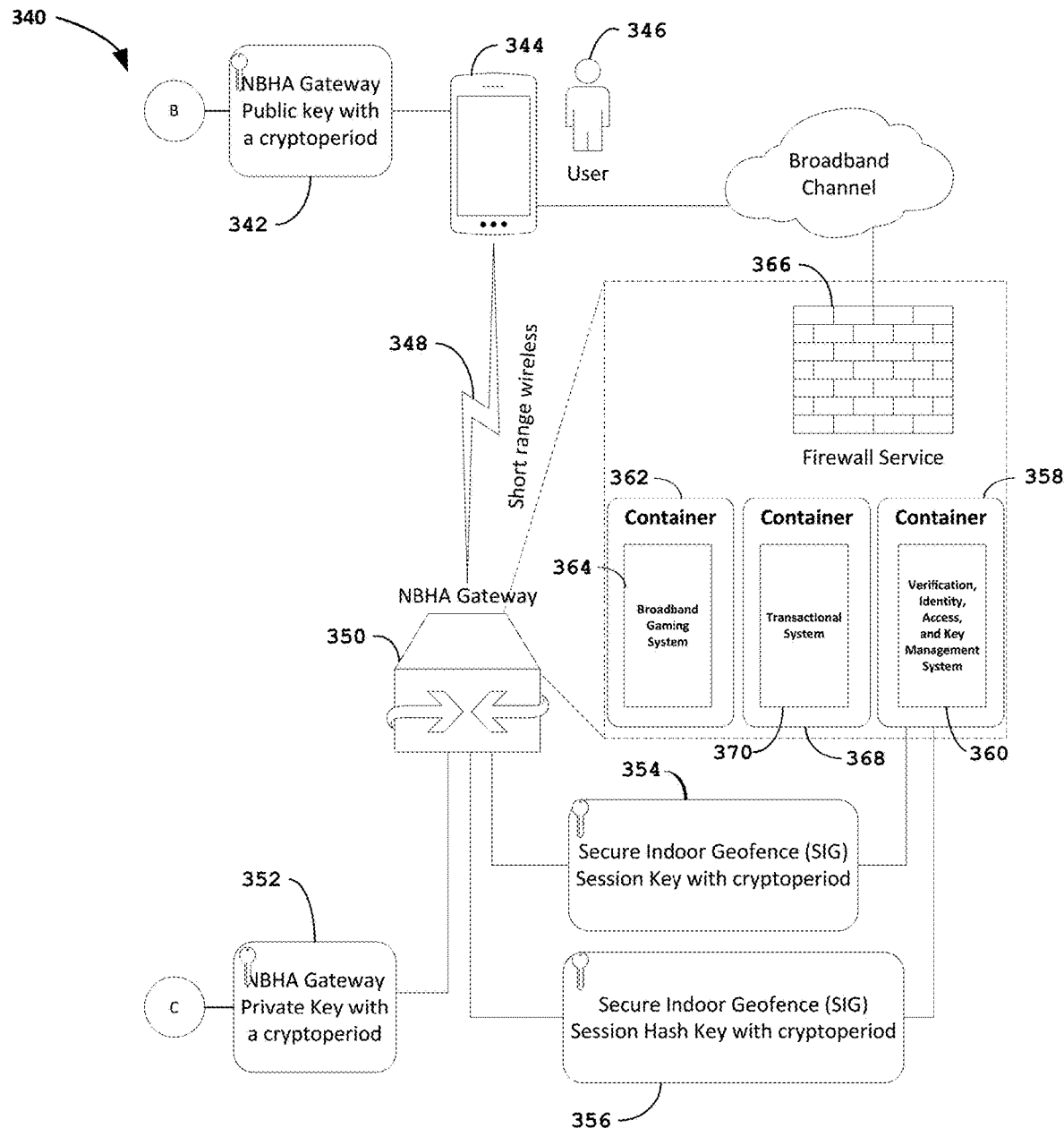
FIG. 3C shows another dual channel key provisioning system architecture for performing the method of FIG. 3A.

Referring to FIG. 3C, there is shown another illustrative architecture 340 for dual channel provisioning of keys for secure indoor geofencing using a self-contained NBHA gateway 350. This self-contained solution depends on containers 358, 362, and 368 to provide security namespace isolation to a Broadband Gaming System 364, a Transactional System 370, and a Verification System 360. A software firewall 366 provides packet filtering, deep packet inspection (DPI), intrusion detection system (IDS), and intrusion prevention system (IPS). The self-contained design includes a NBHA gateway Public key 342 stored in a wireless device 344 operated by a user 346. The wireless device 344 and the self-contained NBHA gateway 350 are each equipped with short-range wireless radios operating on a short range wireless communication channel 348. Additionally, a NBHA gateway Private Key 352 is provisioned from the factory and renewed following the cryptoperiod established by NIST. The user session includes a symmetric session key with TTL 354 and a hash key with TTL 356 for the Secure Indoor Geofencing (SIG) module.

The Secure Indoor Geofencing (SIG) module leverages an advertising and discovery model to conduct secure interactive sessions. A plurality of low energy wireless technologies such as BLE, Zigbee, NFC, RFID, and Low Power Wi-Fi are suitable to carry out the capabilities and characteristics of the SIG module. In this embodiment, a low energy wireless technology with packet advertising and discovery capabilities, including but not limited to BLE, is used as a short-range wireless channel. In short range wireless communication technology, such as Bluetooth Low Energy (BLE), any central device can receive advertising packets from a peripheral device. Effectively, the minimum requirements for SIG operation are advertising and discovery capabilities which are provided by a plurality of low energy wireless technologies.

Figure 4A:
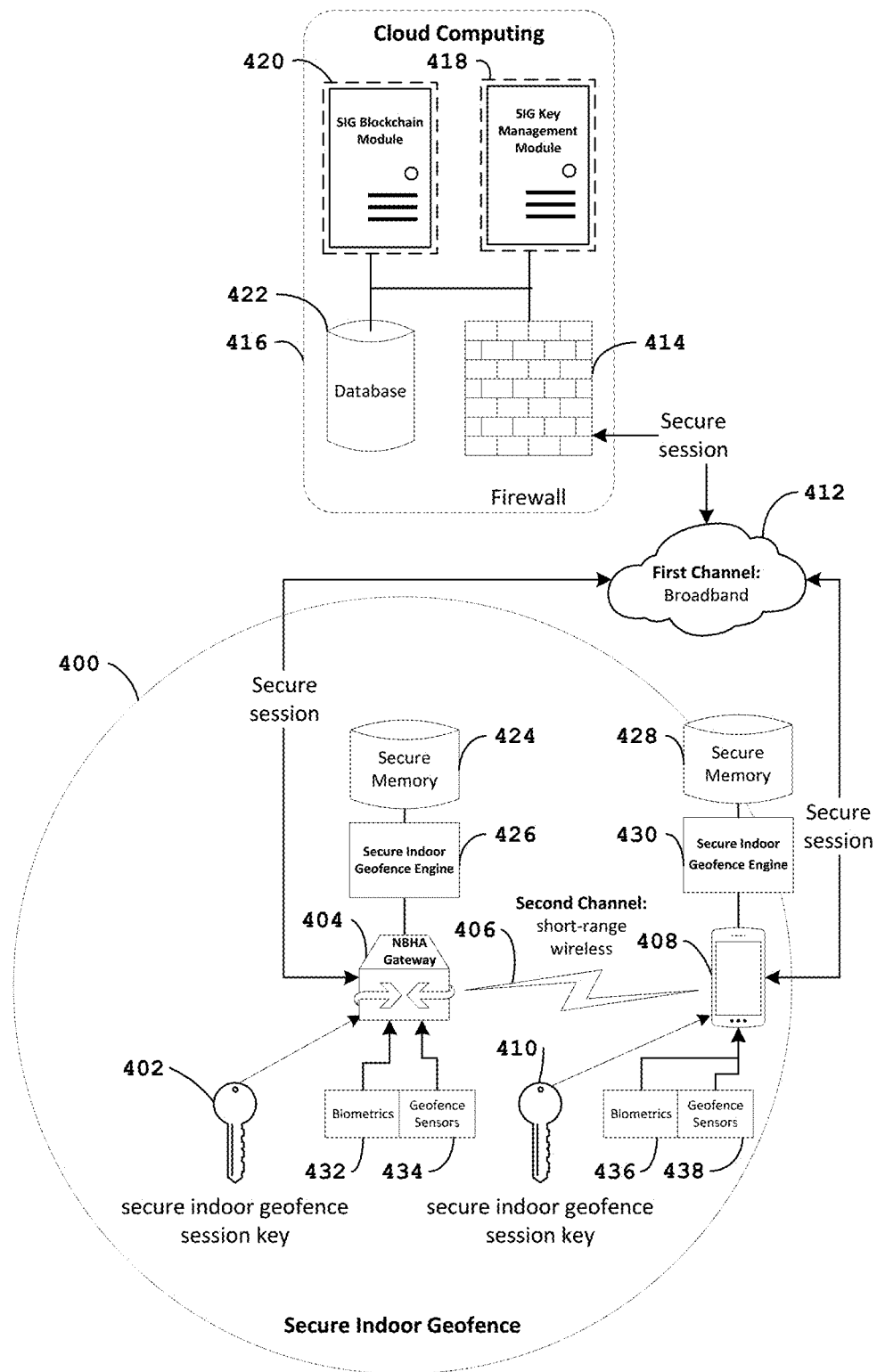
FIG. 4A shows a cooperative cloud computing architecture for dual channel key provisioning.

Referring to FIG. 4A there is shown a cooperative cloud computing architecture 416 with the NBHA gateway 404 and a wireless device 408 using the first broadband channel 412 and the second short-range wireless channel 406 for authentication and secure delivery of data objects in a Secure Indoor Geofence (SIG) 400.

The Secure Indoor Geofence (SIG) 400 is bounded by the range of the wireless short-range radio 406. This broadcast range may be controlled by moderating the transmission power of the signal, or impeding signal transmission with physical barriers such as a Faraday cage or other signal attenuation mechanisms.

The secure indoor geofence session key 402 is equivalent to the secure indoor geofence session key 410, and used for authentication and security. The secure indoor geofence key 402 is provisioned to the NBHA gateway 404 from a SIG key management module 418 through a secure session (e.g., TLS) using a first broadband channel 412. Meanwhile, the secure indoor geofence key 410 is provisioned to the wireless device 408 by the SIG key management module 418 through the secure session using the first broadband channel 412.

The illustrative embodiment of FIG. 4A includes a Cloud Computing 416 architecture with a virtualized environment. The cloud services include a SIG blockchain module 420, a SIG Key Management Module 418, an illustrative database 422, and an illustrative firewall 424.

The SIG Blockchain Module 420 offers location-based transaction integrity, irreversibility, and programmable transaction logic. Meanwhile, the SIG Key Management Module 418 provides key lifecycle capabilities such as key generation, pre-activation, activation, expiration, post-activation, escrow, and destruction. Further capabilities of the SIG Key Management Module 418 include logical access and user/role-based access to secure indoor geofence session keys 402 and 410.

The illustrative database 422 may be one or more data lakes, data warehouses, data in motion, data at rest, or any combination thereof. The illustrative firewall 414 represents a plurality of industry standards providing layers of security including but not limited to packet filtering and deep packet inspection.

The Secure Indoor Geofence Engine 426 running in the NBHA gateway 404 and the Secure Indoor Geofence Engine 430 running in the wireless device 408 are equivalent software modules, but the system implementation at the NBHA gateway 404 and the wireless device 408 may vary as to software or hardware. The secure memory 424 of the NBHA gateway and the secure memory 428 of the wireless device provide memory storage for intermediate operations performed by the Secure Indoor Geofence Engine 426 of the NBHA gateway and the Secure Indoor Geofence Engine 430 of the wireless device, respectively, required for computing environments with a high-security level.

Security Level 1, Level 2, Level 3, and Level 4 defined in the security requirements for cryptographic modules by NIST to protect sensitive information. The security levels permit cost-effective solutions that are suitable for a variety of different classification programs.

The NBHA gateway 404 and the wireless device 408 each include respective authenticated biometrics 432 and 436. In various embodiments, the authenticated biometrics 432 and 436 may include checks from sensors capable of obtaining security features from DNA matching, ear shape, eyes (iris and retina), facial recognition, fingerprint recognition, finger geometry recognition, gait style, hand geometry, odor, signature recognition, typing recognition, vein recognition, voice recognition, and any combination thereof.

Additionally, the NBHA gateway 404 and the wireless device 408 each include respective authenticated geofence sensors 434 and 438. In various embodiments, the authenticated geofence sensors 434 and 438 may include location-based sensors capable of measuring a plurality of indoor features including but not limited to video, audio, temperature, pressure, motion detection, humidity, latitude, longitude, altitude, or any combination thereof for characterization of the Secure Indoor Geofence 400.

Figure 4B:
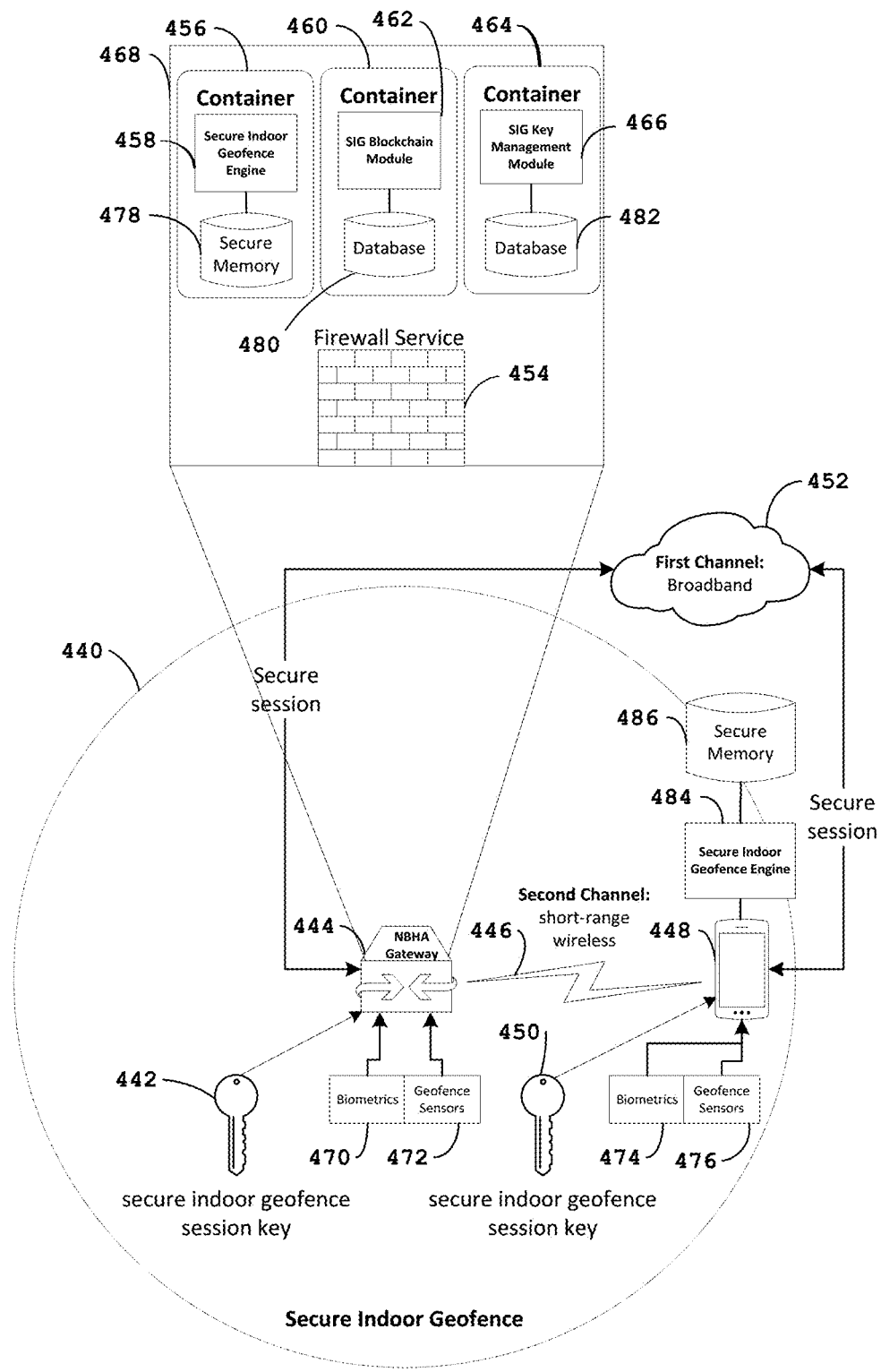
FIG. 4B shows a self-contained architecture for dual channel key provisioning.

Referring now to FIG. 4B, there is shown a self-contained architecture 468 with the NBHA gateway 444 and a wireless device 448 communicating using the first broadband channel 452 and the second short-range wireless channel 446 for authentication and secure delivery of data objects in a Secure Indoor Geofence (SIG) 440. The Secure Indoor Geofence (SIG) 440 is bounded by the range of the wireless short-range radio 446. The range of the wireless short-range radio 446 is limited, moderated, or curtailed through two principal methods: (1) by controlling the transmission power of the signal; and (2) with physical barriers, such as a Faraday cage or signal attenuation mechanisms.

The secure indoor geofence session key 442 is equivalent to the secure indoor geofence session key 450 used for authentication and security. The secure indoor geofence key 442 is provisioned to the NBHA gateway 444 from a SIG Key Management Module 466 running in container 464 through a secure session (e.g., TLS) using a first broadband channel 452. Meanwhile, the secure indoor geofence key 450 is provisioned to the wireless device 448 by the SIG Key Management Module 466 running in container 460 through the secure session using the first broadband channel 452.

The illustrative embodiment of FIG. 4B includes a self-contained architecture 468 with container technology. The services include the Secure Indoor Geofence Engine 458 running in container 456, the SIG Blockchain Module 462 running in container 460, the SIG Key Management Module 466 running in container 464, the illustrative databases 480 and 482, and an illustrative firewall 454.

The SIG Blockchain Module 462 running in container 460 offers location-based transaction integrity, irreversibility, and programmable transaction logic. Meanwhile, the SIG Key Management Module 466 running in container 464 provides key lifecycle capabilities such as key generation, pre-activation, activation, expiration, post-activation, escrow, and destruction. Further capabilities of the SIG Key Management Module 466 running in container 464 include logical access and user/role-based access to secure indoor geofence session keys 442 and 450.

The illustrative databases 480 and 482 may be one or more data lakes, data warehouses, data in motion, data at rest, or any combination thereof. The illustrative firewall 454 represents a plurality of industry standards providing layers of security including but not limited to packet filtering and deep packet inspection.

The Secure Indoor Geofence Engine 458 running in container 456 and the Secure Indoor Geofence Engine 484 running in the wireless device 448 are equivalent methods, but the system implementation may vary in software or hardware. The secure memory 478 and 486 provide memory storage for intermediate operations performed by the Secure Indoor Geofence Engine 458 and 456 required for computing environments of high-security level.

Authenticated biometrics 470 and 474 include checks from sensors capable of obtaining security features from DNA matching, ear shape, eyes (iris and retina), face recognition, fingerprint recognition, finger geometry recognition, gait style, hand geometry, odor, signature recognition, typing recognition, vein recognition, voice recognition, or any combination thereof.

Authenticated geofence sensors 472 and 476 include location-based sensors capable of measuring a plurality of room features including but not limited to video, audio, temperature, pressure, motion detection, humidity, latitude, longitude, and altitude for characterization of the Secure Indoor Geofence 440.

Figure 5A:
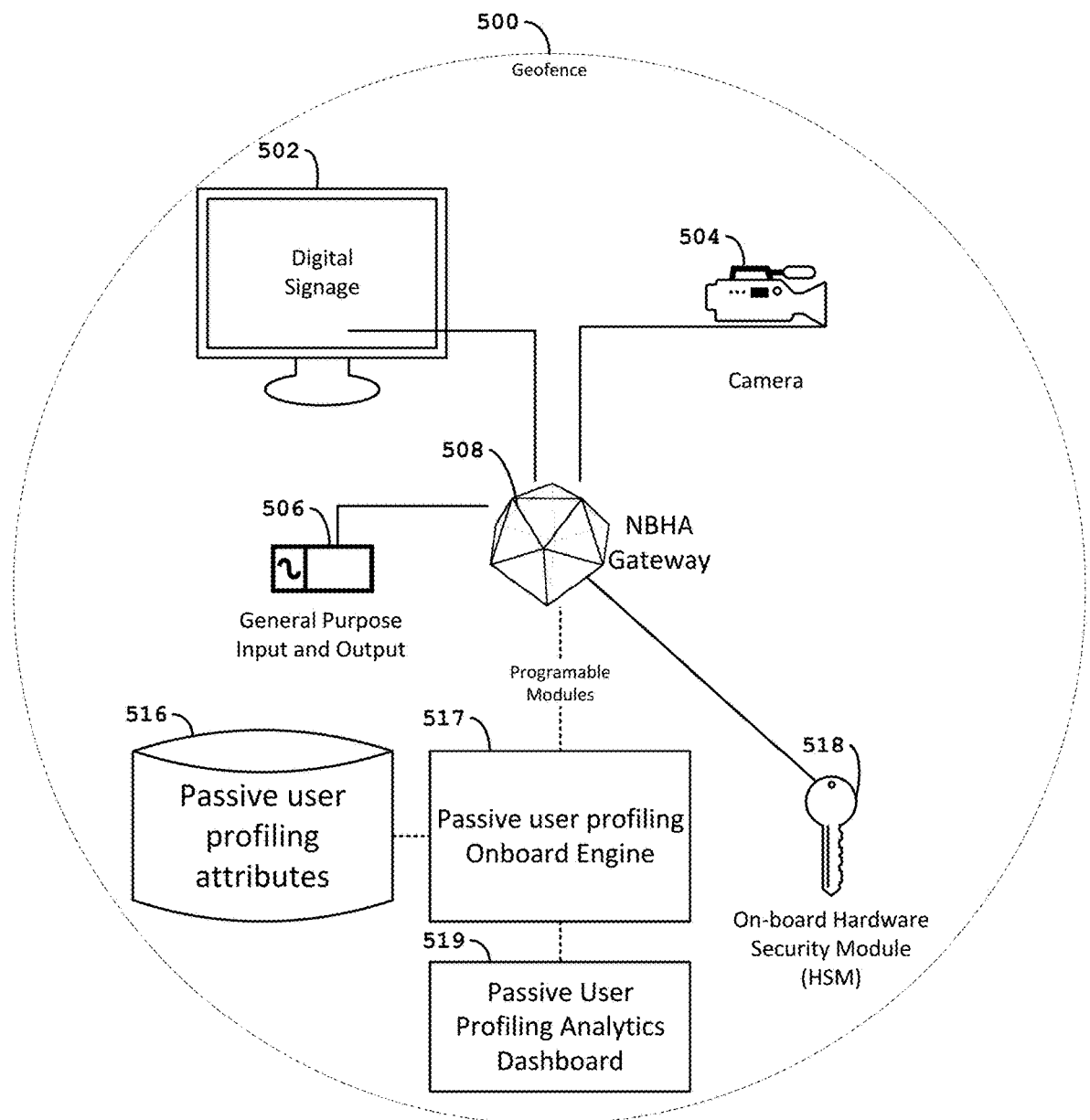
FIG. 5A shows a geofence surrounding a self-contained wireless network-based passive user profiling system.

Referring to FIG. 5A there is shown a geofence 500 surrounding a self-contained implementation of wireless network-based passive user profiling. The implementation includes the geofence 500, a digital signage screen 502, a video feed 504, a general purpose Input and Output (I/O) 506, a NBHA gateway 508, a passive user profiling attributes database 516, a passive user profiling on-board engine 518, an onboard hardware security module (HSM) 520, and a passive user profiling analytics dashboard 522.

Figure 5B:
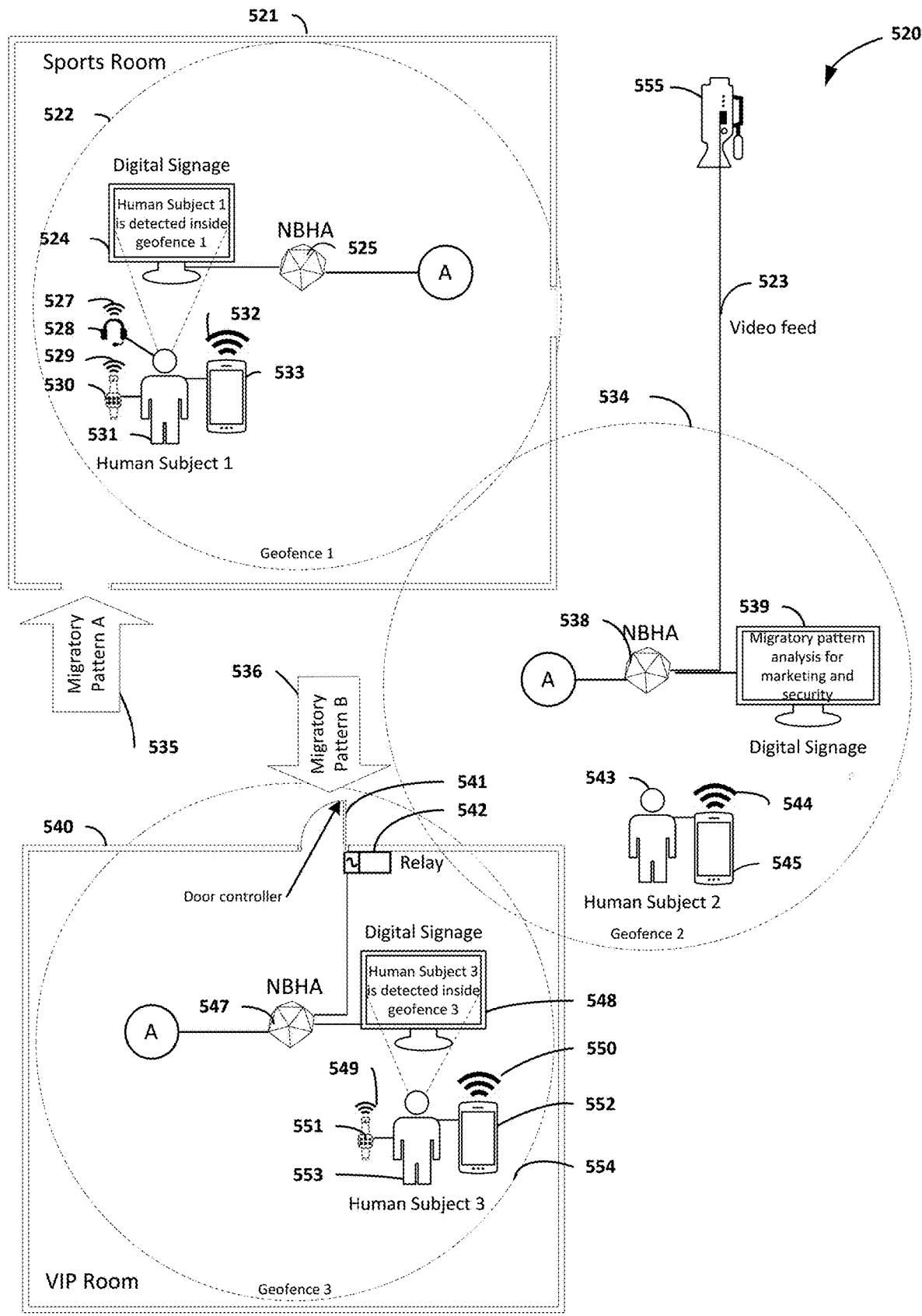
FIG. 5B shows a map layout of multiple NBHA gateways in a particular facility.

Referring to FIG. 5B, there is shown a map layout 520 of multiple NBHA gateways 525, 538, 547 in a certain facility for wireless network-based passive user profiling. The illustrative map layout 520 shows the NBHA gateways 525, 538, 547 in a sports room 520, a VIP Room 540, and an entrance hall. Each NBHA gateway 525, 538, 547 generates and/or is surrounded by a corresponding geofence 522, 534, 554, respectively. Within the area bounded by each geofence 522, 534, 554, is a corresponding digital signage screen 524, 539, 548. Each digital signage 524, 539, 548 is communicatively coupled to the NBHA gateway 525, 530, 547 in the geofence surrounding each digital signage. For example, NBHA gateway 525 generates geofence 522, which surrounds the NBHA gateway 525 and digital signage 524 to which the NBHA gateway 525 is coupled. NBHA gateway 547 is further communicatively coupled to a relay 542 with an interface to a door controller 541 located within the corresponding geofence 554. NBHA gateway 534 is further communicatively coupled to a camera 523 generating a video feed 555, such that the video feed 555 is transmitted to the NBHA gateway 534.

Customer 531, customer 543, and customer 553 are associated with mobile device 533, mobile device 545, and mobile device 552, respectively. Each of the mobile devices emits RF signals 532, RF signals 544, and RF signals 550, which correspond to mobile device 533, mobile device 545, and mobile device 552, respectively. Other BLE devices, such as a headset 528, emit RF signals 527. Smartwatches 530 and 551 emit RF signals 529 and 549, respectively.

An illustrative migratory pattern A 535 is shown as an arrow and another illustrative migratory pattern B 536 is shown by another arrow. These migratory patterns 535 and 536 can be used for event-based A/B testing.

Figure 5C:
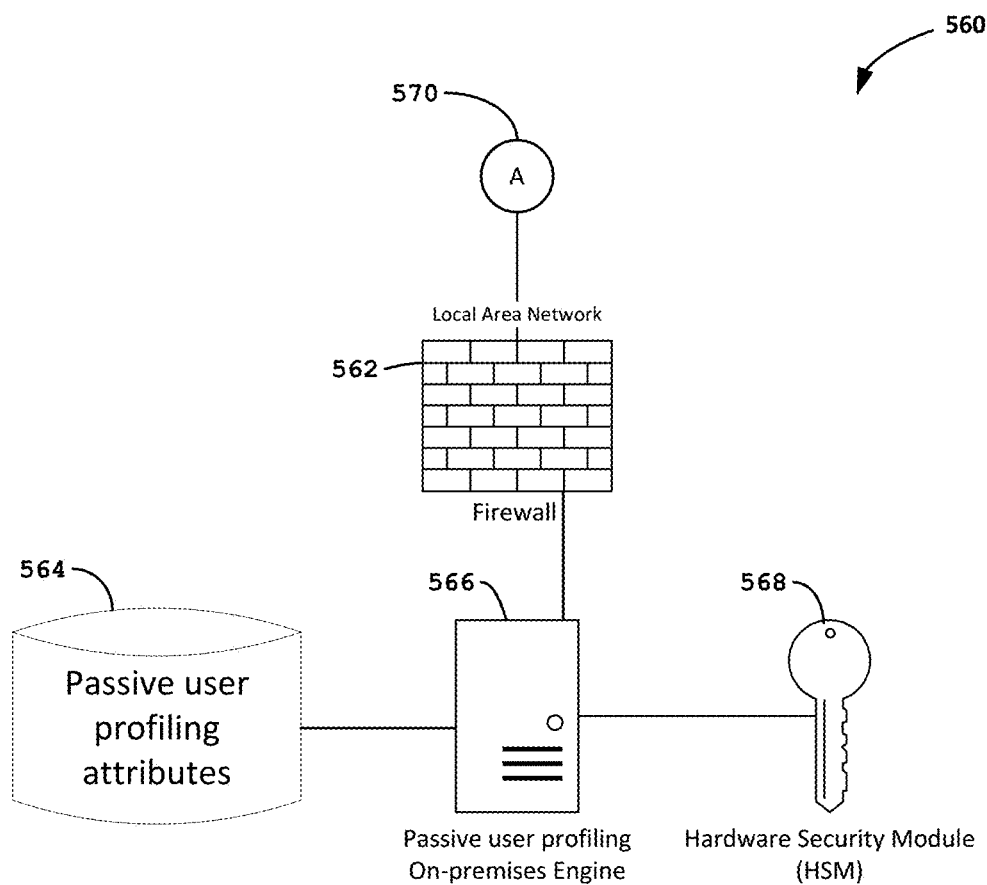
FIG. 5C shows an on-premises architecture for a wireless network-based passive user profiling system.

The diagram in FIG. 5C shows an on-premises architecture of wireless network-based passive user profiling 560. The on-premises architecture 560 comprises a firewall 562, a passive user profiling attributes database 564, a passive user profiling on-premises engine 566, and a hardware security module (HSM) 568. Connector symbol A 570 illustrates how the NBHA gateways 525, 538, 547 of FIG. 5B couple to the on-premises architecture 560 through the firewall 562.

Figure 5D:
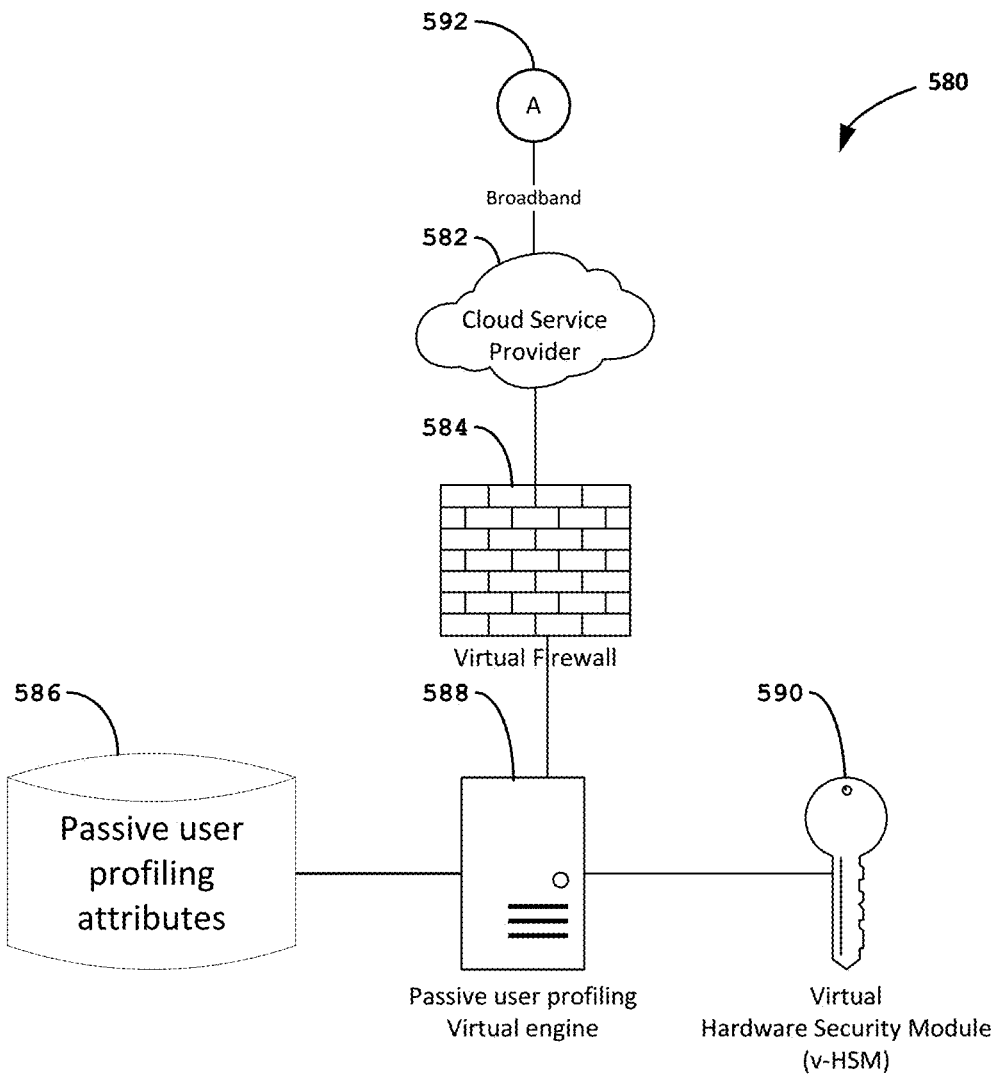
FIG. 5D shows a cloud computing architecture for a wireless network-based passive user profiling system.

The diagram in FIG. 5D shows a cloud computing architecture of wireless network-based passive user profiling 580. The cloud computing architecture 580 comprises a cloud service provider 582, a virtual firewall 584, a passive user profiling attributes database 586, a passive user profiling virtual engine 588, and a virtual hardware security module 590. Connector symbol A 592 illustrates how the NBHA gateways 525, 538, 547 of FIG. 5B couple to the cloud computing architecture 580 through the virtual firewall 584.

Figure 6A:
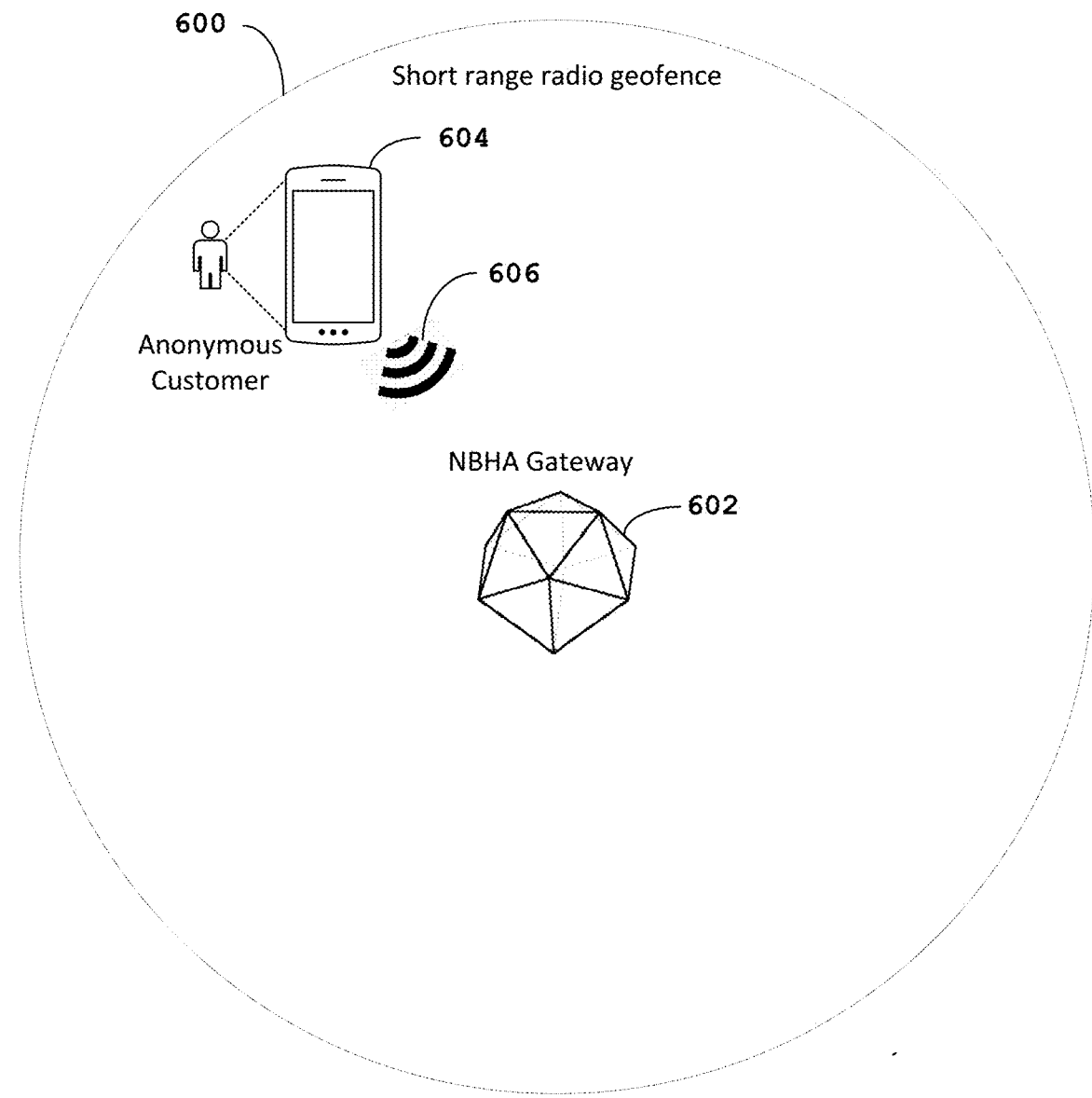
FIG. 6A shows an exemplary geofence.

Referring to FIG. 6A, there is shown an exemplary geofence 600. The geofence 600 is generated by a Network Based Hyperlocal Authentication (NBHA) gateway 602 controlling a short-range radio, so that the geofence 600 surrounds the NBHA gateway 602. More specifically, the illustrative NBHA gateway 602 controls the short-range radio geofence 600 for detecting an anonymous wireless device 604 transmitting wireless signals 606 within the geofence 600.

The illustrative gateway 602 is in a fixed location, i.e., stationary and networked. However, in other embodiments, the gateway may also be mobile and not restricted to a fixed location. By way of example and not of limitation, the mobile gateway may be associated with a mobile application executed on a "smart" watch or in a "smart" vehicle, e.g., an autonomous vehicle. Other illustrative mobile gateway embodiments may include a drone, a robot, or other such mobile devices. More generally, the gateway receives RF emissions from wireless devices capable of executing an application and communicates these received RF emissions to a networked component, e.g., a network storage device that is communicatively coupled to the gateway.

The NBHA gateway, systems and methods described herein operate by gathering "RF emissions," also referred to as "RF leakage," from wireless devices, e.g., smartphones. In the illustrative embodiments presented herein, RF emissions received by the stationary gateway are associated with open network protocols such as Bluetooth Classic and Bluetooth Low Energy. Additionally, the RF emissions may be gathered from Wi-Fi, GSM, LTE, 5G, Near-Field Communication (NFC), Radio-Frequency Identification (RFID), and other such protocols or standards that are used for wireless communications.

Note, the terms "RF emissions" and "RF leakage" are used interchangeably in this patent unless otherwise indicated. More specifically, the term "RF leakage" denotes that RF emissions are gathered anonymously; thus, the term "RF leakage" is associated with anonymous users. The term "RF emissions" is more generic and may be associated with an anonymous user, a registered user, or an anonymous registered user. In an alternative embodiment, the anonymous registered user may be a user that is registered with a false name.

In one illustrative embodiment, a plurality of the stationary gateways are networked and are associated with an particular casino property. This illustrative casino property has at least six different market activities that includes a hotel, food and beverage, entertainment, retail stores, gaming, and security. RF emissions generated by smartphones are captured by one or more of the plurality of stationary NBHA gateways. The NBHA gateways then communicate the RF emissions to a cloud based storage device via a Wide Area Network such as the Internet. In an alternative embodiment, the NBHA gateways communicate the RF emissions to a local storage device using a Local Area Network (LAN). The cloud based storage device and/or local storage device includes a database that is configured to receive the RF emissions data from the stationary gateways.

An analytics module accesses the RF emissions database and generates a variety of different "visualizations" of the RF emissions. In the illustrative embodiment, the visualization generated by the analytics module is presented on a browser that is accessible on a client device such as a laptop, PC, smartphone, tablet, or other such devices.

The NBHA gateway 602 is connected to the network and can receive information from the network. This functionality can be used to do everything from controlling the Bluetooth (BT) transmit power from a central location, to increased security of the network based indoor positioning.

The NBHA gateway 602 is unique because it includes a sophisticated Bluetooth scanner that is networked and can be controlled from a centralized Network Operations Center (NOC). Additionally, there are many Bluetooth radios in the NBHA gateway scanner that perform various functions described as follows. The NBHA gateway is able to control the BT "ping" signal centrally (from the NOC) to determine more accurately the location of the BT devices. This more accurate location determination is enabled because the NBHA gateway 602 triggers a user device "pong" or acknowledgment (ACK). Additionally, the NBHA gateway can extract the unique identifier from the "pong" or ACK with the NBHA Bluetooth scanner. Furthermore, the NBHA gateway can perform security functions and detect rogue devices using the Bluetooth scanner.

Note, anonymous user profiles can be developed with the NBHA gateways. The anonymous user profiles can be developed by collecting adequately accurate location data and associating time with the adequately accurate location data. Thus, an anonymous user can be characterized based on the particular movement of a person's wireless device (and the person) in various localized areas and the amount of time they spend in these particular areas. For example, a person may be labeled a "foodie" if they spend most of their time in restaurants. If a person spends most of their time in the table games section of a casino property, the person may be classified as a "table game player."

Real-time event-based A/B testing can also be supported by the NBHA gateways. Real-time event-based testing is supported by measuring the changes in populations in a particular area. Real-time event-based testing operates by identifying an event that has a location and time and then tracking the customer's movement through the movement of their associated wireless client device (or lack of movement) before the event, during the event, and after the event. Discrete time intervals can be used to monitor for changes in the customer's movement so that real-time customer feedback regarding the event can be received without the need for a customer survey or tracking customer clicks with a downloadable mobile app.

Figure 6B:
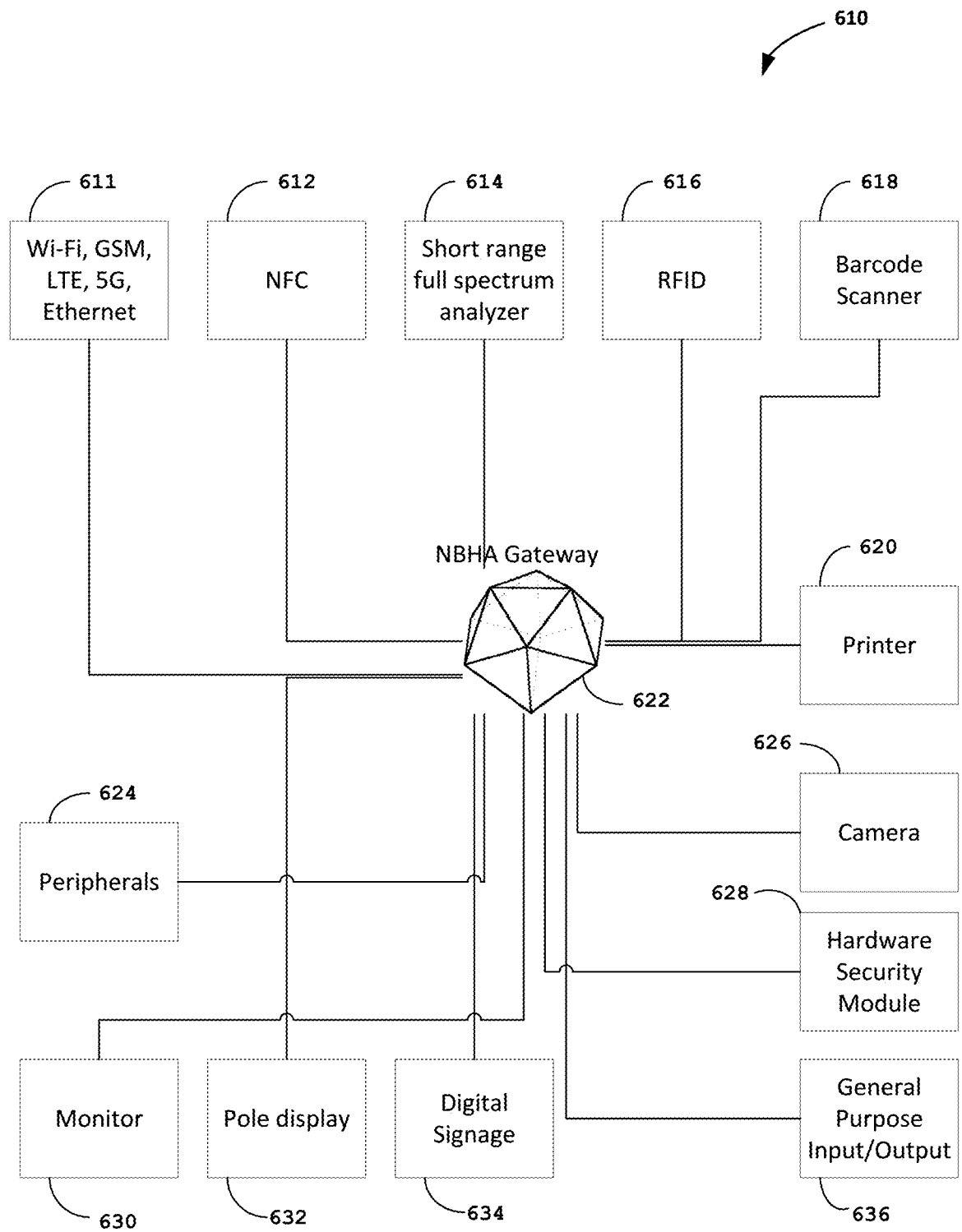
FIG. 6B shows an gateway interface architecture.

Referring to FIG. 6B, there is shown a gateway interface architecture 610. The gateway interface architecture 610 includes a plurality of interfaces that are communicatively coupled to an illustrative NBHA gateway 622. The interfaces may be associated with short-range transmitters, short-range receivers, short-range transceivers, sensors, ports (e.g., USB ports), and any combination thereof. One or more of these short-range transceivers may operate to communicatively couple the interface to the NBHA gateway 622.

More specifically, the interfaces for the illustrative NBHA gateway 622 include radios 610 that support communications using various standards such as Wi-Fi, GSM, LTE, 5G and Ethernet. Other interfaces include, but are not limited to, a Near-field Communication (NFC) 612 interface, a short-range full spectrum analyzer 614, a Radio-Frequency Identification (RFID) sensor 616, a barcode scanner 618, a printer 620, a camera system 626, peripherals 624, monitor 630, pole display 632, a digital signage interface 634, a Hardware Security Module (HSM) 628 and a general purpose input/output (I/O) interface 636. The general purpose I/O interface may interface with a microphone, temperature sensor, and various chemical sensors such as gas sensors that detect methane, carbon monoxide, and hydrogen sulfide. The sensors may also operate in the aqueous phase and detect ammonia, oxygen, pH, and other such chemicals.

Figure 6C:
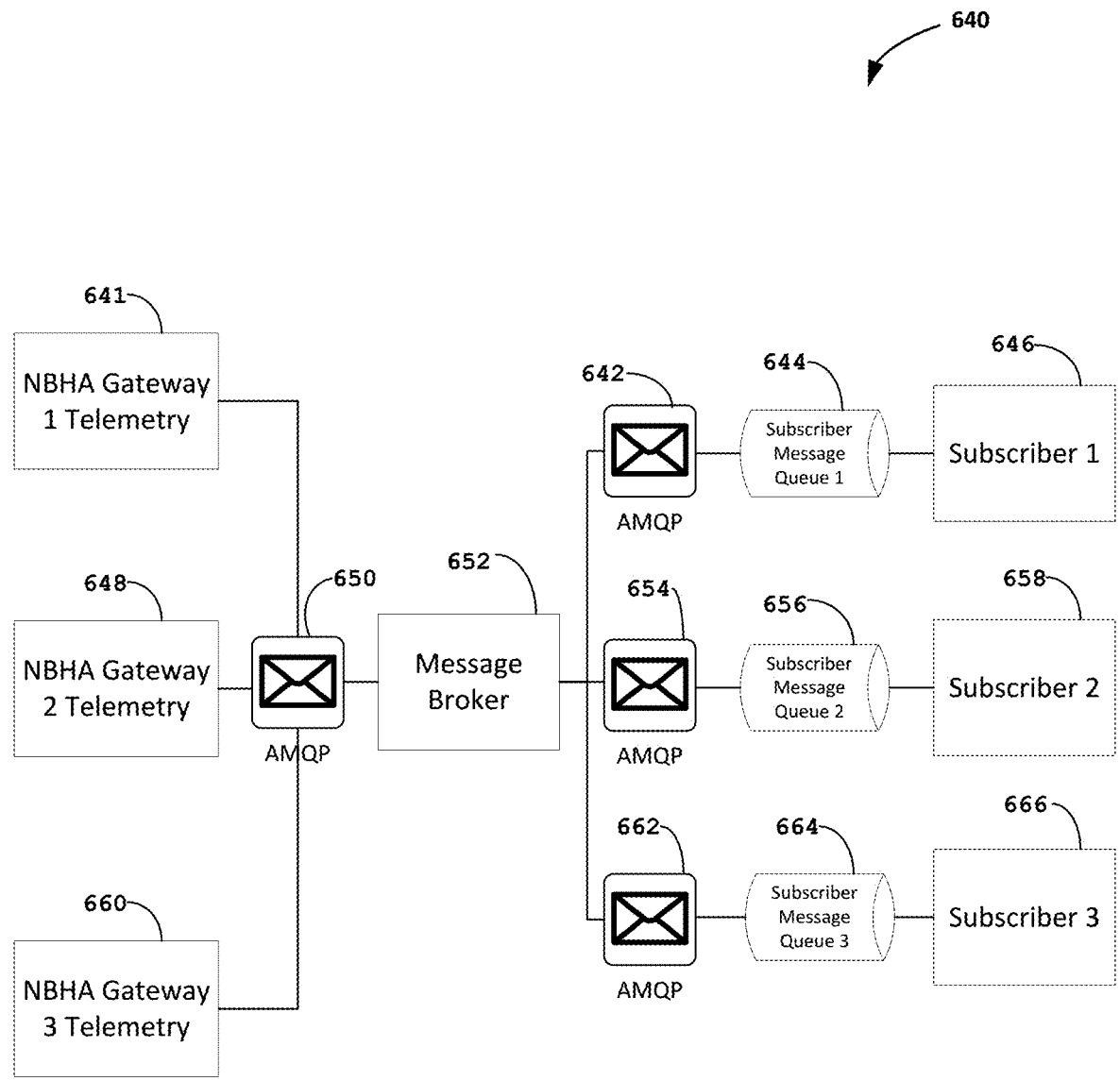
FIG. 6C shows a message queue design for networked gateways.

Referring to FIG. 6C, there is shown a message queue design 640 for networked gateways. The illustrative message broker 652 is communicatively coupled to a plurality of NBHA gateways 641, 648, 660. In the illustrative embodiment, NBHA gateways 641, 648, and 660 use message-oriented middleware such as Advanced Message Queuing Protocol (AMQP) 650 and communicate with the message broker 652, an AMPQ 642, an AMPQ 654, and AMPQ 662, subscriber message queue 1 644, subscriber message queue 2 656, subscriber message queue 3 664, subscriber 1 646, subscriber 2 658, and subscriber 3 666.

Figure 7A:
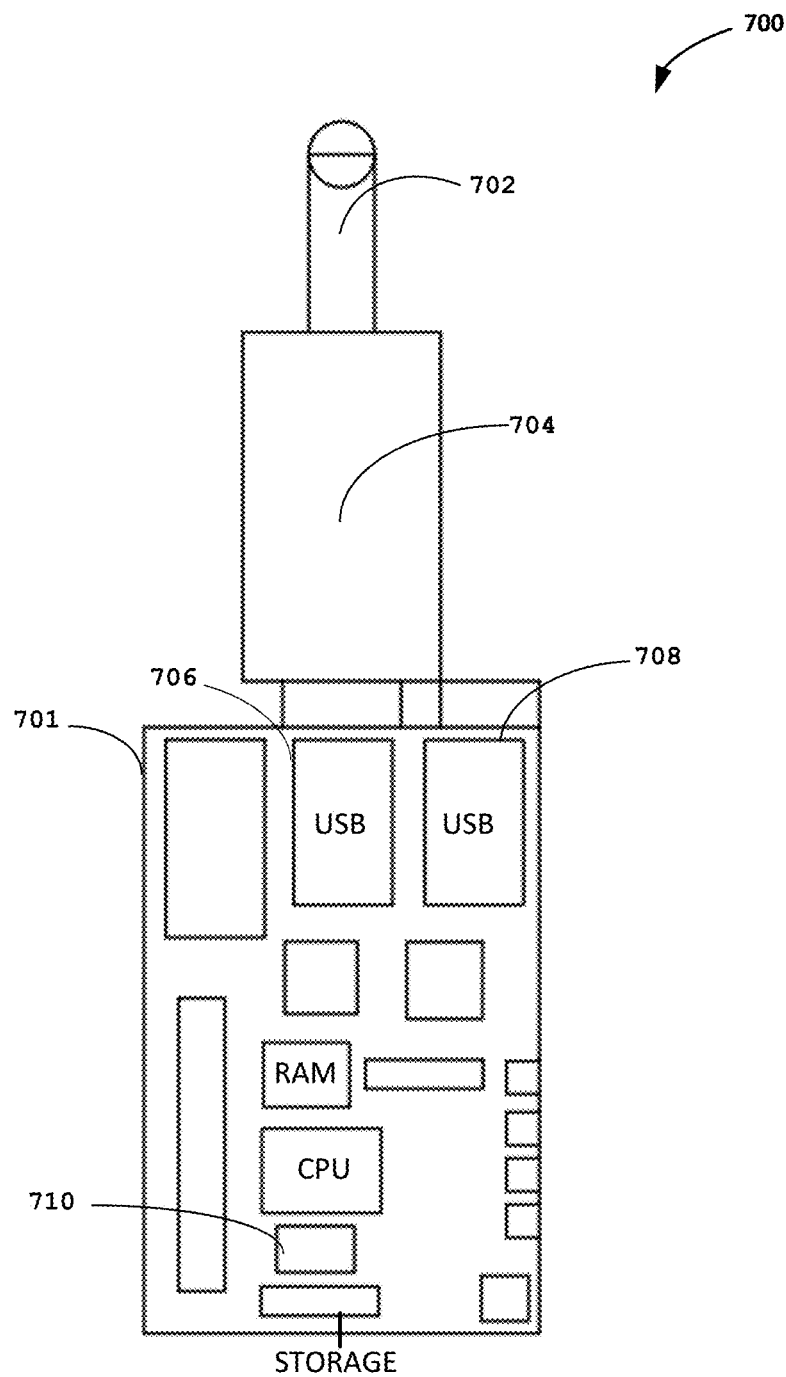
FIG. 7A shows an illustrative gateway constructions.

Referring to FIG. 7A, there is shown an illustrative NBHA gateway 700 construction. The NBHA gateway 700 is formed of a plurality of gateway components that include a computer board 701, a first USB dongle 706, a second USB dongle 708, an internal Bluetooth 5.0 module 710, a programmable RF module 704, and an antenna 702. Further, the computer board 701 itself includes a CPU, RAM, and storage for code execution.

Figure 7B:
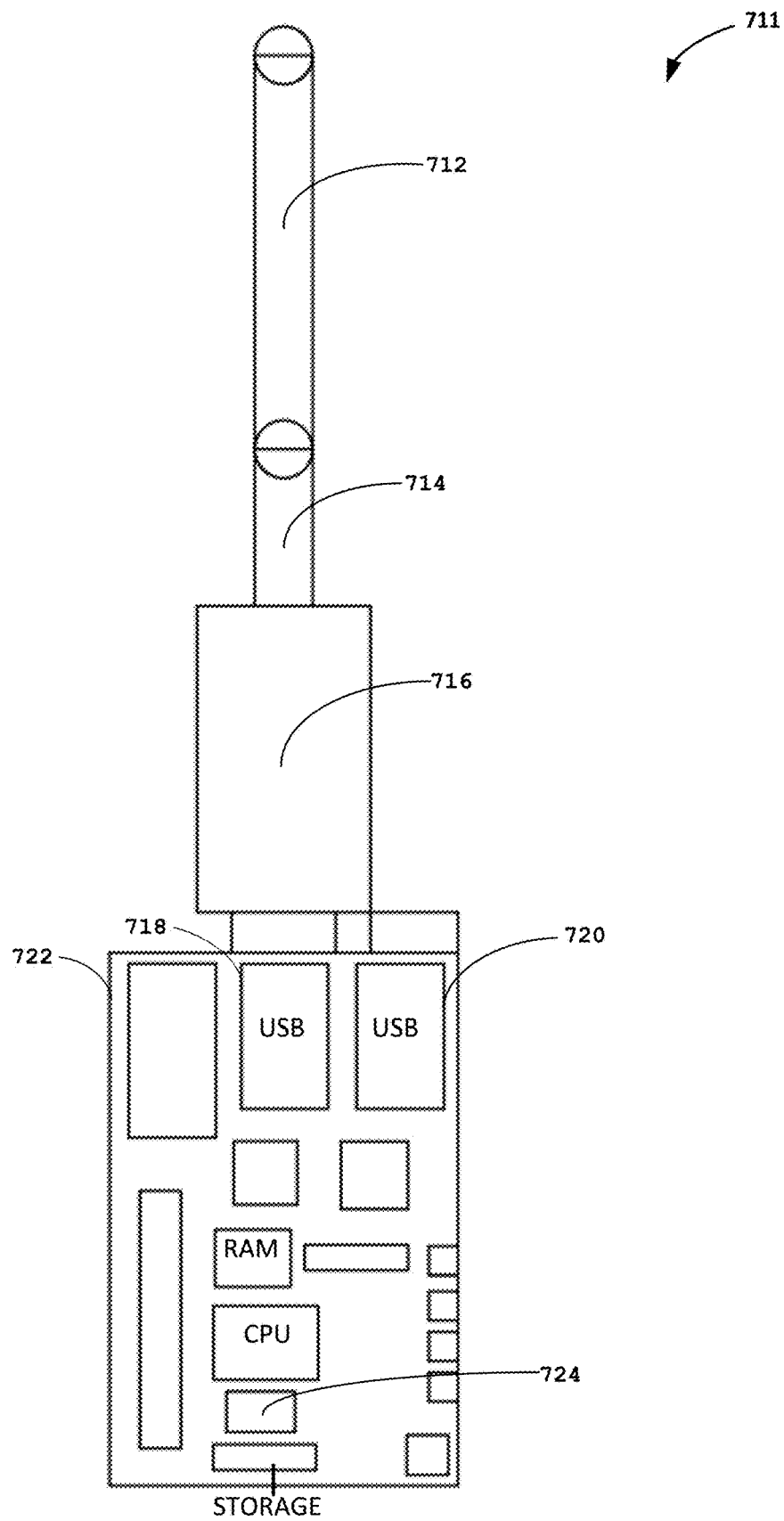
FIG. 7B shows an illustrative gateway construction with an omnidirectional antenna.

Referring to FIG. 7B, there is shown another illustrative NBHA gateway 711 with a plurality of sensors and an omnidirectional antenna design optimized for 2.4 GHz band applications. The illustrate NBHA gateway includes a computer board 722 having a CPU, RAM, and storage for code execution. Additionally, the Illustrative NBHA gateway includes a first USB dongle 718, a second USB dongle 720, an internal Bluetooth 5.0 module 724, a programmable RF module 716, and an omnidirectional antenna 712 and 714 that is designed and optimized for 2.4 GHz band applications.

Figure 7C:
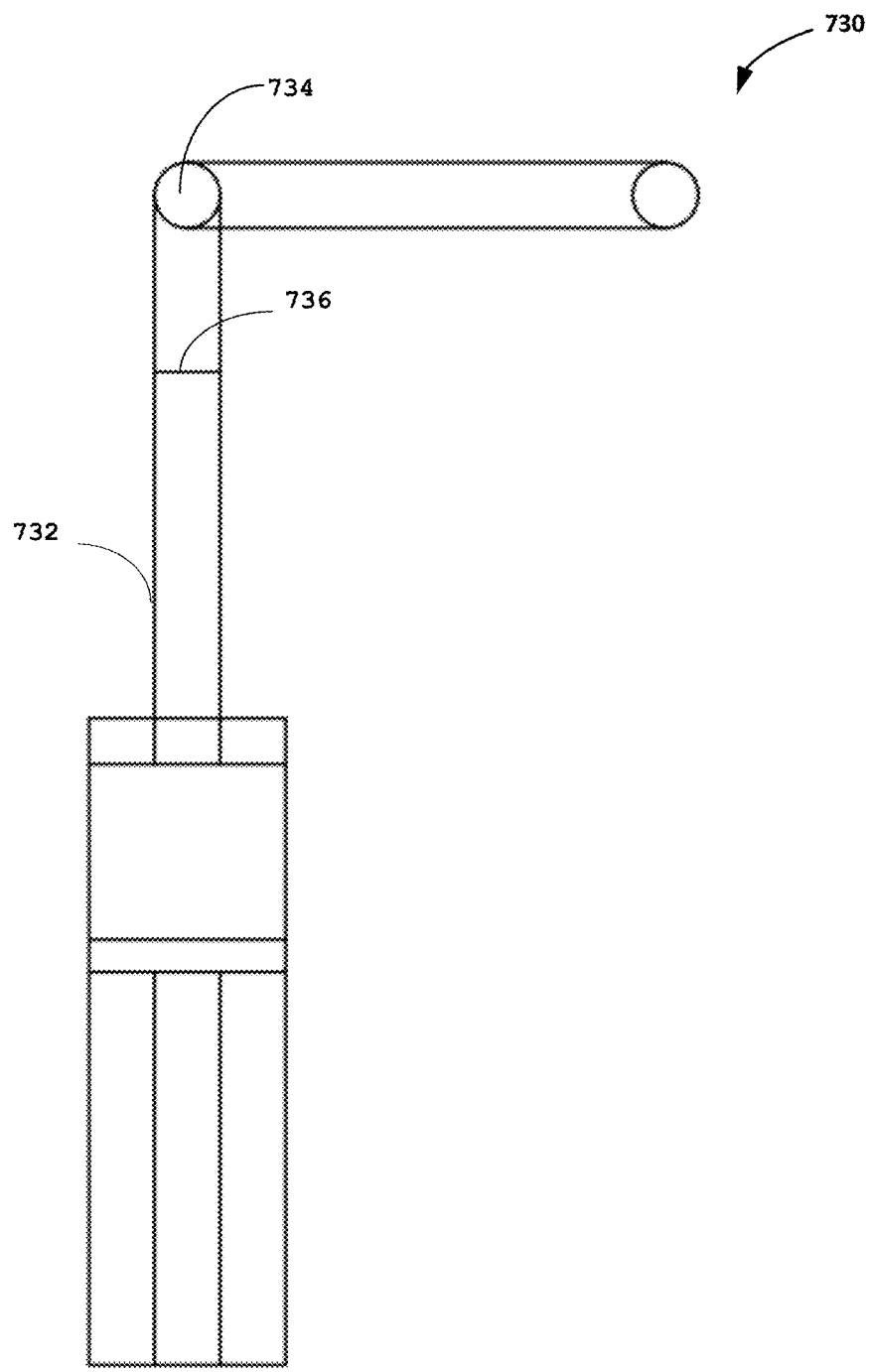
FIG. 7C shows an illustrative gateway construction with a maneuverable omnidirectional antenna.

Referring to FIG. 7C, there is shown yet another illustrative gateway 730 with a maneuverable omnidirectional antenna 732. The maneuverable omnidirectional antenna 732 includes an elbow joint 734 and a swivel joint 736. In the illustrative embodiment, the elbow joint 734 is rotated and rotatable through a 90-degree tilt, and the swivel joint 736 is rotatable through 360-degrees. In an alternate embodiment, the antenna is a directional antenna, which narrows the area of effect of the short-range communication channel.

Figure 8A:
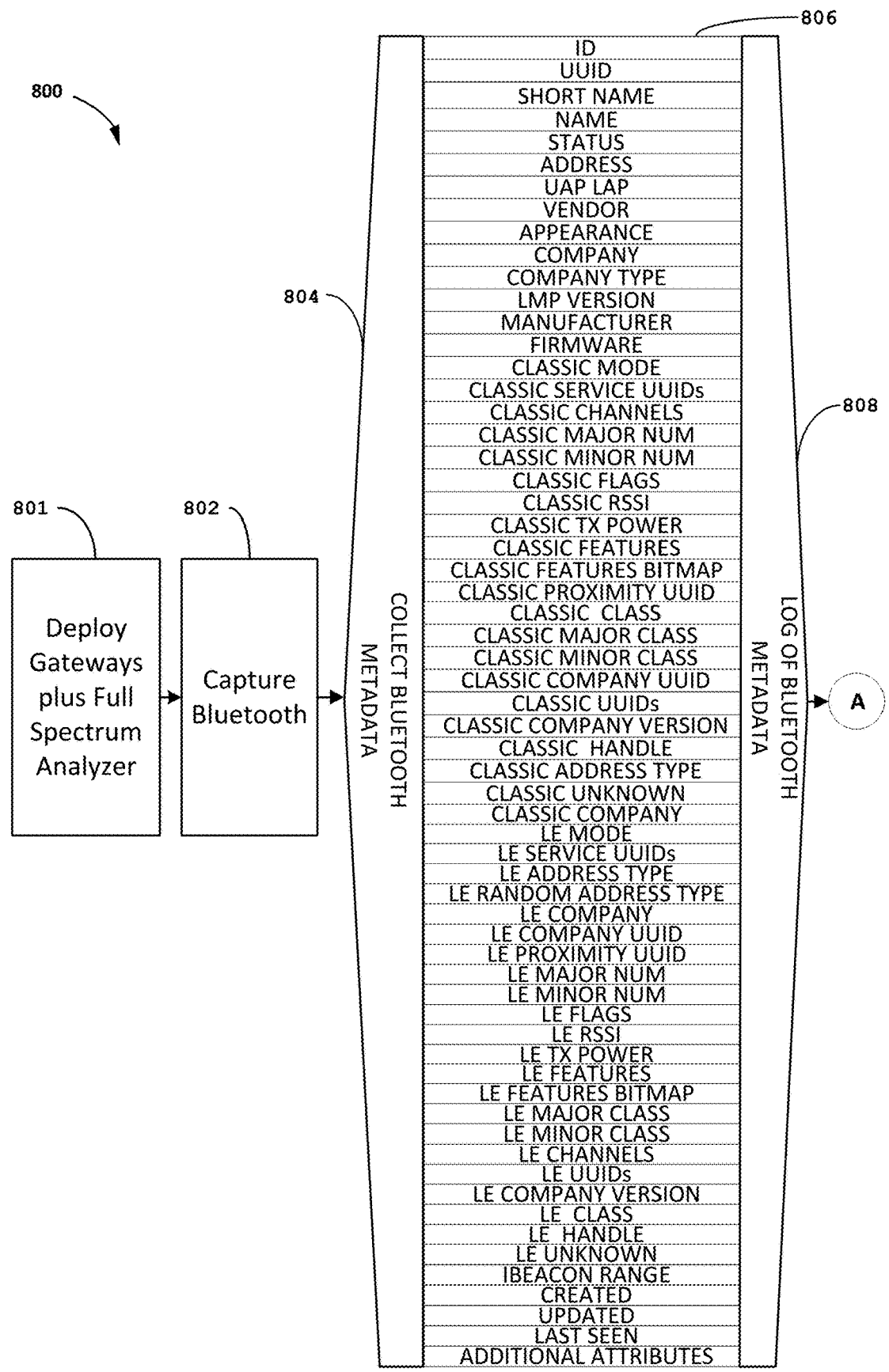
FIGS. 8A and 8B show a flowchart method for the reception of Bluetooth metadata.
Figure 8B:
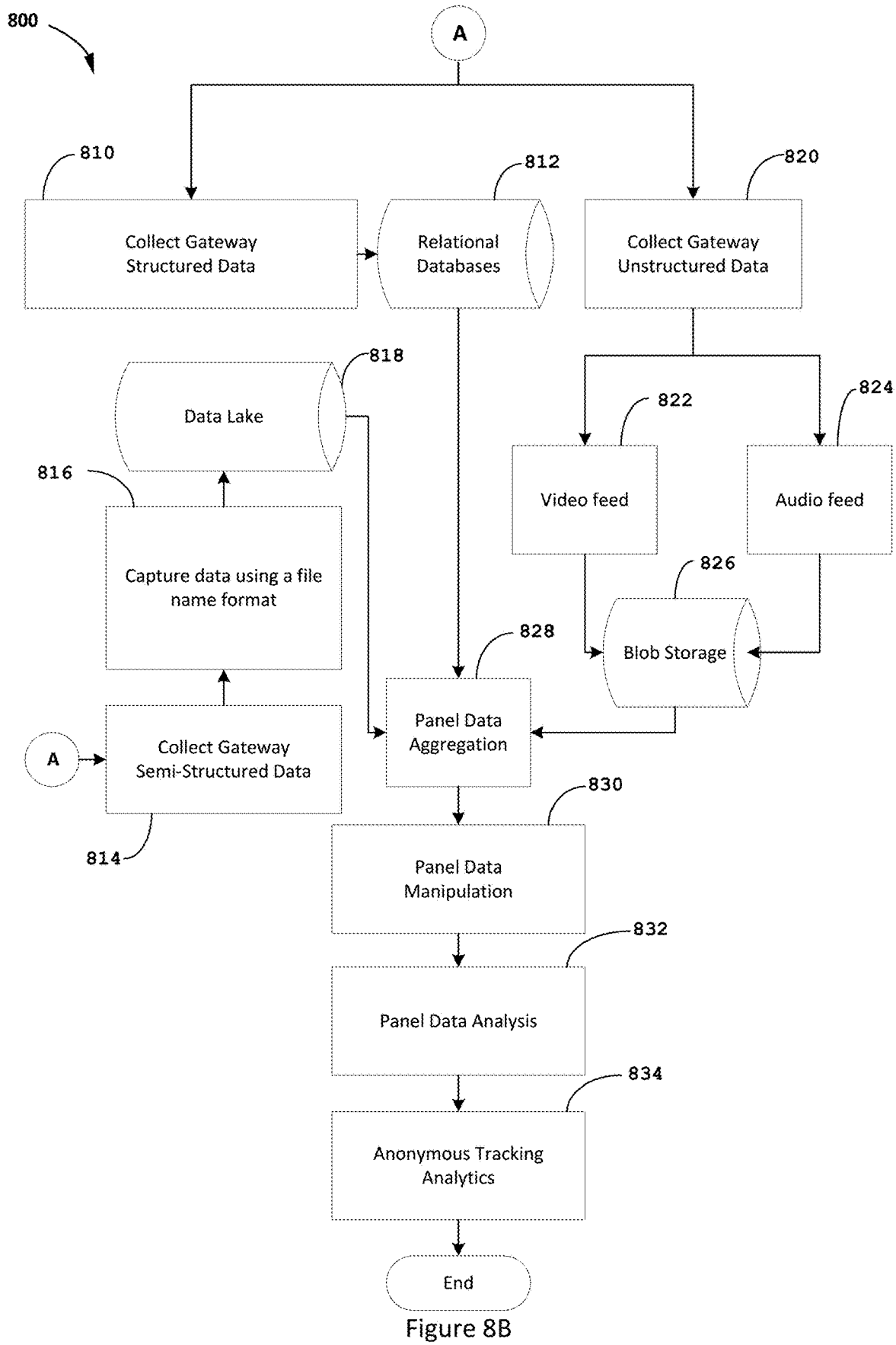

Referring to FIGS. 8A and 8B, there is shown a flowchart 800 for the reception of Bluetooth classic and Bluetooth Low Energy (BLE) metadata. The flowchart 800 shows the metadata handling from Bluetooth classic and Bluetooth low energy devices associated with gateways 801 that include an illustrative scanner such as a full spectrum analyzer that captures and processes Bluetooth signals 802.

At block 804, the Bluetooth metadata is collected. In the illustrative embodiment, the collected metadata is organized 806 into a list of data types that includes ID, UUID, SHORT NAME, NAME, STATUS, ADDRESS, UAP LAP, VENDOR, APPEARANCE, COMPANY, COMPANY TYPE, LMP VERSION, MANUFACTURER, FIRMWARE, CLASSIC MODE, CLASSIC SERVICE UUIDs, CLASSIC CHANNELS, CLASSIC MAJOR NUM, CLASSIC MINOR NUM, CLASSIC FLAGS, CLASSIC RSSI, CLASSIC TX POWER, CLASSIC FEATURES, CLASSIC FEATURES BITMAP, CLASSIC PROXIMITY UUID, CLASSIC CLASS, CLASSIC MAJOR CLASS, CLASSIC MINOR CLASS, CLASSIC COMPANY UUID, CLASSIC UUIDS, CLASSIC COMPANY VERSION, CLASSIC HANDLE, CLASSIC ADDRESS TYPE, CLASSIC UNKNOWN, CLASSIC COMPANY, LE MODE, LE SERVICE UUIDs, LE ADDRESS TYPE, LE RANDOM ADDRESS TYPE, LE COMPANY, LE COMPANY UUIDS, LE ADDRESS TYPE, LE RANDOM ADDRESS TYPE, LE COMPANY, LE COMPANY UUID, LE PROXIMITY UUID, LE MAJOR NUM, LE MINOR NUM, LE FLAGS, LE RSSI, LE TX POWER, LE FEATURES, LE FEATURES BITMAP, LE MAJOR CLASS, LE MINOR CLASS, LE CHANNELS, LE UUIDS, LE COMPANY VERSION, LE CLASS, LE HANDLE, LE UNKNOWN, IBEACON RANGE, CREATED, UPDATED, LAST SEEN, and ADDITIONAL ATTRIBUTES. At block 808, the illustrative Bluetooth spectrum analyzer is an Ubertooth One, which can generate a process log of the organized collected Bluetooth metadata.

Referring to FIG. 8B, flowchart 800 continues, where the Bluetooth classic and BLE datasets captured in blocks 801-808 are handled. More specifically, at block 810, structured data is collected. Structured data may include parameters specific to the NBHA gateway such as an identifier for the NBHA gateway, a node count, a NBHA gateway status and address (bd_addrs), a Received Signal Strength Indicator (RSSI), a NBHA name, a timestamp, Universally Unique Identifier (UUID). This structured dataset may be saved to a relational database at block 812. By way of example and not of limitation, the relational database may be a MySQL database.

At block 814, a second data path captures a semi-structured dataset such as the metadata from blocks 801-808. At block 816, the NBHA gateway semi-structured dataset is captured using a file name format such as {Namespace}/{EventHub}/{PartitionId}/{Year}/{Month}/{Day}/{Hour}/{Minute}/{Second}. At block 818, the semi-structured dataset may be saved at a data lake.

At block 820 a third data path captures an unstructured dataset. The unstructured dataset may receive a video feed at block 822, and receive an audio feed at block 824. The unstructured dataset, video feed, audio feed, or any combination thereof are stored in Blob storage at block 826.

At block 828, the three data paths are gathered using a panel data aggregation process. At block 830, a panel data manipulation is initiated, then a panel data analysis is performed at block 832. After the data panel analysis, these data sets may be used to develop anonymous tracking analytics at block 834, which do not utilize the SIG Protocol because the information captured is wireless leakage emanating from the mobile client devices, e.g., user smartphones.

In addition to the Network Based Hyperlocal Authentication (NBHA) system and method providing a seamless and continuous background authentication and cryptographic operations, which satisfies the core requirement of protecting user privacy and corporate trade secrets. The NBHA system may also be used to anonymously track client devices. In general, anonymous tracking refers to the process of capturing RF emissions with the NBHA gateway. The RF emissions are associated with open network protocols such as Bluetooth Classic and Bluetooth Low Energy. Additionally, the RF emissions may be gathered from Wi-Fi, GSM, LTE, 5G, Near-Field Communication (NFC), Radio-Frequency Identification (RFID), and other such protocols or standards that are used for wireless communications.

When the NBHA system is used for anonymous tracking—the SIG protocol does not have to be operational. The SIG Protocol need not be operational because the SIG protocol requires integration with a client application that is executed on the client device. Thus, the NBHA system supports anonymously tracking client devices that are not being authenticated by the SIG protocol. Thus, when the SIG protocol is not enabled, the NBHA system can track nefarious/rogue/untrustworthy client devices and trustworthy client devices that are not using the SIG protocol. To better describe the depth of the NBHA system, an anonymous customer tracking use case is presented that does not engage the SIG protocol.

Anonymous customer tracking may be used to anonymously improve customer service by anonymously analyzing customer behavior, which preserves user privacy. Anonymously analyzing customer behavior is performed with the customer classification process and event-based A/B testing. The benefit of anonymously analyzing customer behavior is that a property such as a mall or casino can acquire a better understanding of their customers and can obtain real-time feedback from customers regarding the events without the need to have the customer download and engage with a mobile application.

Another use case supported by the NBHA system not using the SIG protocol is a time-based loyalty program. Most loyalty programs are based on transactions. The illustrative systems and methods can present and deliver an award to a customer for the time the customer has spent on a certain property or at a particular location on the property. Once it is determined that the customer is entitled to an award, such as a loyalty award, the customer's user classification may be used to determine the type of award to deliver to the customer. For example, if the customer has been waiting in the lobby area for one hour and then the customer moves to a restaurant that is completely full, a server may deliver the customer a $20 coupon to reward the customer for having waited one hour for restaurant seating.

Figure 9A:
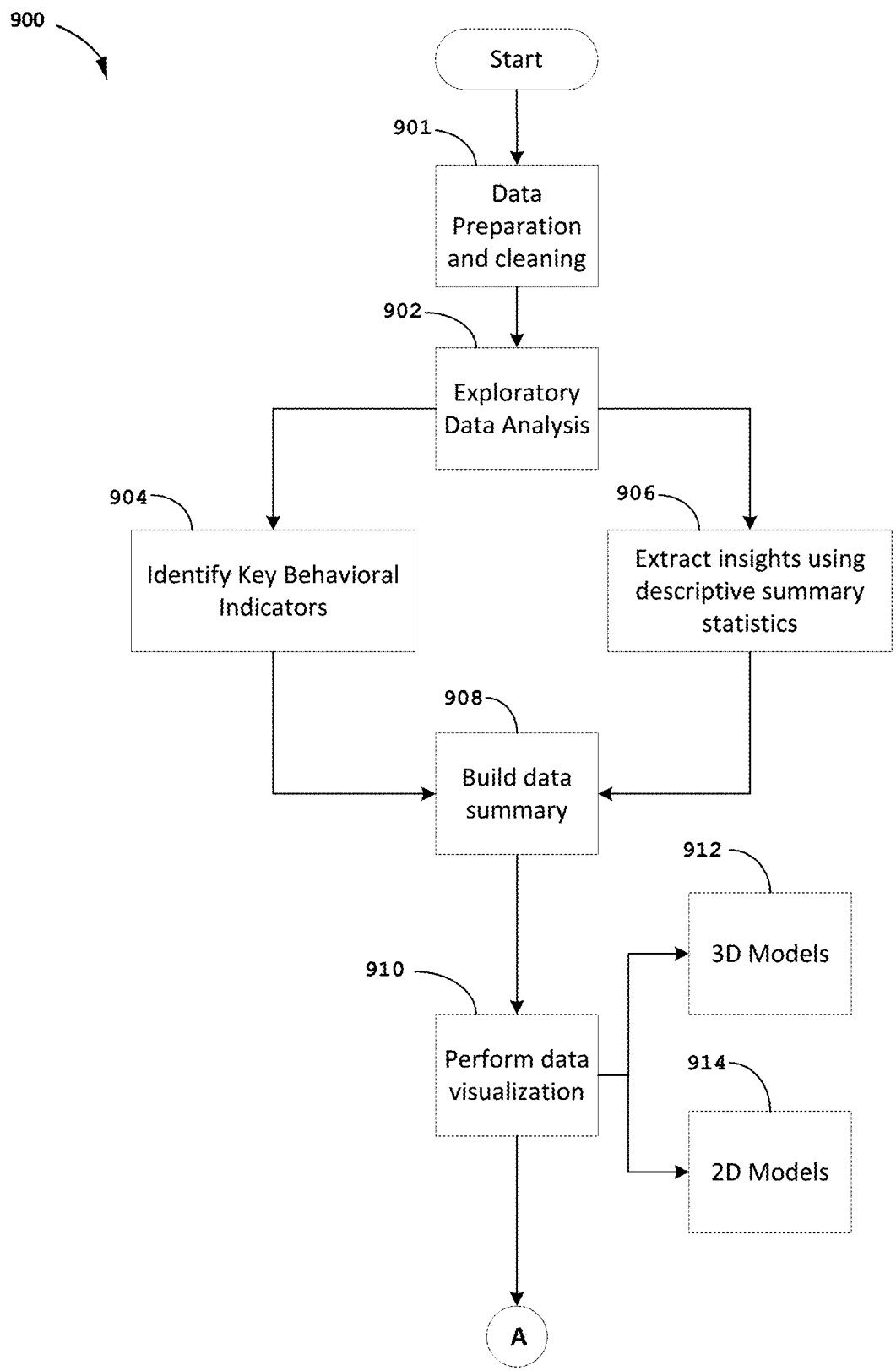
FIGS. 9A and 9B show a method flowchart for data visualization of time-base customer loyalty programs.
Figure 9B:
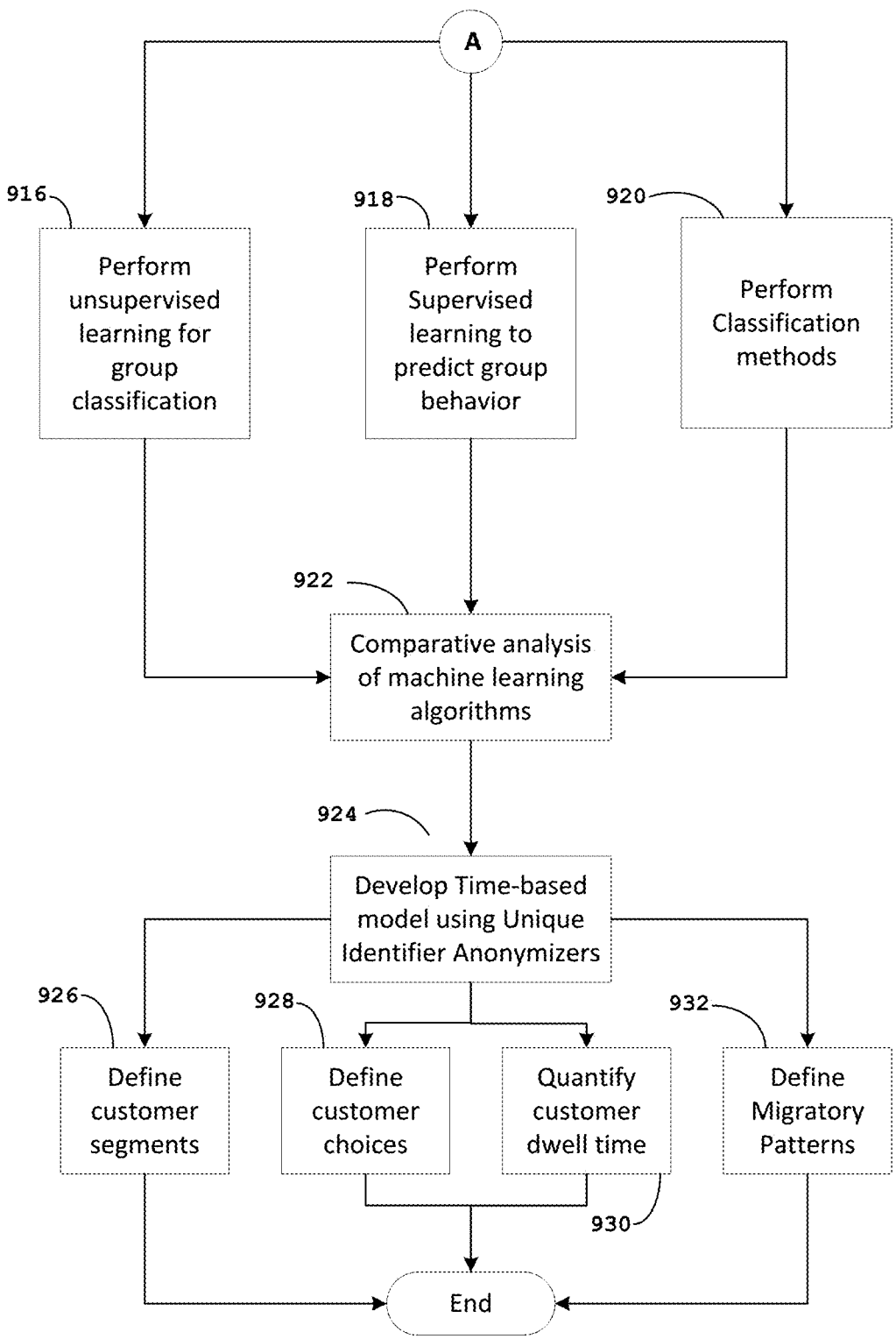

Referring to FIGS. 9A and 9B, there is shown a method flowchart 900 for data visualization of time-based customer loyalty programs. The method 900 begins with a data preparation and cleaning process at block 901. The method then proceeds to exploratory data analysis at block 902. During the exploratory data analysis Key Behavioral Indicators (KBI) are identified at block 904 and insights are extracted using descriptive summary statistics at block 906. Next, the data is aggregated in a data summary at block 908 for data visualization at block 910. The data may be presented in a 3D manner at block 912 and a 2D manner at block 914.

Referring to FIG. 9B, the method flowchart 900 for time-based customer loyalty programs continues at blocks 916, 918, and 920, where the aggregated data is provided as an input. At block 916 the aggregated data is used to perform unsupervised learning for group classification (e.g., party group, gaming group, foodie group). At block 918 the aggregated data is used to perform supervised learning to predict group behavior. Other classification methods are performed at process block 920.

The unsupervised learning for group classification including K-means clustering, mean shift, k-mode, and k-prototype algorithms. The supervised learning to predict group behavior may use linear regression, lasso regression, and tree-based regression. Other classification methods include logistics regression, vector machines, decision trees, random forest, and multiclass classification classifiers.

At block 922, a comparative analysis of machine learning algorithms is performed to select the most adept algorithms for the time-based loyalty model using unique identifier anonymizers at block 924. The time-based loyalty model encompassing a process to define customer segments is performed at process block 926. A process to define customer choices is performed at process block 928. A process to quantify customer dwell time is performed at process block 930, and a process to define migratory patterns is performed at process block 932.

Figure 10A:
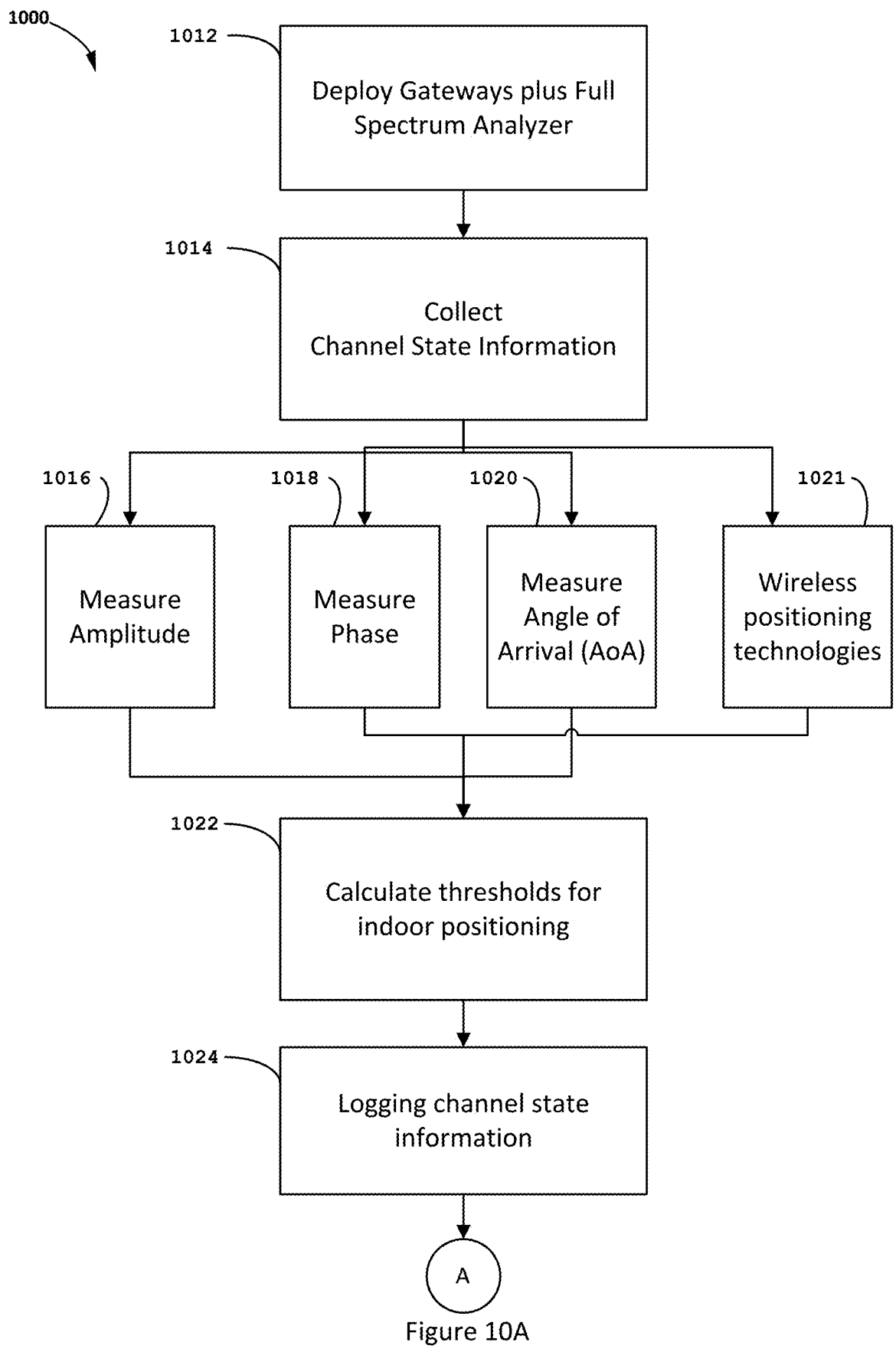
FIGS. 10A and 10B show a flowchart method for indoor positioning.
Figure 10B:
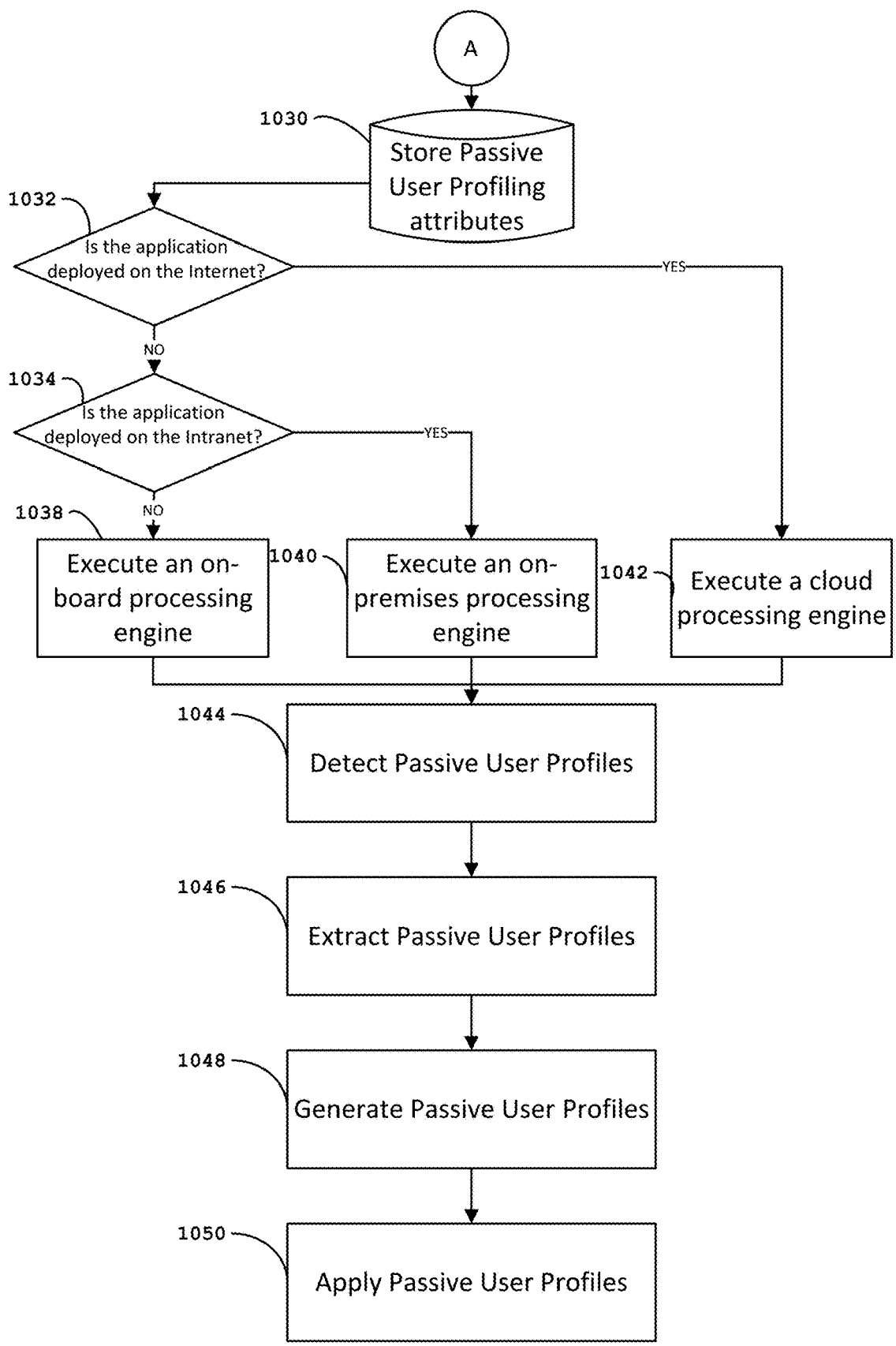

Referring to FIGS. 10A and 10B, there is shown a flowchart for indoor positioning 1000 comprised of a process to deploy NBHA gateways plus full spectrum analyzer 1012, a process to collect channel state information 1014, a process to measure amplitude 1016, a process to measure phase 1018, a process to measure angle of arrival (AoA) 1020, a process of wireless positioning technologies 1021, a process to calculate thresholds for indoor positioning 1022, and a process to logging channel state information 1024 before continuing in FIG. 10B.

The wireless positioning technologies 1021 may employ various indoor positioning technologies including Wi-Fi, Bluetooth, RFID, UWB, ultrasound, cellular networks, angle of arrival, time of arrival, time difference of arrival, received signal strength, multicarrier phase measurement, time transfer, spread spectrum, RF fingerprinting, GPS, GNSS, and other such technologies.

The metrics collected through a plurality of full spectrum analyzers (described above) include the amplitude of channel state information (A-CSI) and the received signal strength indicator (RSSI) from the list of metadata 806. Moreover, the received signal strength indicator (RSSI) from the list of metadata 806 aggregates the signal strength of the frequency subcarriers. Additional embodiments include one or multiple factors to calculate the phase 1018 of channel state information (P-CSI), the amplitude 1016, the angle of arrival (AoA) 1020, the wireless positioning technologies 1021, and the metadata 806 for passive user profiling.

Referring to FIG. 10B, the flowchart 1000 continues with the production of passive user profiles at block 1030, by storing passive user profiling attributes in a database. At decision diamond 1032, a process to determine if the application is deployed on the internet is performed. If the process determines not to deploy the application on the Internet, the flowchart 1000 continues to decision diamond 1034 where a process to determine if the application is deployed on an intranet is performed. If the process determines not to deploy the application on the intranet, the flowchart 1000 continues to block 1038 where a process to execute an on-board processing engine 1038 is performed.

At decision diamond 1032, if the process determines to deploy the application on the Internet, the flowchart 1000 continues to perform a process to execute an on-premises processing engine 1040. At decision diamond 1034, if the process determines to deploy the application on the intranet, the flowchart 1000 continues to perform a process to execute a cloud processing engine 1042. After the on-board processing engine, the on-premises processing engine, and/or the cloud processing engine are executed, a process to detect passive user profiles is performed at block 1044, followed by a process to extract passive user profiles at block 1046, then a process to generate passive user profiles at block 1048, and lastly a process to apply passive user profiles at block 1050.

The proposed methods and systems improve the data collection of angle of arrival (AoA) 1020, phase 1018, amplitude 1016, and wireless positioning technologies 1021 with the metadata of list 806 to quantify the variances of the RF environment due to human activity for indoor detection 1044, extraction 1046, generation 1048, and application of passive user profiling 1050.

Figure 11A:
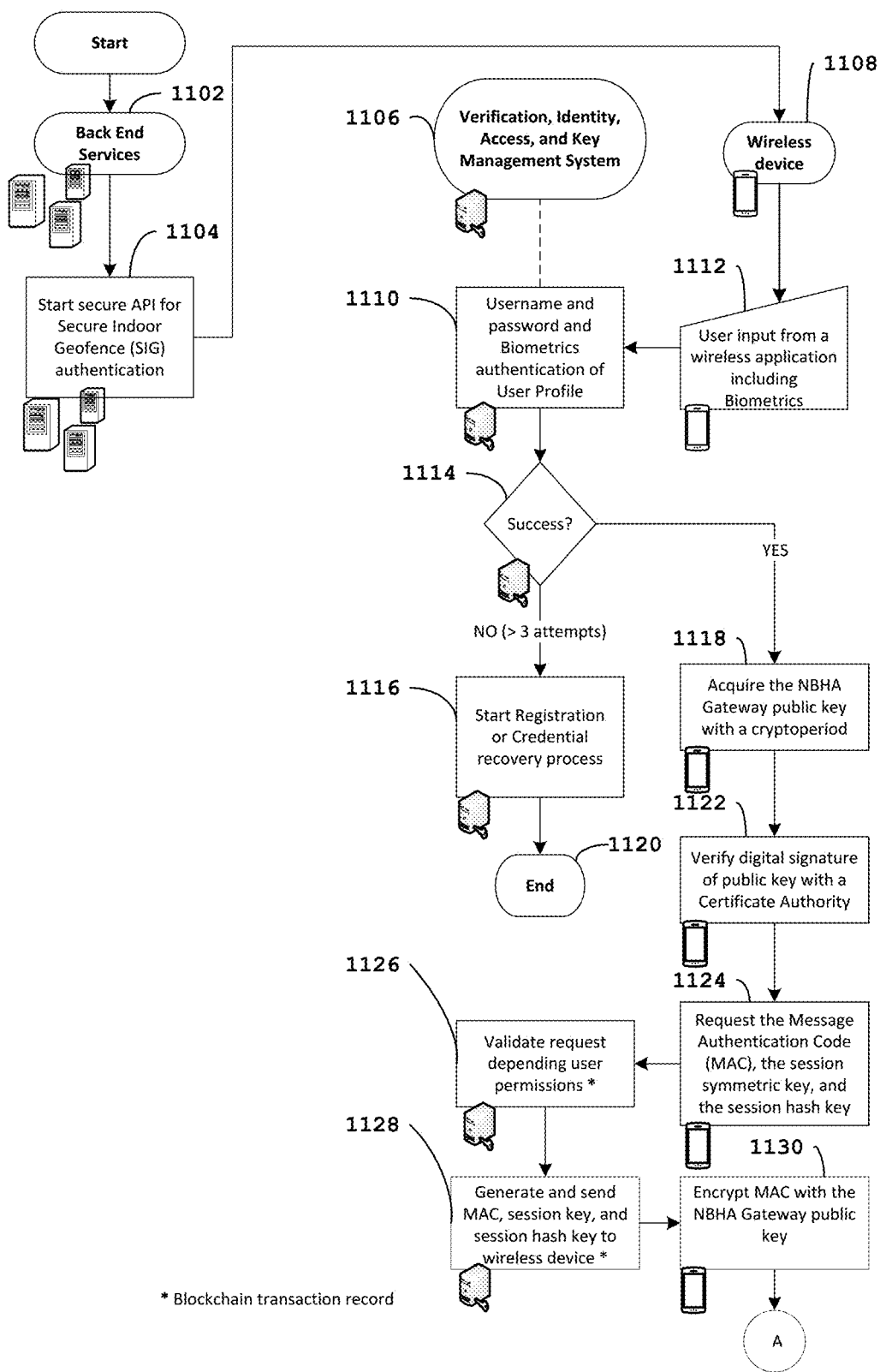
FIGS. 11A-11C show a SIG protocol method using a hybrid cryptosystem and a keyed hash message authentication code (HMAC).
Figure 11B:
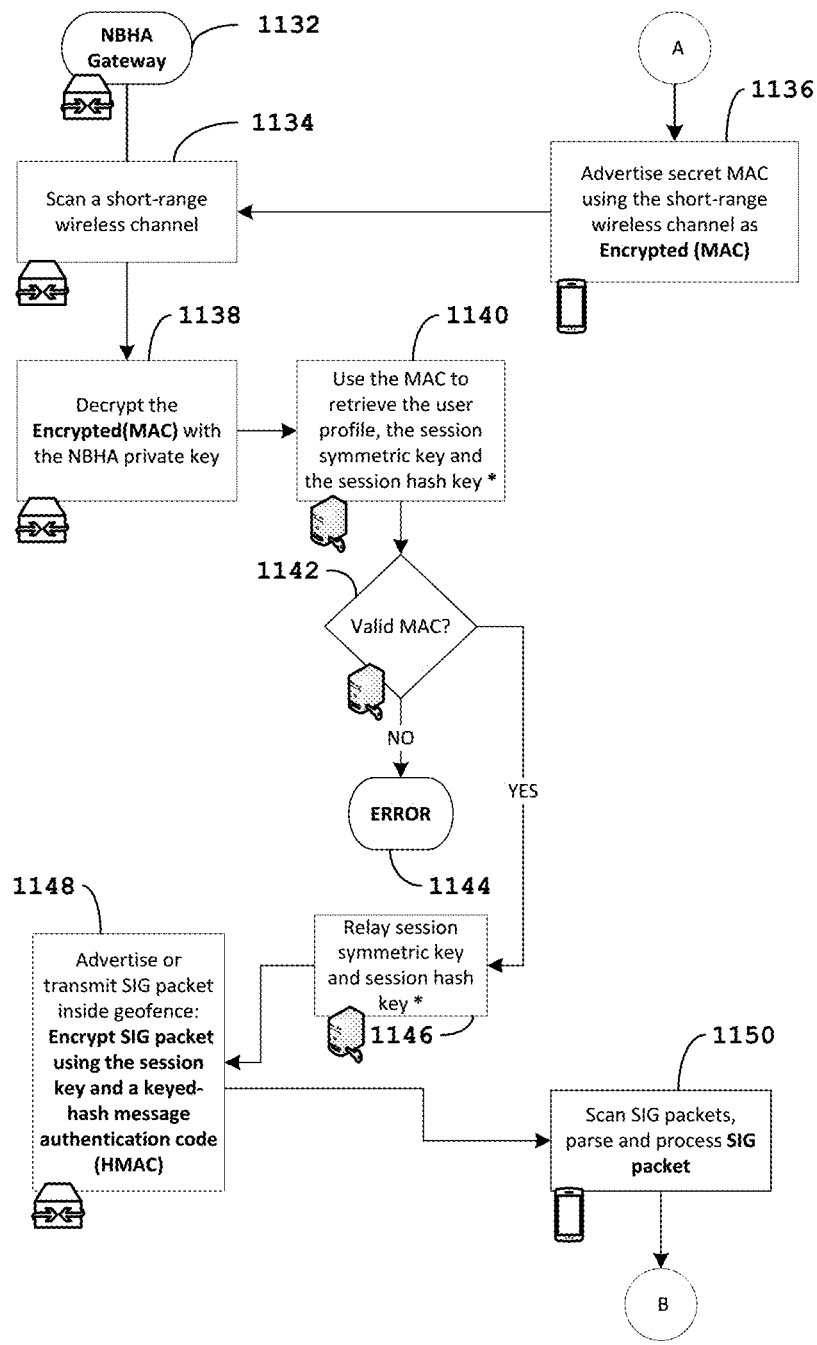
Figure 11C:
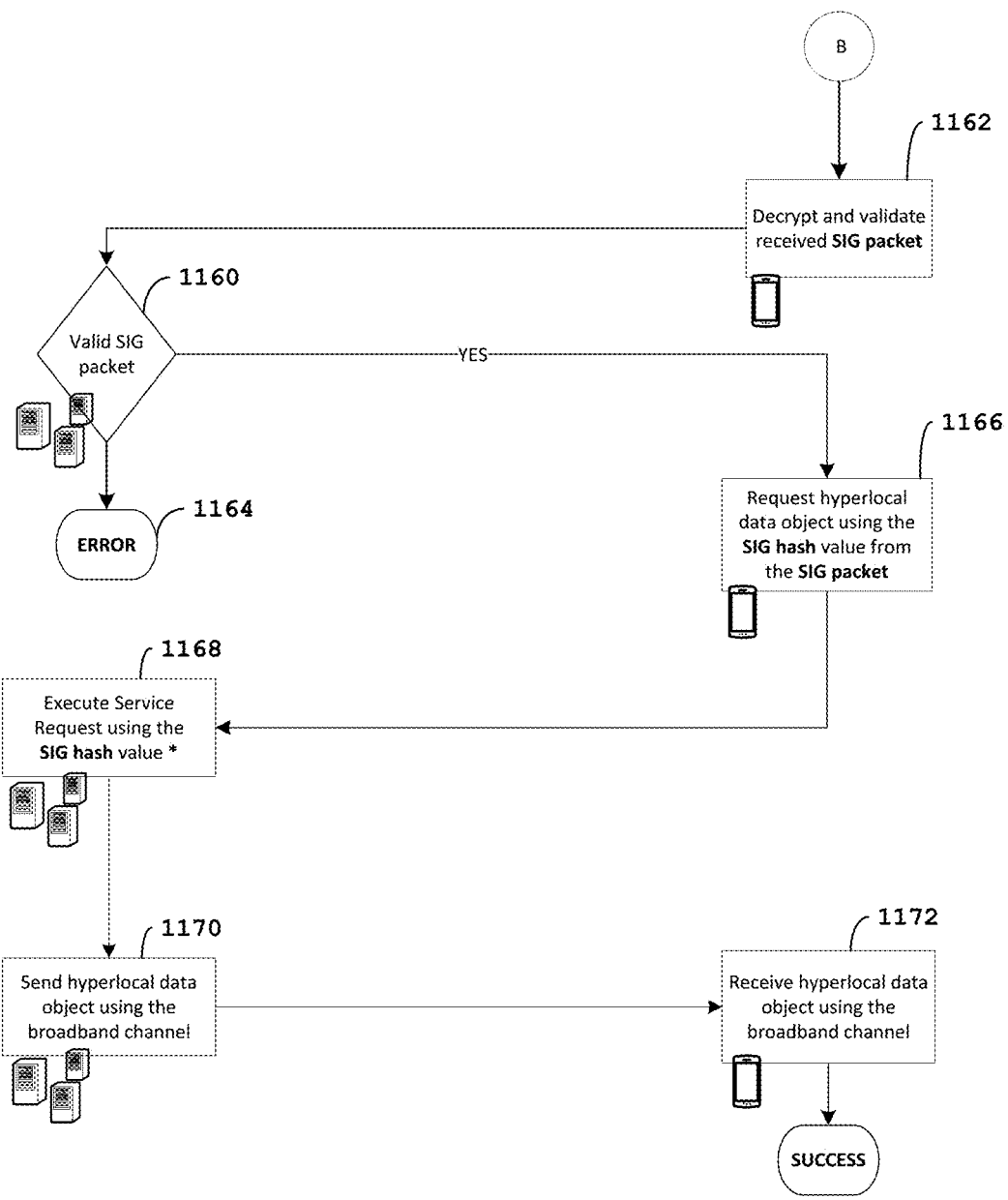

Referring to FIG. 11A, FIG. 11B and FIG. 11C there is shown another embodiment illustrating the operation of one illustrative Secure Indoor Geofence (SIG) protocol using a hybrid cryptosystem and a keyed hash message authentication code (HMAC). The illustrated flowchart in FIGS. 11A, 11B, and 11C describes in further detail the authentication process and delivery of hyperlocal data objects between a plurality of Back End Services 1102, a NBHA gateway 1132, a verification, identity, access, and key management system 1106, and a wireless device 1108 aligned in four illustrative columns.

First, the process starts with a secure application programming interface (API) for Secure Indoor Geofence (SIG) authentication 1104 which is used to interact with the wireless device 1108. Next, user input is captured from a wireless application 1112. At least a pair of a username and a password are used to authenticate a user profile 1110. In addition, multi-factor authentication such as biometric data should be used for critical applications as part of the authentication process in a geofence 1110. Decision 1114 determines the outcome of the authentication process conducted by the Verification, Identity, Access, and Key Management System 1106. Authentication attempts should be finite with increasing delay between unsuccessful outcomes. Thus, process 1116 initiates a registration form or a credential recovery mechanism in which the system and method end 1120. Successful authentication allows the wireless device 1108 to acquire the NBHA gateway Public Key with a cryptoperiod 1118. The NBHA gateway public key is verified through a Certificate Authority 1122 to prevent gateway impersonation attacks. Process 1124 requests through a secure broadband channel a Message Authentication Code (MAC), a Secure Indoor Geofence (SIG) Session Key, and a Secure Indoor Geofence (SIG) Session Hash Key. Afterward, the request is validated depending on the user permissions (e.g., membership level) and recorded using a Transactional System using blockchain 1126. A valid request would generate and send the Message Authentication Code (MAC), the SIG Session Key, and the SIG Hash Key to a wireless device 1128. The Message Authentication Code (MAC) is encrypted with the NBHA gateway public key 1130 for advertising using the short-range wireless radio to announce the wireless device in a geofence.

The NBHA gateway 1132 is scanning and searching a short-range wireless channel for SIG packets conforming to the Secure Indoor Geofencing (SIG) protocol. At the same time, the wireless device 1128 advertises an encrypted Message Authentication Code (MAC) 1136 using the NBHA gateway public key. Next, a packet with an encrypted MAC is decrypted with the NBHA gateway private key 1138. Subsequently, the MAC is used to retrieve the user profile that requested a session, the Secure Indoor Geofence (SIG) session key and the Secure Indoor Geofence (SIG) hash key 1140 with a short cryptoperiod or time to live. Thus, a valid MAC 1142 would relay key material to the NBHA gateway. The key material includes the SIG session key and the SIG hash key 1146 assigned to a user session. Authenticated and encrypted SIG packets are advertised from the NBHA gateway using the SIG session key and a keyed hash message authentication code (HMAC) 1148. Meanwhile, wireless devices scanning for hyperlocal data objects acquire local SIG packets in a geofence, parse packets conforming to the Secure Indoor Geofence (SIG) protocol and process the SIG packet with the session keys 1150.

A decrypted SIG packet and validated SIG packet 1162 using decision 1160 with error process 1164. Furthermore, a broadband channel with the ability to transmit at higher data rates could be employed to request a hyperlocal data object using a hash identifier called a SIG hash from a plurality of data object storage 1166. The Back-End Services executes the service request using the SIG hash and records the transaction in the blockchain 1168. Next, the Back-End Services securely delivers the hyperlocal data object through a secure broadband channel (e.g., TLS) 1170. The wireless device consumes the hyperlocal data object (e.g., video, image, document, data blocks, binary blocks, keys) using a wireless device application (e.g., casino game, SIG viewer application) in a Secure Indoor Geofence 1172.

Figure 12:
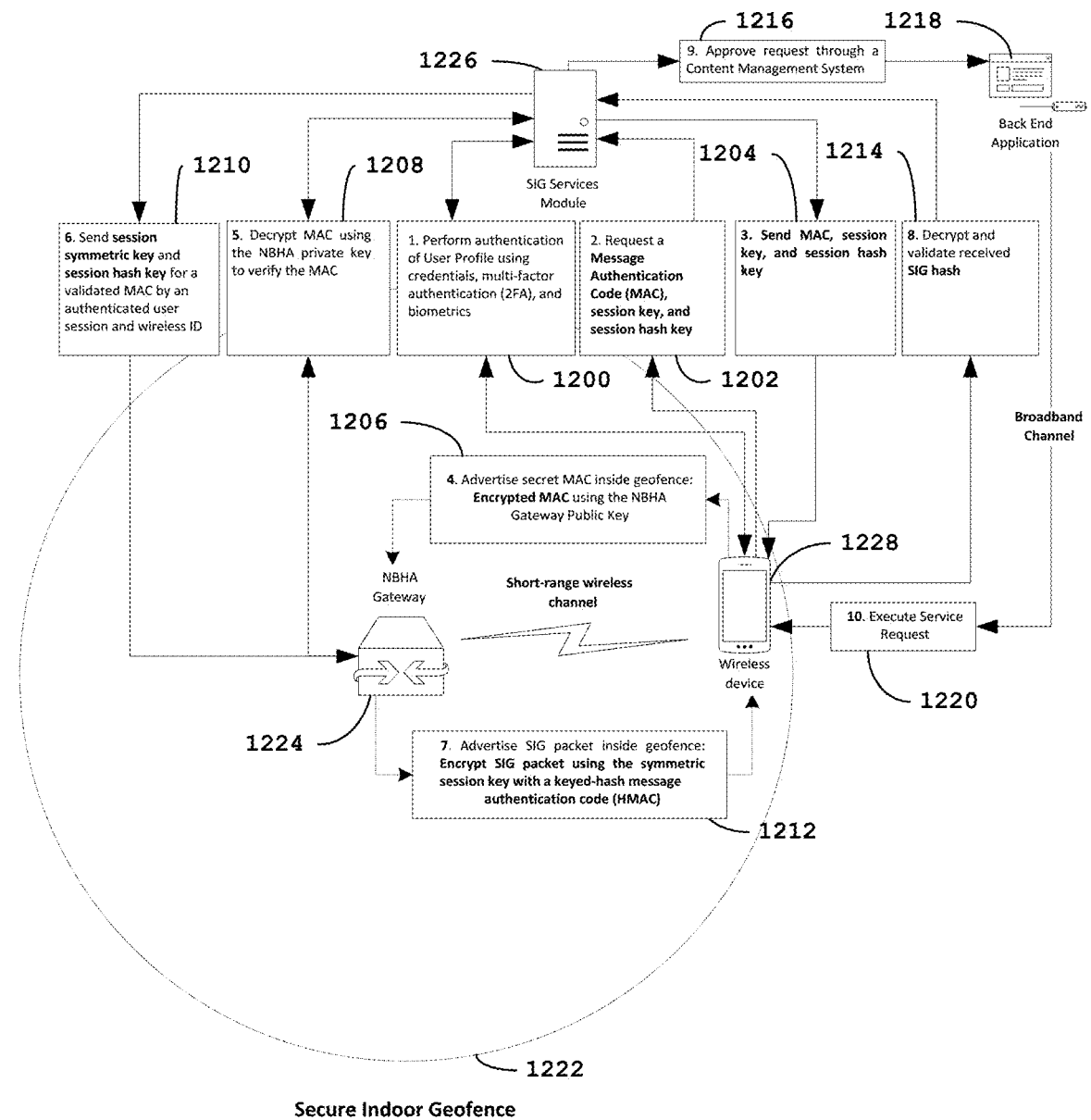
FIG. 12 shows an illustrative embodiment of a SIG protocol using a hybrid cryptosystem and a keyed HMAC.

FIG. 12 shows yet another illustrative embodiment of a Secure Indoor Protocol (SIG) protocol using a hybrid cryptosystem and a keyed hash message authentication code. The illustrative secure indoor geofence perimeter is the range of the short-range wireless channel 1222. First, the authentication of a user profile is established through a plurality of user credentials, multi-factor authentication methods (e.g., push notifications, security tokens, SMS codes, phone callbacks, time-based one-time passcodes, universal 2nd-factor devices), and biometrics 1200. Second, a wireless device 1228 requests a Message Authentication Code (MAC), a Secure Indoor Geofence (SIG) session key, and SIG hash key 1202 from the SIG services module 1226. Third, a Message Authentication Code (MAC), a SIG session key, and a SIG hash key 1204 are generated and sent to the wireless device 1228. Fourth, the wireless device 1228 advertises an encrypted Message Authentication Code (MAC) using the NBHA gateway public key 1206 inside the geofence 1222. Fifth, the NBHA gateway 1224 decrypts the Message Authentication Code (MAC) using the NBHA private key to verify the MAC 1208. Sixth, the SIG Service Module 1226 securely sends the SIG session key and the SIG hash key for a validated MAC used by an authenticated user session 1210. Seventh, a SIG packet carrying a SIG hash is transmitted inside the geofence using the SIG session key and a keyed-hash message authentication code (HMAC) 1212. Eighth, the SIG packet is decrypted with the SIG session key and verified with a keyed hash message authentication code (HMAC) 1214. In addition, the SIG hash is validated by the SIG Services System 1226 through a log or blockchain. Meanwhile, an invalid SIG hash would drop the request without further action from a Content Management System (CMS). In a successful request, the data object is served by a Content Management System (CMS) 1216 through a back-end application channel (e.g., object-based storage) 1218. Last, the data object (e.g., images, videos, documents, audio, keys, data blocks, binary blocks) is successfully delivered to the wireless device 1220 through a second channel with a broadband connection.

The Content Management System (CMS) is a front-end for the data object delivery system. In addition, the CMS is a middleware platform that transforms the traditional mobile experience by combining the power of indoor positioning, user profiling, and contextual awareness on a single platform that can integrate with a Content Management System (CMS) and Customer Relations Management (CRM) system. Moreover, the CMS objects are described by a RESTful Application Programming Interface (API) endpoint, HTTP methods, and data fields. Lastly, the HTTP methods for RESTful Services are POST, GET, PUT, PATCH, and DELETE.

Object storage is an architecture designed to represent data as objects. The objects include the data, metadata, and a globally unique identifier that could be used as an embodiment of the SIG hash. A globally unique identifier (GUID) or universally unique identifier is not generated based on the content. Typically, the GUID is randomly generated with a length of 128 bits. The SIG hash depends on a strong hash (e.g., SHA256) function to reduce the probability of collisions among objects from multiple data sources. A combination of a GUID and a SIG hash would provide the flexibility to identify different objects with the same data and metadata. As a result, the GUID would be a different value for each object providing the necessary differentiator to the SIG hash. A plurality of object storage services (e.g., Azure Blob Storage, Amazon Simple Storage Service (S3), open source object storage servers) are compatible with the object storage model used in this embodiment to safely deliver hyperlocal data objects.

Figure 13A:
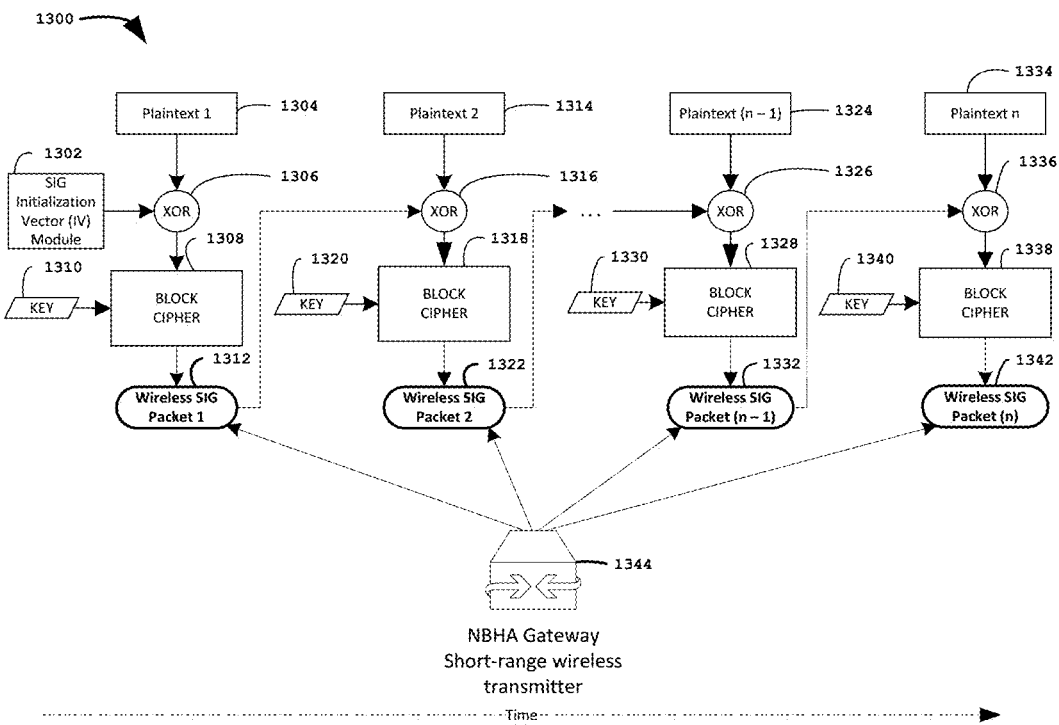
FIGS. 13A and 13B show the SIG CBC Encryption and Decryption modes of operation.

FIG. 13A shows the Secure Indoor Geofencing (SIG) Cipher Block Chaining (CBC) Encryption mode of operation. A fundamental mode of operation is in Electronic Codebook. In addition, the SIG protocol illustrates an advanced mode of block cipher operation for an additional level of complexity and security 1300. Moreover, plaintext references used in the illustrative design 1300 could represent a SIG hash or a plurality of data objects. The illustrative CBC encryption mode contains a first wireless SIG Packet used as an input to produce encrypted wireless SIG Packets. In this embodiment, a plaintext 1 1304 and a SIG Initialization Vector (IV) module 1302 are XORed 1306. The SIG Initialization Vector (IV) Module generates a nonce and counter for every new encryption session and can be transmitted in the open through any channel available. Next, the produced output and a key 1310 are used by a block cipher 1308 to produce output Wireless SIG Packet 1 1312 which is broadcasted by a NBHA gateway short-range wireless transmitter 1344. Subsequently, the Wireless SIG Packet 1 1312 is XORed 1316 with Plaintext 2 1314. The produced output and the key 1320 are used by block cipher 1318.

The wireless SIG packet 2 is broadcast by the NBHA gateway short-range wireless transmitter 1344. Thus, a Plaintext (n−1) 1324 is XORed with Wireless SIG Packet (n−2) implied in ellipsis. The output of XOR 1326 and the keys 1330 are used as inputs to the Block Cipher 1328 producing an output Wireless SIG Packet (n−1) 1332 that is broadcasted by the NBHA gateway short-range wireless transmitter 1344 before a Wireless SIG Packet (n) 1342. Next, Wireless SIG Packet (n−1) 1332 and Plaintext (n) 1334 are XORed 1336 into a block cipher 1338 using the key 1340. The key 1310, 1320, 1330, 1340 is used by the system and method to provide confidentiality. Finally, wireless SIG Packet (n) 1342 is transmitted by the NBHA gateway short-range wireless transmitter in a secure indoor geofence.

Figure 13B:
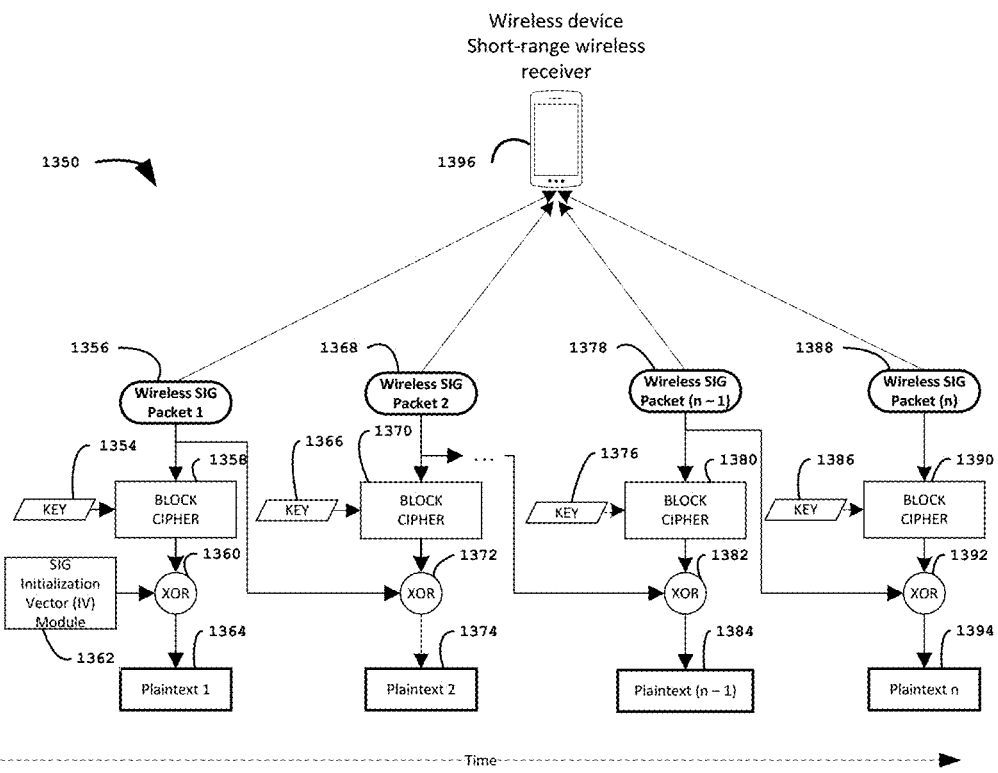

FIG. 13B shows the Secure Indoor Geofencing (SIG) Cipher Block Chaining (CBC) Decryption mode of operation. In this embodiment, the fundamental mode of operation is in Electronic Codebook. In addition, the SIG protocol illustrates an advanced mode of block cipher operation for an additional level of complexity and security 1350. Moreover, plaintext references used in the illustrative model 1350 could represent a SIG hash or a plurality of data objects. The illustrative CBC decryption mode contains a first wireless SIG Packet used as an input to obtain the plaintext. First, a Wireless SIG Packet 1 1356 is received by a wireless receiver equipped with a short-range wireless receiver 1396. A Block Cipher 1358 requires a key 1354 to generate an output XORed 1360 with a SIG Initialization Vector (IV) Module output 1362 to generate Plaintext 1 1364. Cipher Block Chaining mode of operation depends on previous cipher operations to generate the correct plaintext. Subsequently, a Wireless SIG Packet 2 1368 is used as input to the Block Cipher 1370 and the successive wireless SIG packet represented by ellipsis. In addition, the key 1366 is employed by Block Cipher 1370. The output of the Block Cipher 1370 is XORed 1372 with a first wireless SIG packet 1 1356 to generate Plaintext 2 1374. Generally, a wireless receiver would store Wireless SIG Packet (n−1) 1378 to obtain Plaintext n 1394. In this embodiment, a Wireless SIG Packet (n−2) should not affect the ability to obtain Plaintext n 1394. However, if Wireless SIG Packet (n−2) cannot be obtained then Plaintext (n−1) 1384 cannot be successfully produced. In the illustrative block cipher network 1350 a wireless SIG packet (n−1) 1378 is used as input to the Block Cipher 1380 and the XOR operation 1392. The Block Cipher 1380 requires the keys 1376 to generate an output XORed 1382 with a Wireless SIG Packet (n−2). If wireless SIG packet (n−2) exists, then the output of the XOR 1382 is plaintext (n−1) 1384. Last, a wireless SIG packet (n) 1388 received by the wireless device 1396 is processed by a Block Cipher 1390 with the key 1386. The generated output is XORed 1392 with the previous SIG packet such as Wireless SIG Packet (n−1) 1378. Thus, the correct inputs generate plaintext n 1394.

The Galois/Counter Mode (GCM) of operation for a symmetric block cipher provides authentication and encryption in a parallelizable operation for high-performance computing applications that take advantage of massively parallel computing. GCM prevents and detects any data injection or manipulation. The standard symmetric key length is 128b. Further key lengths are allowed in this invention for additional strength including but not limited to 128b, 192b, 256b. Moreover, the standard block size is 128 bits.

The authenticated-encryption includes a modified version of Counter (CTR) mode, used for confidentiality, using a universal hash function for authentication. Data is processed as it becomes available. The GCM function is a forward cipher function. Authenticity and encryption are considered an independent system and method. In addition, predictable patterns used as Initial Vectors (IV) are forbidden due to pre-computed attacks. The IV must rely on an industry compliant source of random values in the form of a random bit generator. Because the strength of the operations depends on the uniqueness of the IV. Protection is provided by encapsulating the entire inner data used in through AES-GCM.

The AES-GCM authentication decryption operation decrypts the ciphertext and verifies the authenticity of the ciphertext. Meanwhile, the AES-GCM authentication encryption operation encrypts the plaintext and generates an authentication hash which is a cryptographic checksum.

The inputs of the AES-GCM authenticated encryption function includes a plaintext, an additional authenticated data, and IV which should be in multiples of 8b or bytes. The standard recommendation for IV length is 96 bits, but longer lengths are allowed in byte increments. The outputs of the AES-GCM authenticated encryption includes the ciphertext and the authentication hash. The authentication hash includes a plurality of lengths such as 32b, 64b, 96b, 104b, 112b, 120b, and 128b.

The input of the AES-GCM authenticated decryption function includes the IV, the additional authenticated data, the ciphertext, and the authentication hash. Meanwhile, the outputs include the plaintext and the authentication hash verification result with a binary output. The lengths for the IV, the additional authenticated data, and the ciphertext used by the AES-GCM authenticated decryption function match the lengths of the IV, the additional authenticated data, and the plaintext used as inputs by the AES-GCM authenticated encryption function.

The AES-GCM mode of operation includes two algorithms called GHASH and GCTR. The cryptographic hash function used by AES-GCM includes a function named GHASH which involves a matrix multiplication within a finite field. The use of GHASH is restricted to the context of AES-GCM. A GCTR function is a modified version of the CTR mode used in AES. In this invention, the verification of the authenticated hash always precedes the computation of the plaintext for maximum throughput.

The key should be freshly generated for every new session trying to avoid key reuse. As a result, an Internet Security Association and Key Management Protocol (ISAKMP) module provides a key management system with authenticated keying material provisioned by key distribution mechanisms including but not limited to manual configuration with pre-shared keys, Internet Key Exchange (IKE and IKEv2), Kerberized Internet Negotiation of Keys (KINK), or IPSECKEY DNS records.

Figure 14:
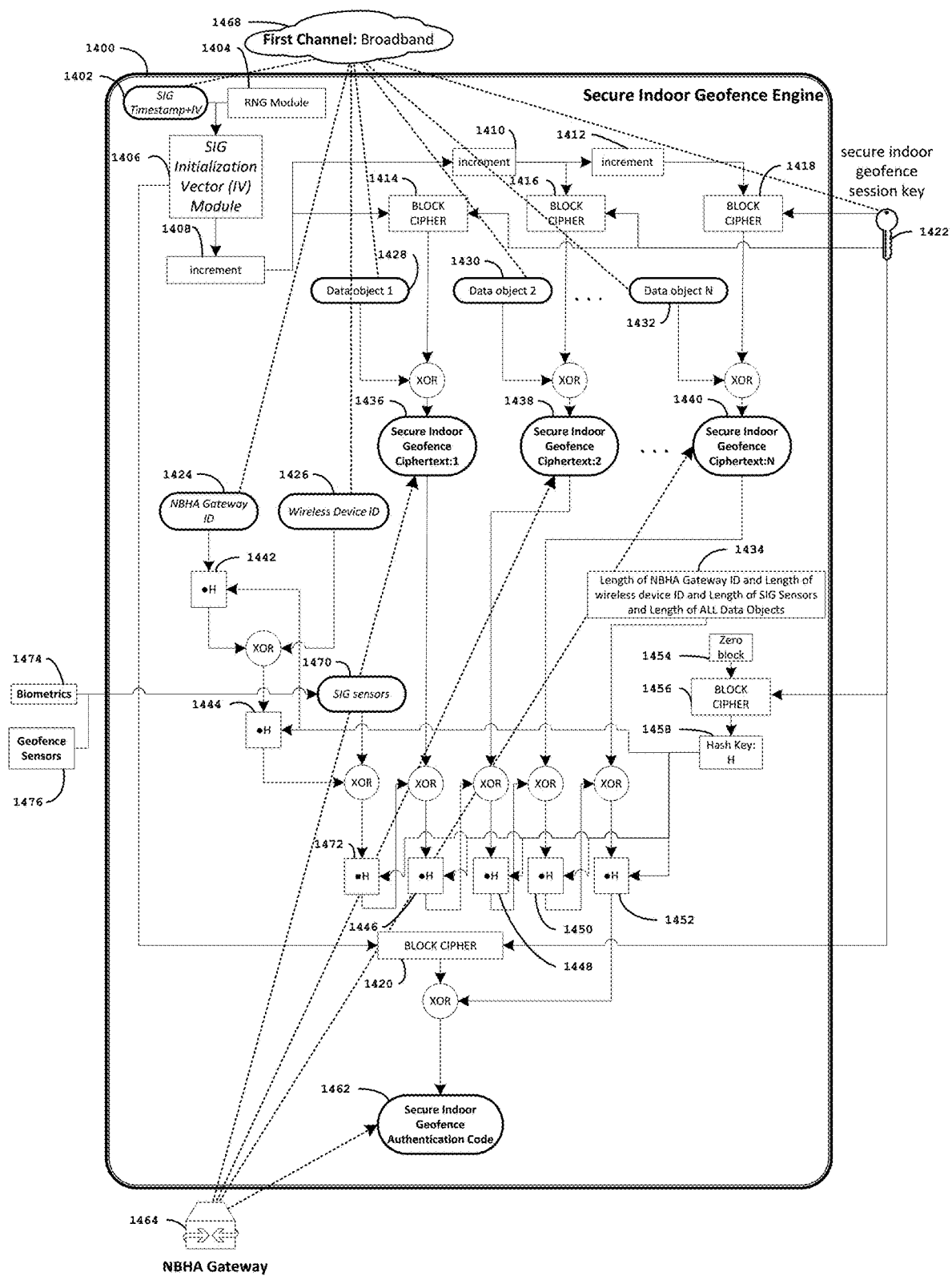
FIG. 14 shows a SIG engine and a SIG cryptographic engine.

Referring now to FIG. 14, there is shown a Secure Indoor Geofence engine 300 for authenticated encryption using a first broadband channel 1468 and a second short-range channel with a NBHA gateway wireless transmitter 1464 for high-throughput authenticated and secure delivery of data objects 1428, 1430, up to 1432 in a Secure Indoor Geofence (SIG).

The Exclusive-OR operations are illustrated and described as a ring with the word XOR in order to clearly representing the ⊕ operator. Furthermore, the flow of data of the Secure Indoor Geofence (SIG) Cryptographic Engine 1400 is illustrated with lines and arrows for organization and clarity of the invention. Performance enhancements in software or hardware or a combination thereof are allowed as long as the inputs produce consistent outputs described in the embodiments and figures.

A secure indoor geofence session key 1422 must be freshly generated for every new session avoiding key reuse. As a result, the Verification, Identity, Access, and Key Management System provisions authenticated keying material using key distribution mechanisms including but not limited to a manual configuration with pre-shared keys, Internet Key Exchange (IKE and IKEv2), Kerberized Internet Negotiation of Keys (KINK), or IPSECKEY DNS records.

The secure indoor geofence session key 1422 is randomly generated with a uniform probability distribution meaning that any key has the same probability to be generated. In addition, the secure indoor geofence session key 1422 is transmitted securely through a secure session (e.g., Transport Layer Security TLS) using the first broadband channel.

Further referring to FIG. 14 shows a Secure Indoor Geofence (SIG) Cryptographic Engine 1400 with dual channel location based authenticated encryption for secure delivery of data objects in a Secure Indoor Geofence (SIG). A Secure Indoor Geofence (SIG) Initialization Vector (IV) is produced by a SIG IV Module 1406 that aggregates the output of a Random Number Generator (RNG) module 1404 and a SIG timestamp plus a unique Initial Vector (IV) 1402 to prevent replay attacks. Furthermore, the SIG IV is incremented consecutively using predetermined increments 1408, 1410, and 1412 to effectively act as a counter incremented by choice of one, two or more steps that must be consistent across all implementations in hardware or software or a combination thereof. The cryptographic key of the system and method is a secure indoor geofence session key 1422 used by a plurality of block ciphers 1414, 1416, 1418, 1420, and 1456.

The block ciphers 1414, 1416, 1418, 1420, and 1456 employ their respective forward function implementations saving the implementation costs of the inverse function making the system ideal for small factor devices that require low power consumption such as IoT devices. In addition, the method and system provide large opportunities for reuse of resources. Thus, the inverse functions of the block ciphers 1414, 1416, 1418, 1420, and 1456 are not required in any of the implementations of the Secure Indoor Geofence Engine 1400 in hardware or software or a combination thereof. Furthermore, the requirements for a block cipher include a block size of 128 bits and a secure indoor geofence session key 1422 with a plurality of lengths including 128 bits, 192 bits, and 256 bits.

The Galois Counter (GCTR) includes parameters $GCTR_K$ (SIG IV from 1406, Data object 1 1428, Data object 2 1430 through Data object N 1432) where K is the SIG session key 1422.

The inputs provided to the Secure Indoor Geofence (SIG) Cryptographic Engine 1400 through the first broadband channel 1468 include the SIG session key 1422, SIG Timestamp plus Initial Vector (IV) 1402, a NBHA gateway ID 1424, a Wireless Device ID 1426, a plurality of plaintext segmented into data objects 1428, 1430, up to 1432. Additional inputs include a plurality of Secure Indoor Geofence sensors 1470 captured by a plurality of geofence sensors 1476 and a plurality of biometrics 1474 checks. All inputs must be multiples of 8 bits (1 byte).

The SIG Timestamp marks the creation of a session that is valid during a specific cryptoperiod that is saved in the SIG Blockchain Module and controlled by the Verification, Identity, Access, and Key Management System for the SIG session key 1422. The resolution of the SIG Timestamp is the maximum supported by the underlying software and hardware.

The Initial Vector (IV) is a non-repetitive value stored as an index in a database. Furthermore, the IV is considered public and could be transmitted in the clear.

In this embodiment, the SIG Initial Vector (IV) generated by module 1406 is a non-repetitive and non-predictable value that includes the SIG Timestamp, IV, and a random value generated by the Random Number Generator Module 1404. Therefore, the SIG Initial Vector (IV) provides further protection against replay attacks, precomputation attacks, and weak initial vectors. The standard recommendation for the SIG IV 1406 is a length of 96 bits, but longer lengths are allowed in byte increments including 128 bits.

Authenticated biometrics 1474 include checks from sensors capable of obtaining security features from DNA matching, ear shape, eyes (iris and retina), face recognition, fingerprint recognition, finger geometry recognition, gait style, hand geometry, odor, signature recognition, typing recognition, vein recognition, voice recognition.

Authenticated geofence sensors 1476 include location-based sensors capable of measuring a plurality of room features including but not limited to video, audio, temperature, pressure, motion detection, humidity, latitude, longitude, altitude. Categorial and binary data could be considered to compensate for calibration errors and sensor readings between the NBHA gateway 1464 and a wireless device. The plurality of geofence sensors are used for secure indoor geofence characterization.

The SIG sensors 1470 include the collective biometric checks, categorical, and binary results from the geofence sensors. In this invention, a sufficiently small delta is allowed to characterize a geofence from a plurality of sensors in order to preserve functionality among differences between hardware manufacturers of sensors. Furthermore, variations and patterns in the video, audio, temperature, motion detection, humidity, latitude, longitude, altitude are expected to characterize the geofence over periods for location-based authentication.

The increment functions illustrated in processes 1408, 1410, and 1412 are defined as the increment of the binary representation of a non-negative integer plus one or more depending on the implementation. Following convention, a non-negative integer called s and a string of bits called X where the length of X is equal or greater than the non-negative integer s. Thus, the increment function 1408, 1410, 1412 functions are more formally implemented as increment $(X)=MSB_{length(X)-s}(X)\|[integer(LSB_s(X))+1 \bmod 2^s]_s$ where MSB is the most significant bits defined in the subscript value, meanwhile LSB is the least significant bits limited in the subscript value.

The location-based security provided by the Secure Indoor Geofence Engine 1400 through the second channel with a short-range channel transmitter 1464 include a plurality of transmitted packets such as a Secure Indoor Geofence Authentication Code 1462, ciphertext segmented as a Secure Indoor Geofence Ciphertext:1 1436, a Secure Indoor Geofence Ciphertext:2 1438, and subsequent ciphertext represented as a Secure Indoor Geofence Ciphertext:N 1440.

The transmissions are carried by the capabilities, limitations, range, and throughput of the wireless short-range radio. In this embodiment, the packets are advertised multiple times in quick sequential bursts ensuring that at least one packet reaches the intended area of the secure indoor geofence. The NBHA gateway 1464 advertises packets using at least one Bluetooth low energy transmitter.

The authentication method and system are based on a cryptographic hash function defined by NIST as GHASH.

In this embodiment, a hash key: H 1458 is generated from the encipherment of a zero block 1454 using the block cipher 1456 and the secure indoor geofence session key 1422. The zero block 1454 is a string of zeros up to the block size accepted by the block cipher 1456.

Process 1434 includes the bit lengths of the authenticated data 1424, 1426, 1470, 1436, 1438, 1440 used by the Secure Indoor Geofence Cryptographic Engine 1400. In one embodiment of process 1434, a string of 128 bits corresponds to a decimal length representation of 128 or a binary value=1000 0000 or a hexadecimal value=80 which is the building block of a stream of data. In another embodiment of process 1434, the stream of data of 1 MB corresponds to a bit length of 8,388,608 or hexadecimal value=80 0000. Moreover, in another embodiment of process 1434, the stream of data of 64 GB corresponds to a bit length of 549,755,813,888 or hexadecimal value=80 0000 0000. Following the GCM recommendation, a new Secure Indoor Geofence session key is generated for the stream of data larger than 64 GB.

The authenticated data stream includes a plurality of data objects such as the NBHA gateway ID 1424, the Wireless Device ID 1426, a plurality of SIG Sensors 1470, a plurality of ciphertext 1436, 1438, up to 1440, and additional authenticated data determined by the practical implementation and integration of mobile applications.

The Galois Field ($2^8$) multiplication operations 1442, 1444, 1472, 1446, 1448, 1450, and 1452 using Hash Key: H 1458 are defined as the modular product of polynomials using a plurality of irreducible polynomials. In this invention, the plurality of irreducible polynomials is broadly defined as long as a uniform implementation is maintained across software and hardware or a combination thereof. The system and method allow for a wider range of irreducible polynomials including the prechosen values limited by the industry standards.

The Secure Indoor Geofence Authentication Code 1462 is computed using the GHASH function with NBHA gateway ID 1424, Wireless Device ID 1426, SIG Sensors 1470, Secure Indoor Geofence Ciphertext:1 1436, Secure Indoor Geofence Ciphertext:2 1438, up to Secure Indoor Geofence Ciphertext:N 1440, and process block 1434 containing the bit lengths. Thus, the Secure Indoor Geofence Authentication Code 1462 can be formally defined as $GHASH_H$ (NBHA gateway ID 1424||Wireless Device ID 1426||SIG Sensors 1470||Secure Indoor Geofence Ciphertext:1 1436||Secure indoor Geofence Ciphertext:2 1438|| . . . ||Secure Indoor Geofence Ciphertext:N 1440||process block 1434).

The Secure Indoor Geofence Authentication Code 1462 includes a plurality of lengths such as 32 bits, 64 bits, 96 bits, 104 bits, 112 bits, 120 bits, and 128 bits which depend on the limitations of the wireless short-range data section of a packet. Furthermore, the Secure Indoor Geofence Authentication Code 1462 is prepended to each ciphertext in order to identify advertising packets in a geofence.

Figure 15:
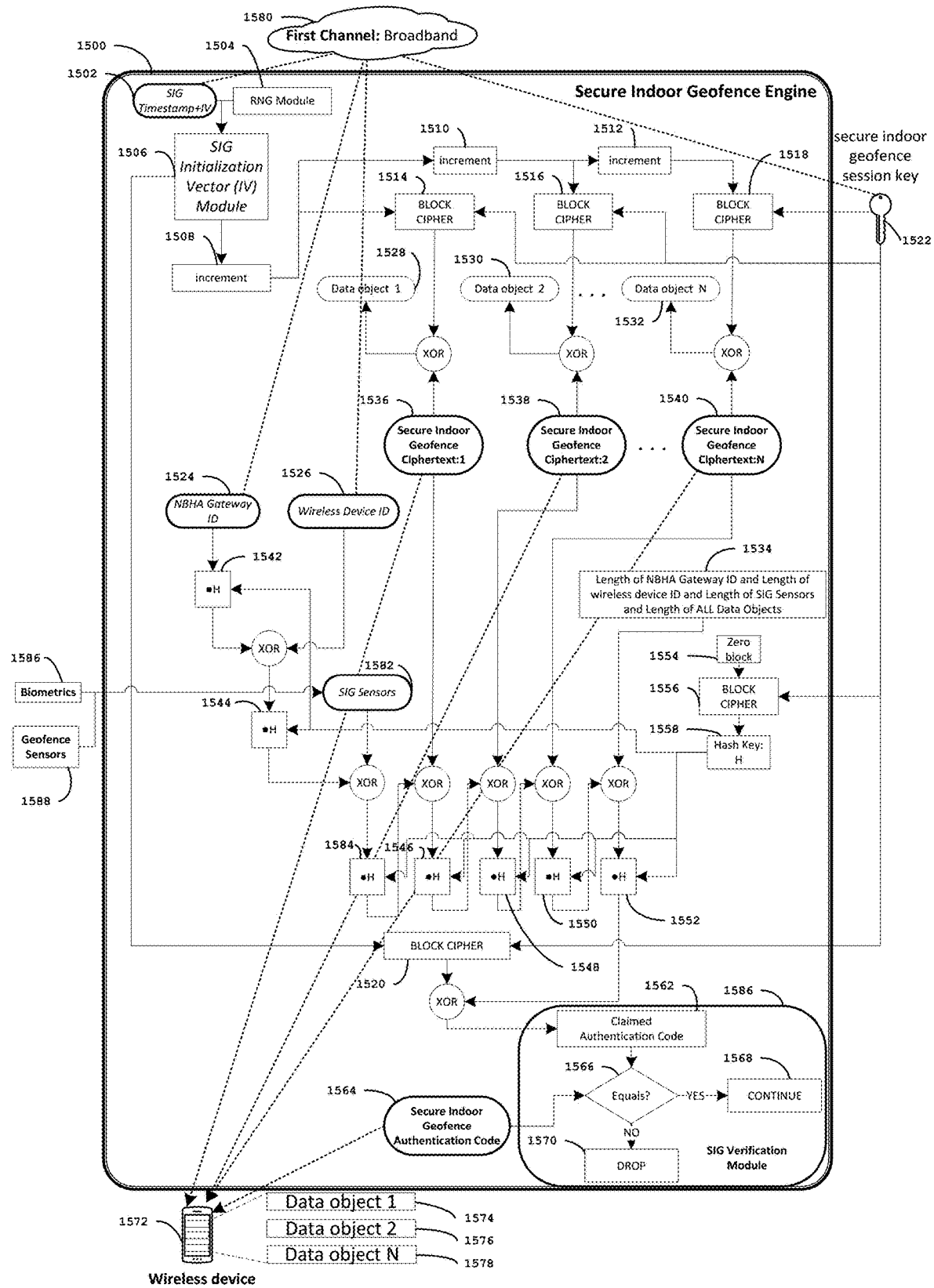
FIG. 15 shows a SIG engine for authenticated decryption with a broadband channel and a short-range channel.

Referring to FIG. 15, a Secure Indoor Geofence engine 1500 for authenticated decryption using a first broadband channel 1580 and a second short-range channel with a wireless device receiver 1572 for secure delivery of data objects 1574, 1576, and 1578 in a Secure Indoor Geofence (SIG) is shown. The possible outputs are the authenticated decipherment of a plurality of data objects illustrated in FIG. 15 as Data object 1 1528, Data object 2 1530, Data object N 1532 or an error code represented by a DROP 1570 process.

The system and method illustrated in FIG. 15 for authenticated decryption reuse the elements of FIG. 14 except for the inverse flow of data to obtain the plaintext and the SIG Verification Module 1586. In this embodiment, the SIG Verification Module 1586 provides a decision triangle 1566 to determine if the Claimed Authentication Code 1562 is equal to the received Secure Indoor Geofence Authentication Code 1564 inside the geofence. If the Claimed Authentication Code 1562 and the Secure Indoor Geofence Authentication Code 1564 are equal, then the decryption process continues shown as CONTINUE 1568. Otherwise, the packets are dropped using process DROP 1570.

The elements present in FIG. 12 operate as described in FIG. 11. High-throughput authenticated decryption includes the Secure Indoor Geofence Engine 1500, the secure indoor geofence session key 1522, the first broadband channel 1580, the wireless device with a short-range wireless receiver 1572, the Biometrics 1586 checks, and Geofence Sensors 1588.

The Secure Indoor Geofence Engine 1500 used for high-throughput authenticated decipherment includes the SIG Timestamp plus IV 1502, the RNG Module 1504, the SIG Initialization Vector (IV) Module 1506, the increments 1508, 1510, 1512, the block ciphers 1514, 1516, 1518, 1520, 1556, the NBHA gateway ID 1524, the Wireless Device ID 1526, the SIG Sensors 1582, the data objects 1528, 1530, up to 1532, the bit lengths computed by process 1534, ciphertexts 1536, 1538, up to 1540, the finite field multiplications 1542, 1544, 1584, 1546, 1548, 1550, 1552 with the Hash Key H 1558, the Zero block 1554, the SIG Verification Module 1586, and the Secure Indoor Geofence Authentication Code 1564.

The embodiment uses the first broadband channel to supply the wireless device 1572 with the SIG Timestamp plus IV 1502, the NBHA gateway ID 1524, the Wireless Device ID 1526, and the secure indoor geofence session key 1522. The wireless device receives through the short-range wireless receiver a plurality of data packets including the prepended Secure Indoor Geofence Authentication Code 1564, the Secure Indoor Geofence Ciphertext:1 1536, the Secure Indoor Geofence Ciphertext:2 1538, up to the Secure Indoor Geofence Ciphertext:N 1540.

The successfully authenticated decipherment of Data Object 1 1528, Data object 2 1530, up to Data object N 1532 is illustrated in the screen of the wireless device as Data object 1 1574, Data object 2 1576, up to Data object N 1578.

Figure 16:
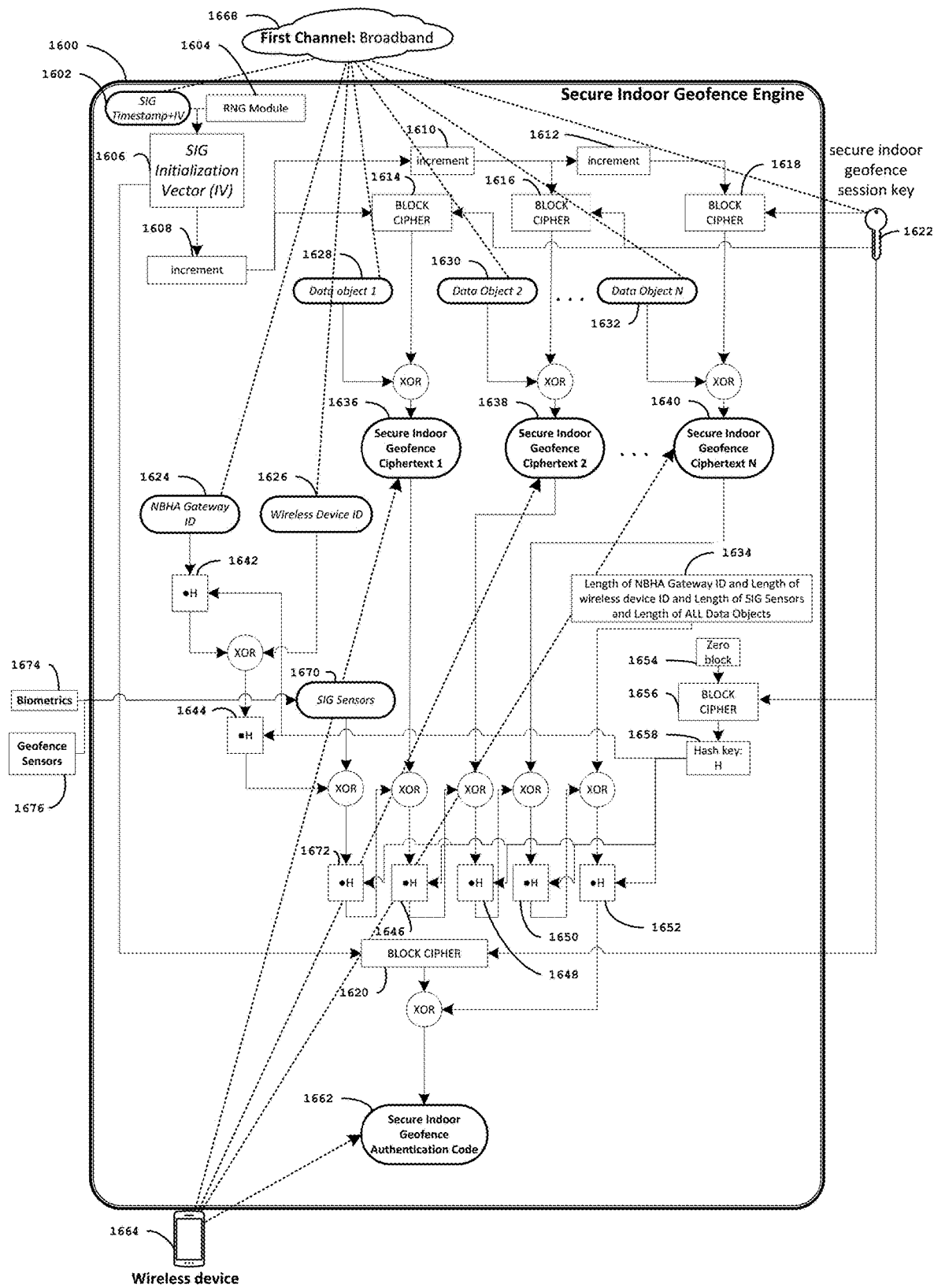
FIG. 16 shows a SIG engine for authenticated encryption with a broadband channel and a short-range channel.

FIG. 16 illustrates a Secure Indoor Geofence engine for authenticated encryption using a first broadband channel and a second short-range wireless channel with a wireless device transmitter for secure delivery of a plurality of data objects in a Secure Indoor Geofence (SIG).

Referring to FIG. 16, there is shown a Secure Indoor Geofence Cryptographic Engine 1600 for authenticated encryption using a first broadband channel 1668 and a second short-range wireless channel with a wireless device transmitter 1664 for secure delivery of data objects 1628, 1630, and 1632 in a Secure Indoor Geofence (SIG).

The flow of data of the Secure Indoor Geofence Engine 1600 is illustrated with lines and arrows for organization and clarity of the invention. Performance enhancements in software or hardware or a combination thereof are allowed as long as the inputs produce consistent outputs described in the embodiments and figures.

A secure indoor geofence session key 1622 must be freshly generated for every new session avoiding key reuse. As a result, the Verification, Identity, Access, and Key Management System provisions authenticated keying material using key distribution mechanisms including but not limited to a manual configuration with pre-shared keys, Internet Key Exchange (IKE and IKEv2), Kerberized Internet Negotiation of Keys (KINK), or IPSECKEY DNS records.

The secure indoor geofence session key 1622 is randomly generated with a uniform probability distribution meaning that any key has the same probability to be generated. Also, the secure indoor geofence session key 1622 is transmitted securely through a secure session (e.g., Transport Layer Security TLS) using the first broadband channel.

The Secure Indoor Geofence (SIG) Initialization Vector (IV) is produced by a SIG IV Module 1606 that aggregates the output of a Random Number Generator (RNG) module 1604 and a SIG timestamp plus a unique Initial Vector (IV) 1602 to prevent replay attacks. Furthermore, the SIG IV is incremented consecutively using predetermined increments 1608, 1610, and 1612 to effectively act as a counter incremented by choice of one, two or more steps that must be consistent across all implementations in hardware or software or a combination thereof. The cryptographic key of the system and method is a secure indoor geofence session key 1622 used by a plurality of block ciphers 1614, 1616, 1618, 1620, and 1656.

The block ciphers 1614, 1616, 1618, 1620, and 1656 employ their respective forward function implementations saving the implementation costs of the inverse function making the system ideal for small factor devices that require low power consumption such as IoT devices. In addition, the method and system provide large opportunities for reuse of resources. Thus, the inverse functions of the block ciphers 1614, 1616, 1618, 1620, and 1656 are not required in any of the implementations of the Secure Indoor Geofence Engine 1600 in hardware or software or a combination thereof. Furthermore, the requirements for a block cipher include a block size of 128 bits and a secure indoor geofence session key 1622 with a plurality of lengths including 128 bits, 192 bits, and 256 bits.

The Galois Counter (GCTR) functionality is illustrated in FIG. 16 and described as follows. The parameters used are $GCTR_K$ (SIG IV from 1606, Data object 1 1628, Data object 2 1630 through Data object N 1632) where K is the SIG session key 1622.

The inputs provided to the Secure Indoor Geofence Cryptographic Engine 1600 through the first broadband channel 1668 include the SIG session key 1622, the SIG Timestamp plus Initial Vector (IV) 1602, the NBHA gateway ID 1624, the Wireless Device ID 1626, a plurality of plaintext segmented into data objects 1628, 1630, up to 1632. Additional inputs include a plurality of Secure Indoor Geofence sensors 1670 captured by a plurality of geofence sensors 1676 and a plurality of biometrics 1674 checks. All inputs must be multiples of 8 bits (1 byte).

The SIG Timestamp marks the creation of a session that is valid during a specific cryptoperiod that is logged in the Transactional System and controlled by the Verification, Identity, Access, and Key Management System for the SIG session key 1622.

In the embodiment of FIG. 16, the SIG Initial Vector (IV) generated by process 1606 is a non-repetitive and non-predictable value that includes the SIG Timestamp, IV, and a random value generated by the Random Number Generator Module 1604. Therefore, the SIG Initial Vector (IV) provides further protection against replay attacks, precomputation attacks, and weak initial vectors. The standard recommendation for the SIG IV 1606 is a length of 96 bits, but longer lengths are allowed in byte increments including 128 bits.

Authenticated biometrics 1674 include checks from sensors capable of obtaining security features from DNA matching, ear shape, eyes (iris and retina), face recognition, fingerprint recognition, finger geometry recognition, gait style, hand geometry, odor, signature recognition, typing recognition, vein recognition, voice recognition.

Authenticated geofence sensors 1676 include location-based sensors capable of measuring a plurality of room features including but not limited to video, audio, temperature, pressure, motion detection, humidity, latitude, longitude, altitude. Categorical and binary data could be considered to compensate for calibration errors and sensor readings between the wireless device 1664 and a NBHA gateway.

The SIG sensors 1670 include the collective biometric checks, categorical, and binary results from the geofence sensors. In this invention, a sufficiently small delta is allowed to characterize a geofence from a plurality of sensors in order to preserve functionality among differences between hardware manufacturers of sensors. Furthermore, variations and patterns in the video, audio, temperature, motion detection, humidity, latitude, longitude, altitude are expected to characterize the geofence over periods for location-based authentication.

The increment functions illustrated in processes 1608, 1610, and 1612 are defined as the increment of the binary representation of a non-negative integer plus one or more depending on the implementation. Following convention, a non-negative integer called s and a string of bits called X where the length of X is equal or greater than the non-negative integer s. Thus, the increment function 1608, 1610, 1612 functions are more formally implemented as increment $(X) = MSB_{length(X)-s}(X) \| [integer(LSB_s(X))+1 \mod 2^s]_s$ where MSB is the most significant bits defined in the subscript value, meanwhile LSB is the least significant bits limited in the subscript value.

The location-based security provided by the Secure Indoor Geofence Cryptographic Engine 1600 through the second channel with a short-range channel transmitter 1664 include a plurality of transmitted packets such as a Secure Indoor Geofence Authentication Code 1662, ciphertext segmented as a Secure Indoor Geofence Ciphertext:1 1636, a Secure Indoor Geofence Ciphertext:2 1638, and subsequent ciphertext represented as a Secure Indoor Geofence Ciphertext:N 1640.

The transmissions are carried by the capabilities, limitations, range, and throughput of the wireless short-range radio. In this embodiment, the packets are advertised multiple times in quick sequential bursts ensuring that at least one packet reaches the intended area of the secure indoor geofence. The Wireless device 1664 advertises packets using at least one Bluetooth low energy transmitter.

In the embodiment of FIG. 16, a hash key: H 1658 is generated from the encipherment of a zero block 1654 using the block cipher 1656 and the secure indoor geofence session key 1622. The zero block 1654 is a string of zeros up to the block size accepted by the block cipher 1656.

Process 1634 includes the bit lengths of the authenticated data 1624, 1626, 1670, 1636, 1638, 1640 used by the Secure Indoor Geofence Engine 1600. In one embodiment of process 1634, a string of 128 bits corresponds to a decimal length representation of 128 or a binary value=1000 0000 or a hexadecimal value=80 which is the building block of a stream of data. In another embodiment of process 1634, the stream of data of 1 MB corresponds to a bit length of 8,388,608 or hexadecimal value=80 0000. Moreover, in another embodiment of process 1634, the stream of data of 64 GB corresponds to a bit length of 549,755,813,888 or hexadecimal value=80 0000 0000.

The authenticated data stream includes a plurality of data objects such as the NBHA gateway ID 1624, the Wireless Device ID 1626, a plurality of SIG Sensors 1670, a plurality of ciphertext 1636, 1638, up to 1640, and additional authenticated data determined by the practical implementation and integration of mobile applications.

The Galois Field ($2^8$) multiplication operations 1642, 1644, 1672, 1646, 1648, 1650, and 1652 using Hash Key: H 1658 are defined as the modular product of polynomials using a plurality of irreducible polynomials.

The Secure Indoor Geofence Authentication Code 1662 is computed using the GHASH function with NBHA gateway ID 1624, Wireless Device ID 1626, SIG Sensors 1670, Secure Indoor Geofence Ciphertext:1 1636, Secure Indoor Geofence Ciphertext:2 1638, up to Secure Indoor Geofence Ciphertext:N 1640, and process block 1634 containing the bit lengths. Thus, the Secure Indoor Geofence Authentication Code 1662 can be formally defined as $GHASH_H$ (NBHA gateway ID 1624||Wireless Device ID 1626||SIG Sensors 1670||Secure Indoor Geofence Ciphertext:1 1636||Secure indoor Geofence Ciphertext:2 1638|| . . . ||Secure Indoor Geofence Ciphertext:N 1640||process block 1634).

The Secure Indoor Geofence Authentication Code 1662 includes a plurality of lengths such as 32 bits, 64 bits, 96 bits, 104 bits, 112 bits, 120 bits, and 128 bits which depend on the limitations of the wireless short-range data section of a packet. Furthermore, the Secure Indoor Geofence Authentication Code 1662 is prepended to each ciphertext in order to identify advertising packets in a geofence.

Figure 17:
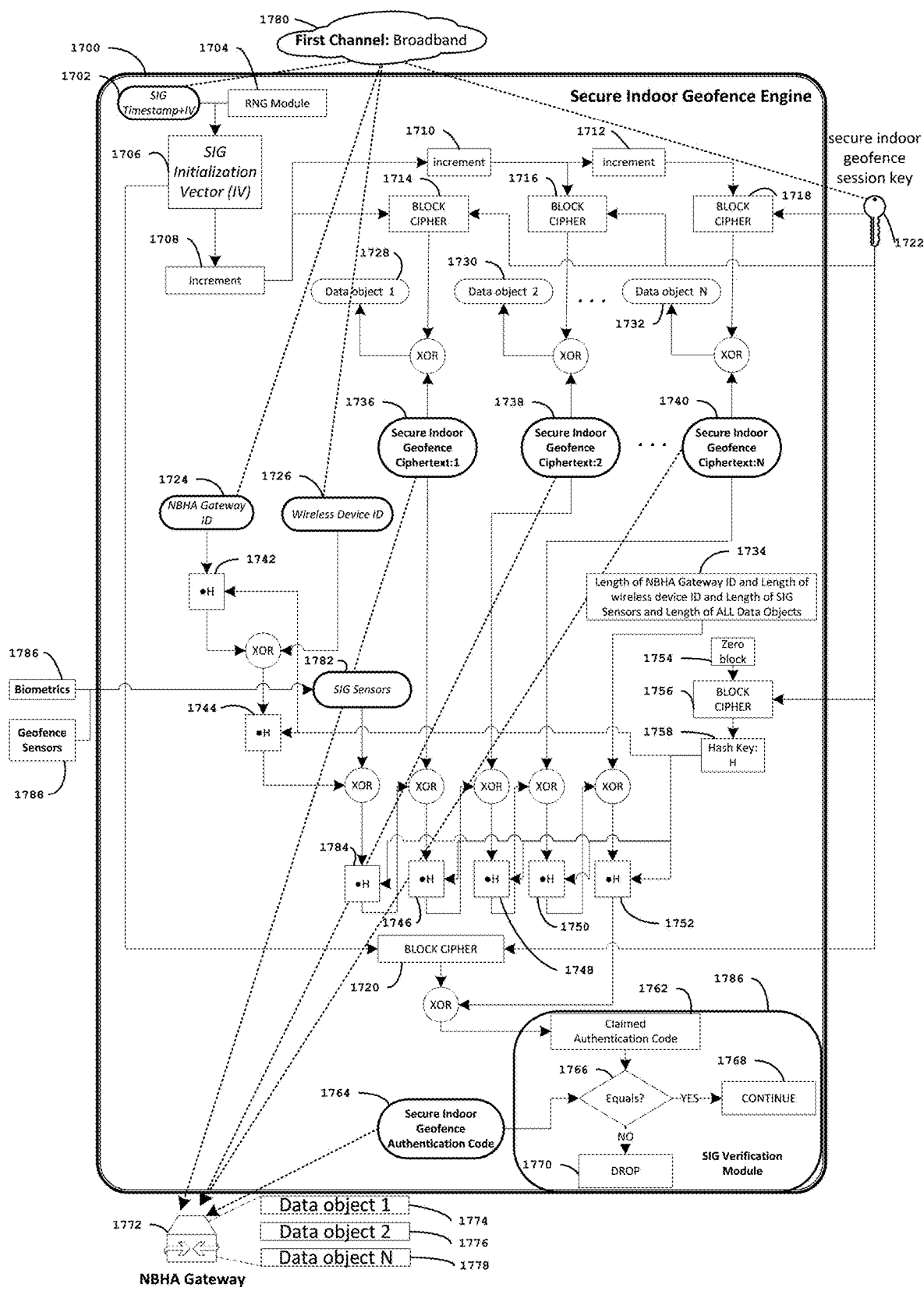
FIG. 17 shows a SIG cryptographic engine for authenticated decryption with a broadband channel and a short-range channel.

Referring to FIG. 17, there is shown a Secure Indoor Geofence Cryptographic Engine 1700 for authenticated decryption using a first broadband channel 1780 and a second short-range channel with a wireless device receiver 1772 for secure delivery of data objects 1774, 1776, and 1778 in a Secure Indoor Geofence (SIG). The possible outputs are the authenticated decipherment of a plurality of data objects illustrated in FIG. 17 as Data object 1 1728, Data object 2 1730, Data object N 1732 or an error code represented by a DROP 1770 process.

The system and method illustrated in FIG. 17 for authenticated decryption reuse the elements of FIG. 16 except for the inverse flow of data to obtain the plaintext and the SIG Verification Module 1786. In this embodiment, the SIG Verification Module 1786 provides a decision triangle 1766 to determine if the Claimed Authentication Code 1762 is equal to the received Secure Indoor Geofence Authentication Code 1764 inside the geofence. If the Claimed Authentication Code 1762 and the Secure Indoor Geofence Authentication Code 1764 are equal, then the decryption process continues shown as CONTINUE 1768. Otherwise, the packets are dropped using process DROP 1770.

The elements present in FIG. 17 operate as described above for FIG. 16. High-throughput authenticated decryption includes the Secure Indoor Geofence Engine 1700, the secure indoor geofence session key 1722, the first broadband channel 1780, the wireless device with a short-range wireless receiver 1772, the Biometrics 1786 checks, and Geofence Sensors 1788.

The Secure Indoor Geofence Engine 1700 used for high-throughput authenticated decipherment includes the SIG Timestamp plus IV 1702, the RNG Module 1704, the SIG Initialization Vector (IV) Module 1706, the increments 1708, 1710, 1712, the block ciphers 1714, 1716, 1718, 1720, 1756, the NBHA gateway ID 1724, the Wireless Device ID 1726, the SIG Sensors 1782, the data objects 1728, 1730, up to 1732, the bit lengths computed by process 1734, ciphertexts 1736, 1738, up to 1740, the finite field multiplications 1742, 1744, 1784, 1746, 1748, 1750, 1752 with the Hash Key H 1758, the Zero block 1754, the SIG Verification Module 1786, and the Secure Indoor Geofence Authentication Code 1764.

The embodiment uses the first broadband channel to supply the NBHA gateway 1772 with the SIG Timestamp plus IV 1702, the NBHA gateway ID 1724, the Wireless Device ID 1726, and the secure indoor geofence session key 1722. The NBHA gateway receives through the short-range wireless receiver a plurality of data packets including the prepended Secure Indoor Geofence Authentication Code 1764, the Secure Indoor Geofence Ciphertext:1 1736, the Secure Indoor Geofence Ciphertext:2 1738, up to the Secure Indoor Geofence Ciphertext:N 1740.

The successfully authenticated decipherment of Data Object 1 1728, Data object 2 1730, up to Data object N 1732 is illustrated internally as Data object 1 1774, Data object 2 1776, up to Data object N 1778.

Figure 18:
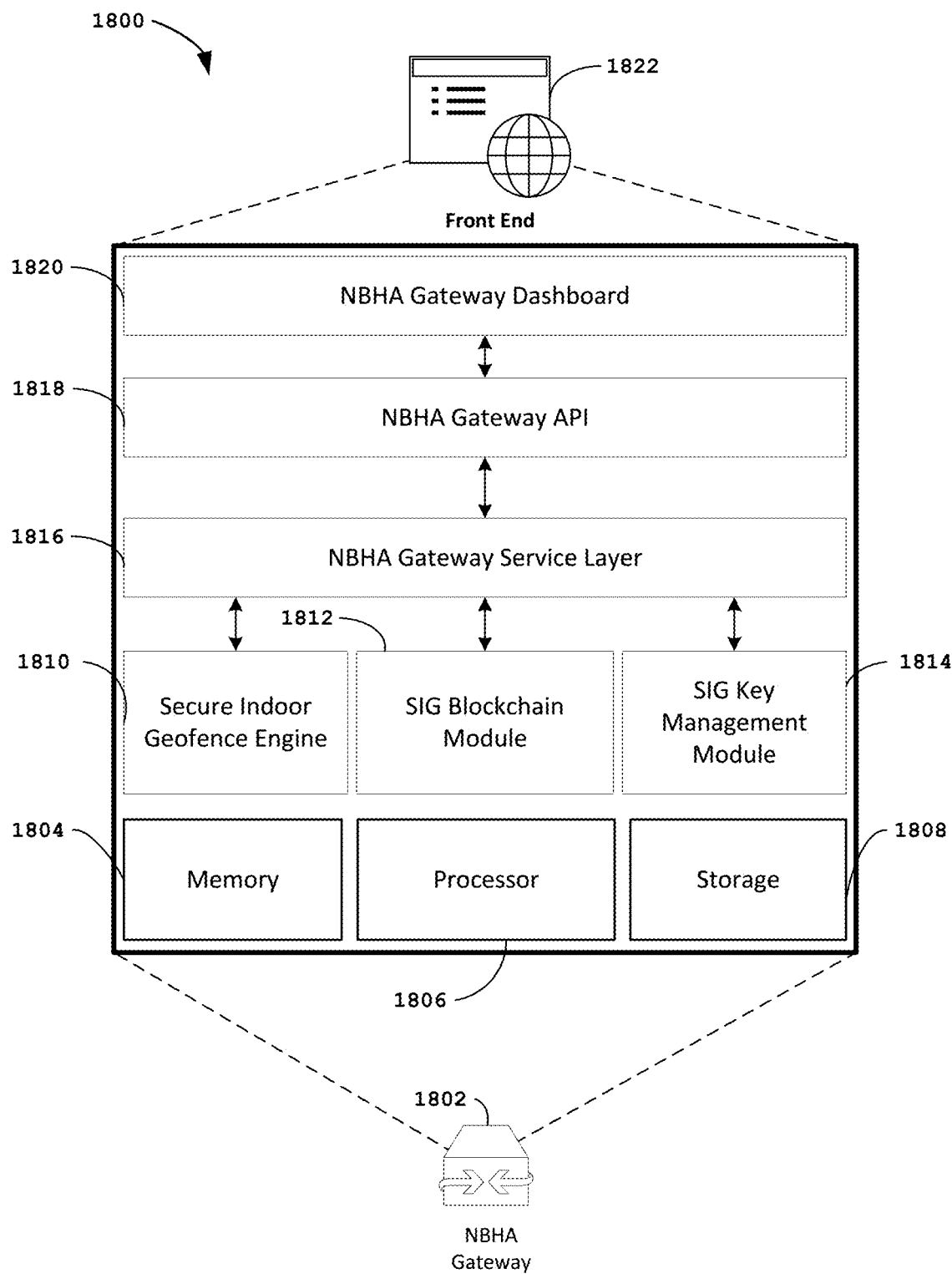
FIG. 18 shows a front-end architecture for the NBHA gateway.

Referring to FIG. 18, there is shown a front-end architecture 1800 for the NBHA gateway 1802. The NBHA gateway 1802 is an embedded system including computing elements such as memory 1804, processor 1806, and storage 1808. The Secure Indoor Geofence Engine 1810, the SIG Blockchain Module 1812, and the SIG Key Management Module 1814 execute on top of the underlying computing capabilities provided by the hardware embedded in the NBHA gateway 1802. A service layer called NBHA gateway Service Layer 1816 offers connectivity ports between the lower level architecture and the NBHA gateway Application Programming Interface (API) 1818. The NBHA gateway API 1818 provides services for authenticated users for key generation, key activation, key expiration, key escrow, and key destruction. The NBHA gateway Dashboard 1820 allows remote monitoring, configuration, and management of the NBHA gateway 1802.

Figure 19A:
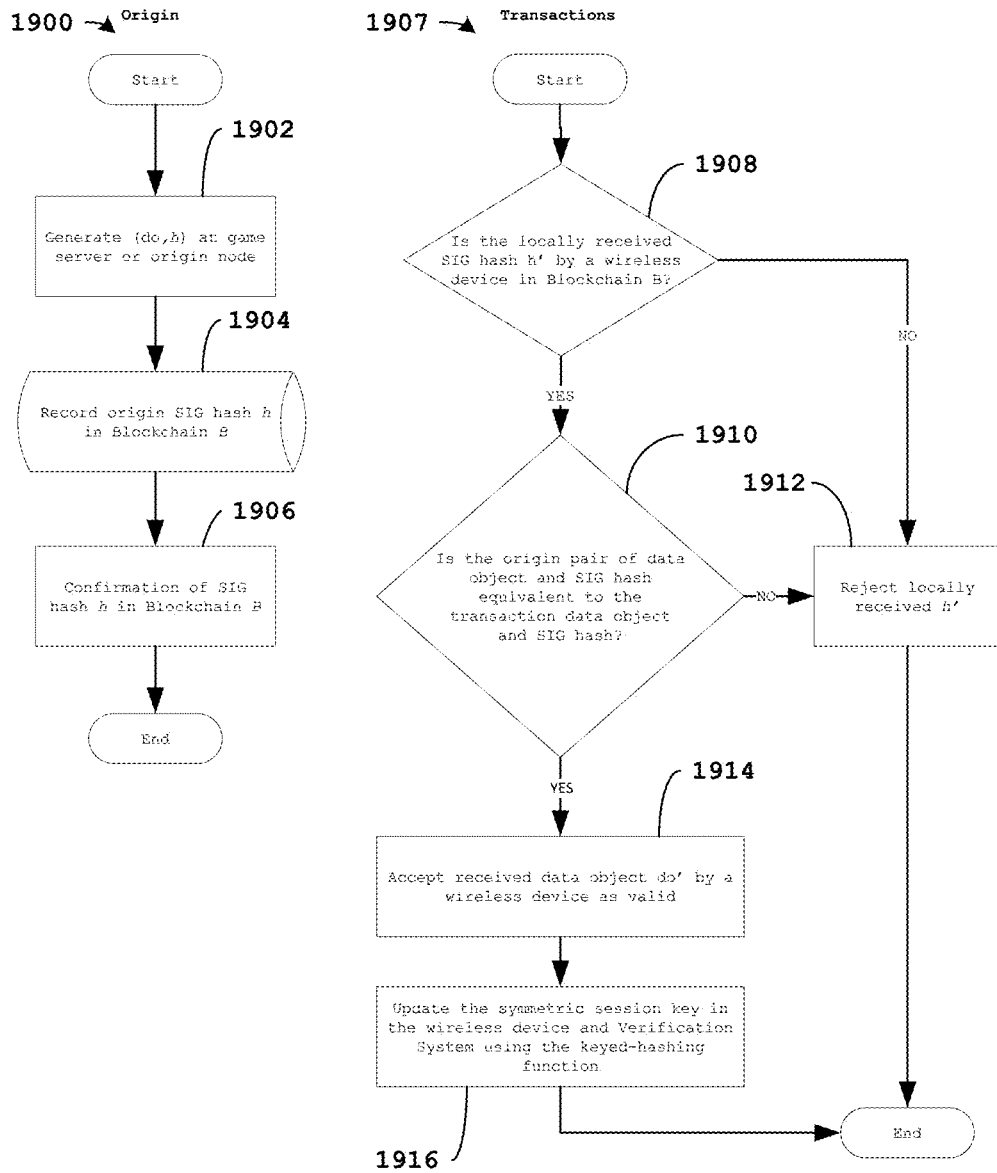
FIG. 19A shows a flowchart for dual channel location-based authentication with blockchain.

FIG. 19A shows a flowchart of dual channel location-based authentication with blockchain. A blockchain is used as a ledger to keep track of SIG hashes, perform transactions, and smart contracts. An illustrative origin architecture 1900 contains a pair of data objects referred as, do, and a SIG hash referenced as, h, produced by a game server and stored in a plurality of object storage services (e.g., Azure Blob Storage, Amazon S3, open source object storage servers). Ideally, all game outcomes, media assets, configuration data blocks, binary data blocks should reside in an accessible object storage service through a broadband channel. Therefore, in block 1902 the initial process generates a 2-tuple (do, h) at the origin node or game server. The process 1904 records origin SIG hash, h, in a Blockchain called, B. Afterward; a process 1906 confirms the existence of SIG hash, h, in Blockchain, B.

Compared to the origin system and method 1900, an illustrative transaction 1907 is a delivery of a hyperlocal data object through a SIG hash inside a geofence. The decision 1908 determines if the locally received SIG hash, h', exists in Blockchain, B. If the SIG hash, h', is not in Blockchain B then process 1912 rejects the locally received SIG hash, h'. Otherwise, the decision 1910 determines if the origin pair of the data object and SIG hash is equivalent to the transaction data object and SIG hash. If the pairs are equivalent, then process 1914 accepts the received data object, do'. Successful delivery of a data object would require key rotation through process 1916 that updates the symmetric session using the keyed-hashing function in the wireless device and Verification System. Evidently, in an alternative embodiment, the delivery of a public or non-critical data object could be quickly served to a wireless device without further validation. By comparison, a critical game outcome should be pre-generated, fully verified, and recorded by a Game Server in the Blockchain, B, using systems and models 1900 and 1907.

Figure 19B:
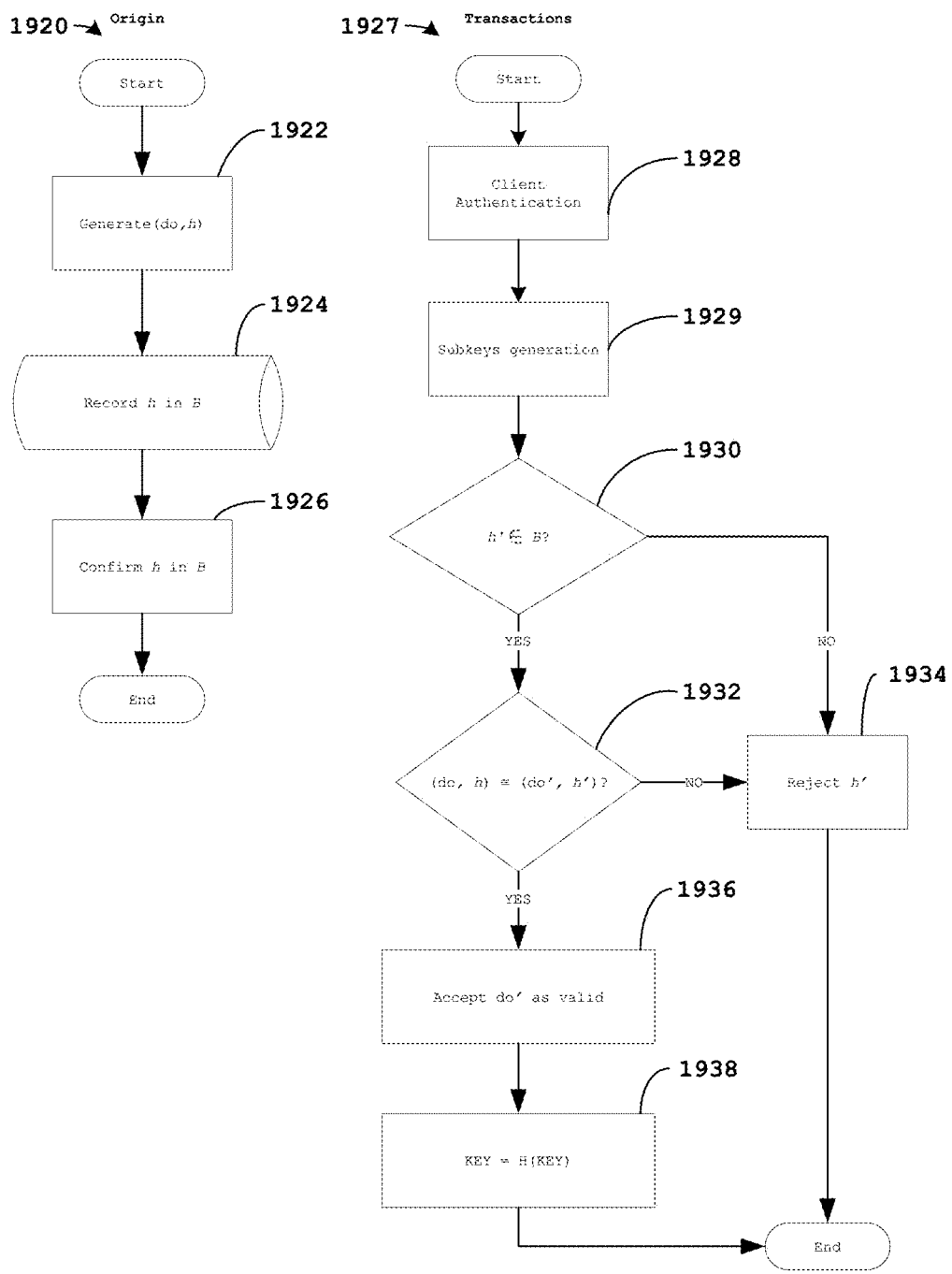
FIG. 19B shows a reduced flowchart for dual channel location-based authentication with blockchain.

FIG. 19B shows a reduced flowchart of dual channel location-based authentication with blockchain. The illustrative system and method of origin 1920 and transactions 1927 illustrate a summary of operations. The process 1922 generates origin pair (do, h). Afterward, process 1924 records, h, in, B. Lastly, process 1926 confirms, h, in, B. Compared to the origin system and method 1920, the illustrative flowchart of transactions 1927 contains a summary of operations for the delivery of a hyperlocal data object through a SIG hash inside a geofence. Process 1928 performs user authentication. Afterward, the process described in 1929 generates subkeys from key material. Next, decision 1930 determines if h', exists in, B. Furthermore, decision 1932 determines if the pair (do, h) is equivalent to (do', h'). Unsuccessful decisions are rejected by process 1934. Subsequently, process 1936 accepts, do', as valid. Last, process 1938 rotates an AES key, AES_KEY, using a keyed-hashing function, H.

According to the National Institute of Standards and Technology (NIST, 2017), there are two approved symmetric block ciphers, S, that can be used for cryptographic protection (e.g., encryption) and removing or verifying the protection that was previously applied (e.g., decryption): Advanced Encryption Standard (AES) and Triple DES. Moreover, AES is under a continuous peer review cycle and persists as a viable symmetric block cipher for security applications. According to NIST publication 800-57 Rev. 4, key lengths of 128 bits, 192 bits, and 256 bits would remain acceptable through 2030, including 2031 and beyond. Meanwhile, key lengths of less than 112 bits must be discontinued in current and future security applications.

The block size of the Advanced Encryption Standard (AES) is 128 bits, and the recommended Initial Vector is 128 bits. The Cipher Block Chaining (CBC) mode is used for added security with a SIG Initialization Vector (IV).

Figure 20A:
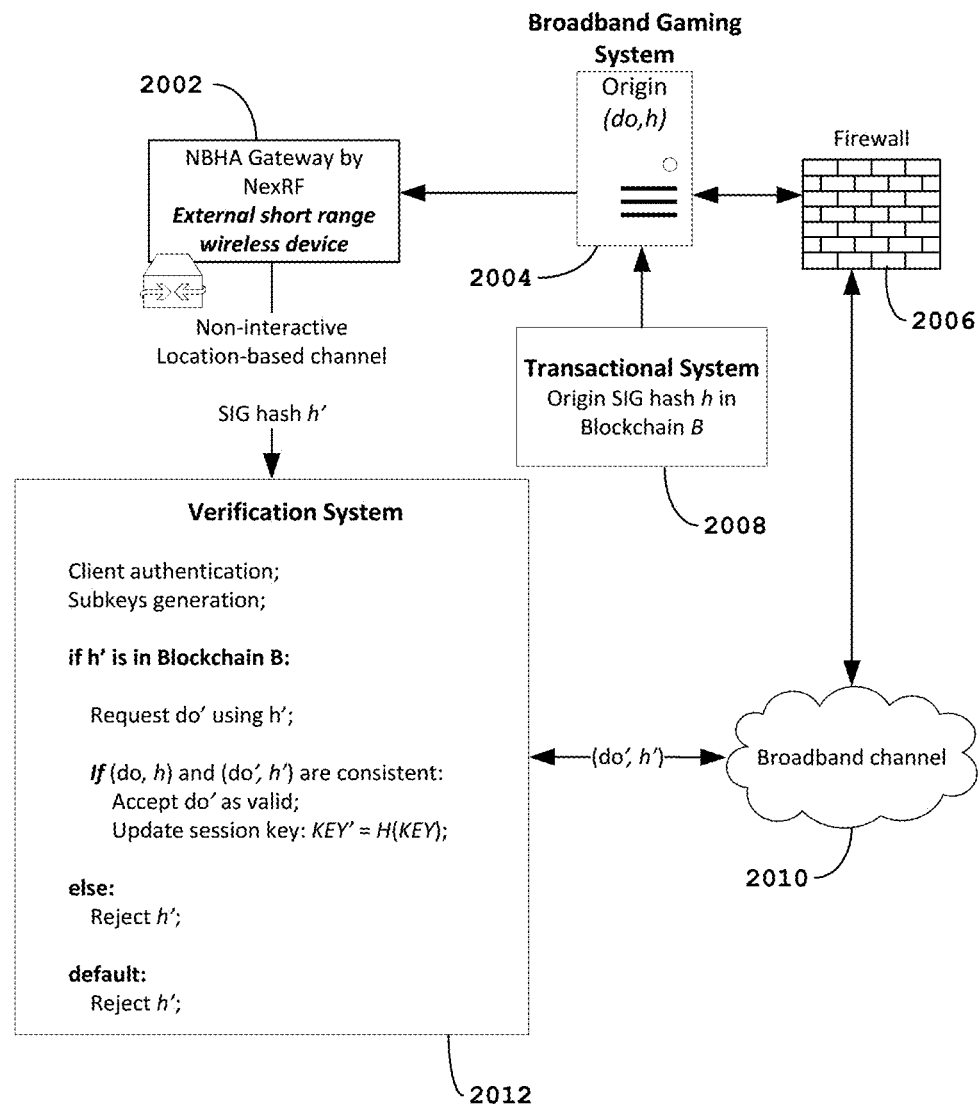
FIG. 20A shows a non-interactive architecture of dual channel location-based authentication with blockchain.

FIG. 20A shows a non-interactive architecture of dual channel location-based authentication with blockchain. A non-interactive method and system, a set of SIG hashes are delivered in a geofence maintaining a strict advertise and discovery model. In the illustrative embodiment, the NBHA gateway functions as a secure smart beacon. The NBHA gateway equipped with an external short-range wireless device 2002 advertises a SIG hash, h', relayed by a broadband gaming system 2004. An origin pair of a data object, do, and a SIG hash, h, are generated and recorded by a broadband gaming system 2004 using a transactional system 2008 with Blockchain, B. A broadband channel 2010 supplies the bandwidth to securely deliver large data objects, do', using the verification system 2012. The illustrative firewall 2006 provides packet filtering, deep packet inspection (DPI), intrusion detection system (IDS), and intrusion prevention system (IPS).

Figure 20B:
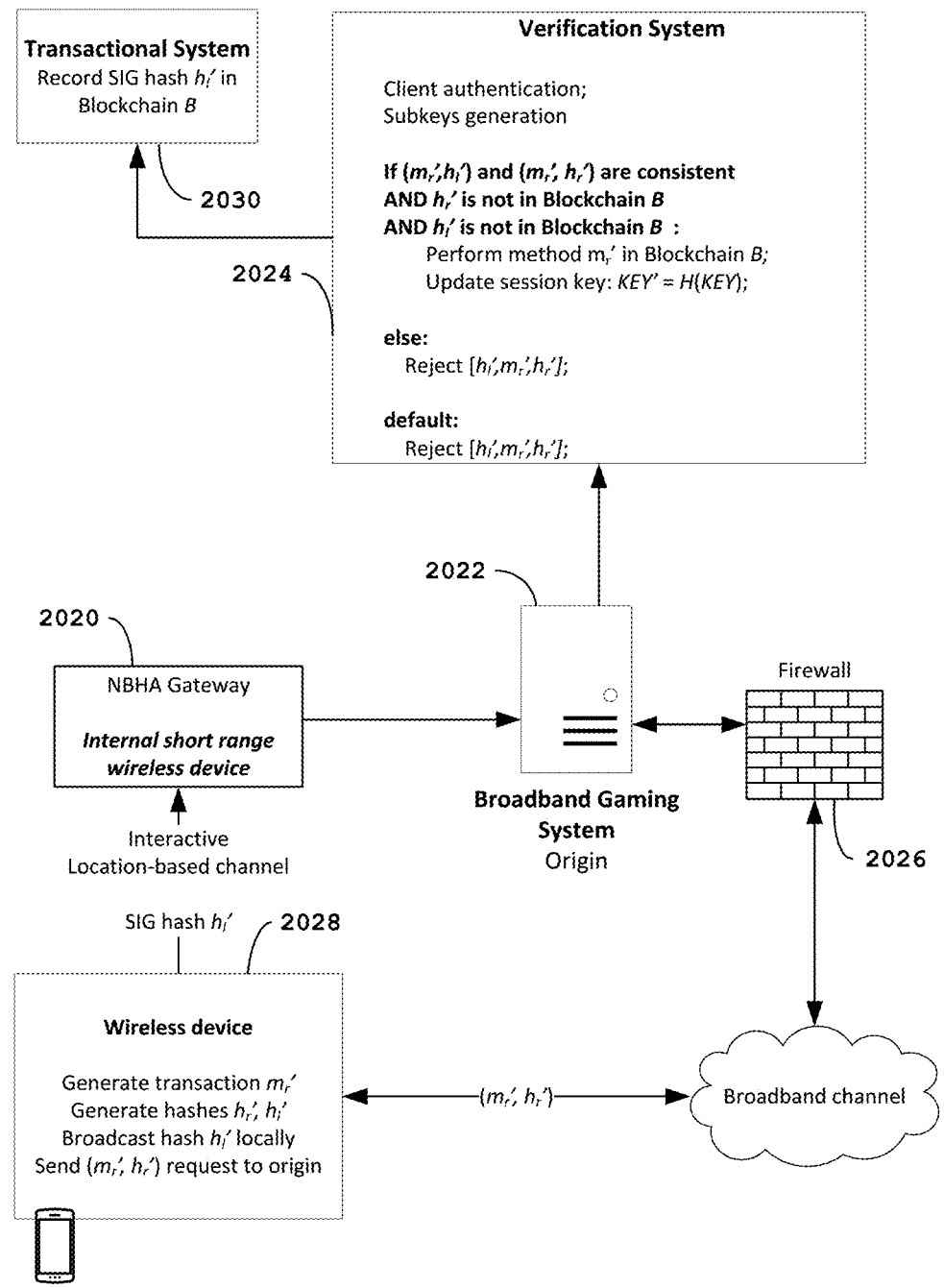
FIG. 20B shows an interactive architecture of dual channel location-based authentication with blockchain.

FIG. 20B shows an interactive architecture of dual channel location-based authentication with blockchain. An interactive method and system, a set of SIG hashes are delivered in a geofence maintaining a strict advertise and discovery model. In the illustrative embodiment, the NBHA gateway scans local SIG hashes. The NBHA gateway is equipped with an internal short range wireless device 2020 to scan a local SIG hash, hl', advertised by a wireless device 2028. The broadband gaming system 2022 receives the local SIG hash, hl', to be authenticated by a verification system 1624 and recorded by a transactional system 2030. The illustrative firewall 2026 provides packet filtering, deep packet inspection (DPI), intrusion detection system (IDS), and intrusion prevention system (IPS).

Figure 21:
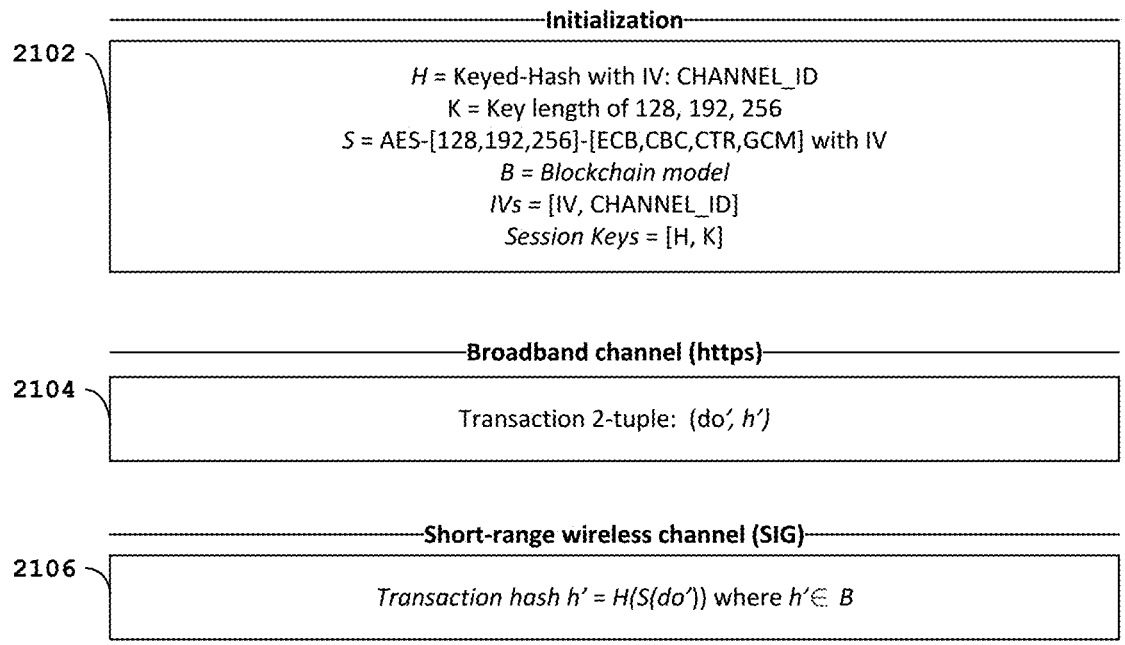
FIG. 21 shows the phases of dual channel location-based authentication with blockchain.

FIG. 21 shows the phases of dual channel location-based authentication with blockchain. The initialization phase 2102 includes a Keyed-Hash algorithm, H, a symmetric block cipher, S, a blockchain, B, initial vectors, IVs, and session keys. In addition, the broadband channel interacts with an API through HTTPS using transaction 2-tuple, (do', h') 2104. The illustrative phase 2106 manages the location-based transaction SIG hashes, h', defined as the keyed-hash, H, of an encrypted data object, S(do'), where, h,' exists in Blockchain, B.

During the initialization phase, a Verification System is required to distribute the session keys to clients. User authentication, through https, is needed to interact with a REST API. The purpose of the initialization phase is to set a keyed-hash, H, with an Initialization Vector, IV, called CHANNEL_ID. The NBHA gateway supports AES-(128, 192,256)-(ECB, CBC, CTR, GCM) for throughput and performance benchmarking. Electronic codebook (ECB) mode is a basic mode of operation for AES. Furthermore, security improvements with stronger algorithms and longer key length must adhere to the recommendations for Block Cipher Techniques by NIST specified on SP 800-38A. Code Block Chaining (CBC) is performed with the ciphertext of the previous (BLE) packet. The IV is called AES_IV. A blockchain, B, is required to guarantee the integrity of transactions.

After each transaction, a new derived key is produced from a previous key using keyed-hash algorithms. If a user losses communication (e.g., out of range of geofence) and reestablishes the connection (e.g., reenter geofence) then a new set of session keys must be re-established along with Initialization Vectors (IVs).

Scavenger Speed Bingo is an illustrative game for dual channel location-based authentication for secure delivery of hyperlocal data objects. The communication protocol is based on the Secure Indoor Geofencing (SIG) module. Furthermore, the Scavenger Speed BINGO demonstrates the capabilities of the NBHA gateway. The game is based on the game of Bingo with a scavenging component based on dynamic geofences.

Figure 22:
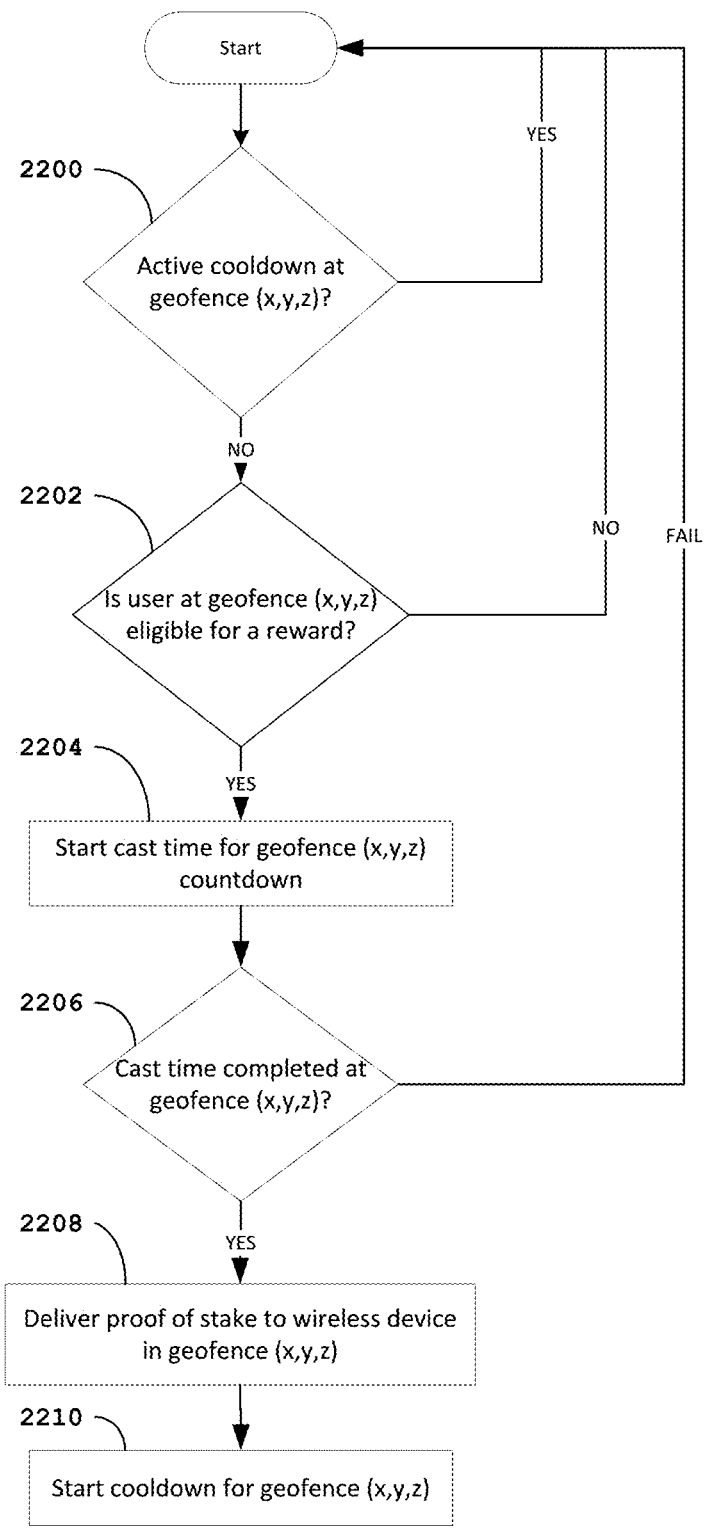
FIG. 22 shows a flowchart method for providing a cast-time cool down associated with a geofence.

FIG. 22 shows an illustrative flowchart of a location-based cast time, cooldown, and reward gaming mechanism used as a proof-of-work or proof-of-stake for gaming credits, redeemable cash (e.g., cryptocurrency), free rooms, room upgrades, tickets to show, show upgrades, complimentary restaurant meals, complimentary gifts, and services. An active cooldown is defined in this embodiment as the time segment needed to elapse before a reward becomes eligible.

First, decision 2200 determines if an active cooldown is in effect at geofence with coordinates x, y, and z. A Cartesian coordinate system with three dimensions with axes named x, y, and z define a position inside the geofence. Next, decision 2202 checks if a user located inside the geofence becomes eligible for a reward. Thus, the reward is offered to a user entering a geofence and completing a cast time or waiting time represented in process 2204. Furthermore, the cast time is used to validate and authenticate the proof-of-work or proof-of-stake at decision diamond 2206. If the proof-of-work or proof-of-stake is completed successfully, then the wireless device receives the reward for the user in geofence (x,y,z) 2208. A user who collected the reward starts a cooldown period to gauge the frequency and amount of rewards offered to the public 2210 by a central authority. In this embodiment, the cooldown period may vary from fractions of a second to years depending on the demand and supply of rewards. In addition, the cooldown period could be set up for the general public or per user. Lastly, in this embodiment, the physical effort of a user with a wireless device entering a geofence to complete the cast time constitutes the proof-of-work or proof-of-stake to obtain a proportional reward. For instance, a membership system would yield certain rewards based on the player level and engagement.

Figure 23:
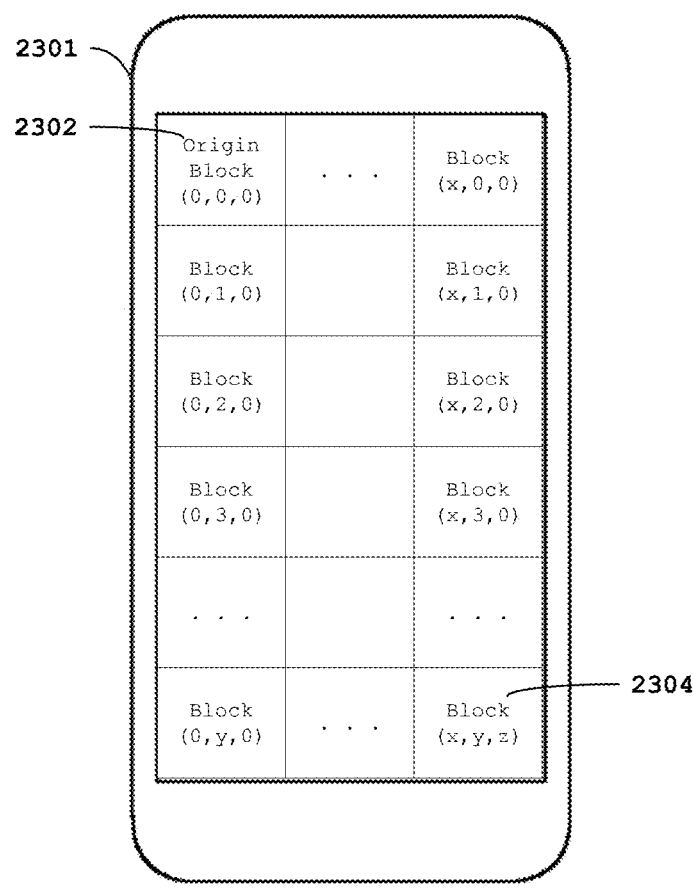
FIG. 23 shows the backend location grid.

FIG. 23 shows the backend location grid. An illustrative wireless device 2301 represents a plurality of views at different zoom levels. By way of example and not of limitation, the geofences are divided into Blocks with coordinates x, y, and z illustrated in a two-dimensional grid. Again, by way of example and not of limitation, an origin block relative to a geofence is defined as origin block (0,0,0) 2302. Meanwhile, all blocks are represented as coordinates (x,y,z) 2304. The dimensions and precision of the Local Positioning System (LPS) are dependent on the fidelity of the short-range wireless radio for indoor location.

The general process of determining the map position of a wireless device equipped with a short-range wireless radio, such as Bluetooth Low Energy (BLE), requires scanning, libraries, fingerprints, and a comparator to generate a position in space with an associated timestamp. Specifically, a BLE scanning module acquires the advertised BLE packets to extract all the features. The features are transferred to a comparator for storage and data process through a pattern recognition model such as Kriging. In addition, Kriging is considered a modern approach and treatment for Local Positioning Systems (LPS). The output is reported as the estimated location in space with an associated timestamp of an object which can be further processed by a front-end application.

Figure 24A:
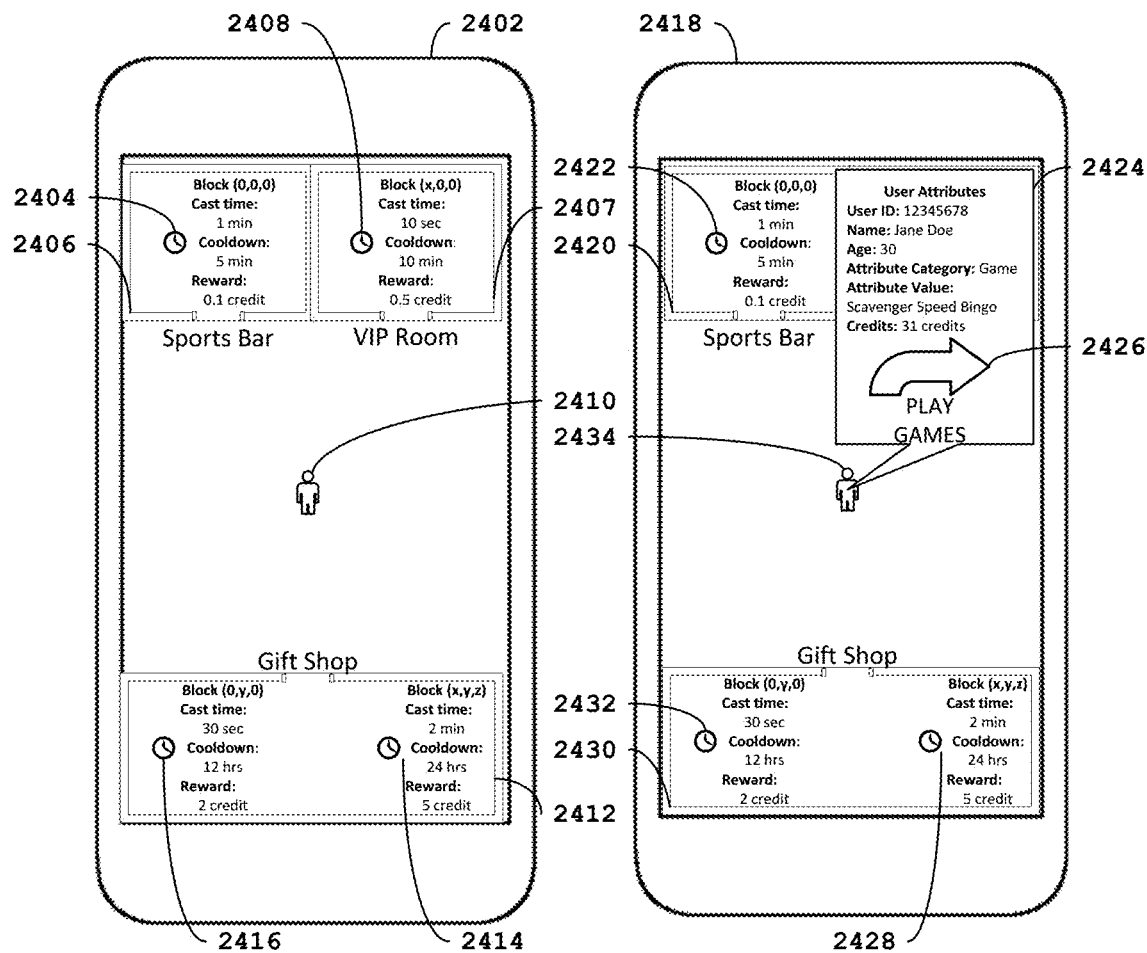
FIGS. 24A and 24B show an indoor augmented reality user interface.

FIG. 24A shows the indoor augmented reality user interface. An illustrative embodiment of an indoor augmented reality user interface is displayed in a wireless device 2402 and 2418. The user interface contains a block (0,0,0) with a cast time (1 min), a cooldown (5 min), and a reward (0.1 credit) 2404 in the illustrative Sports Bar area 2406 and 2420. Also, the location of a user 2410 and 2434 is displayed in the user interface. Furthermore, additional rewards are offered in multiple geofences. For instance, Block (x,0,0) 2408, Block (0,y,0) 2416 and 2432, and Block (x,y,z) 2414 and 2428 offer challenges with variable cast time, cooldown, and reward. Moreover, the map contains an illustrative VIP Room 2408 and a Gift Shop 2412 and 2430. Last, the popup 2424 shows an interactive dialog with User Attributes (e.g., 31 credits) 2424 and the ability to launch a location-based service such as a game 2426.

Figure 24B:
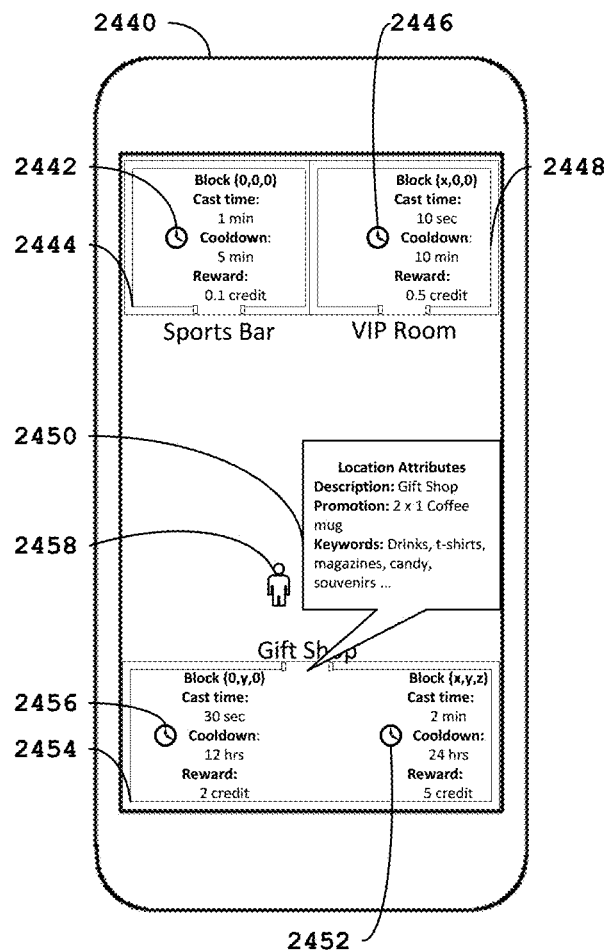

FIG. 24B shows the indoor augmented reality user interface. An illustrative embodiment of an indoor augmented reality user interface is displayed in a wireless device 2440. The user interface contains a block (0,0,0) with a cast time (1 min), a cooldown (5 min), and a reward (0.1 credit) 2442 in the illustrative Sports Bar area 2444. Also, the location of a user 2458 is displayed in the user interface. Furthermore, additional rewards are offered in multiple geofences. For instance, Block (x,0,0) 2446, Block (0,y,0) 2456 and Block (x,y,z) 2452 offer challenges with variable cast time, cooldown, and reward. Moreover, the map contains an illustrative VIP Room 2448 and a Gift Shop 2454. Lastly, the popup 2450 shows an interactive dialog with map elements.

Figure 25A:
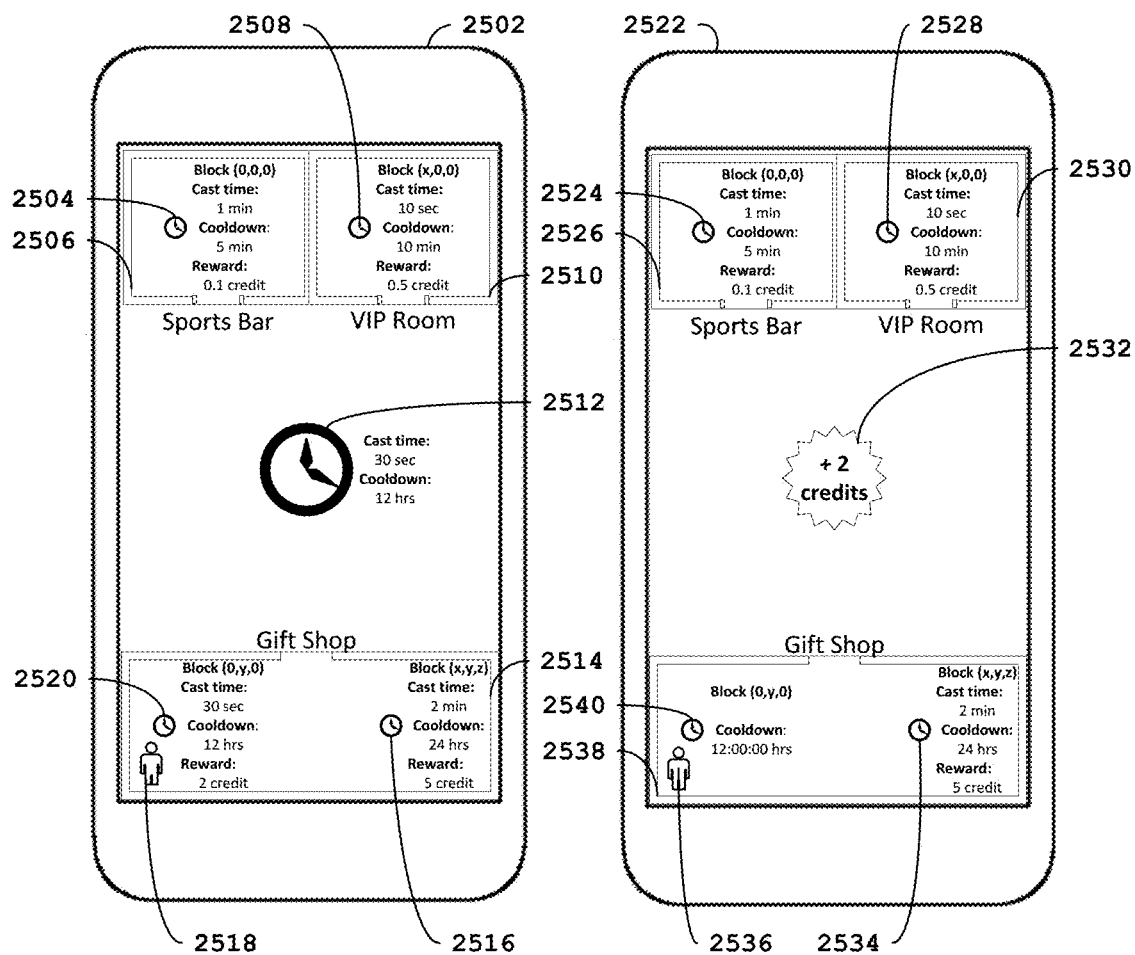
FIG. 25A shows a graphical user interface of the rewards system as proof-of-work or proof-of-stake.

FIG. 25A shows a graphical user interface of the rewards system as proof-of-work or proof-of-stake. The illustrative embodiment of a wireless device 2502 and 2522 contain a graphical user interface of the rewards system as proof-of-work or proof-of-stake. The graphical user interface contains rewards 2504, 2508, 2520, and 2516 with variable cast time, cooldown, and reward. Also, the user 2518 and 2536 location is displayed on the map relative to other areas such as Sports Bar 2506 and 2526, VIP Room 2510 and 2530, and Gift Shop 2514 and 2538. An eligible reward is provided with a cast time to capture the user's attention during a time span (e.g., 30 sec) and a cooldown (e.g., 12 hrs.) illustrated with an animated countdown 2512. Additional data objects could be supplied to the wireless device to utilize the cast time for advertising, notifications, alerts, feeds, posts, promotions, reminders. A successful proof-of-work or proof-of-stake would yield a reward illustrated as credits (e.g., +2 credits) 2532.

Figure 25B:
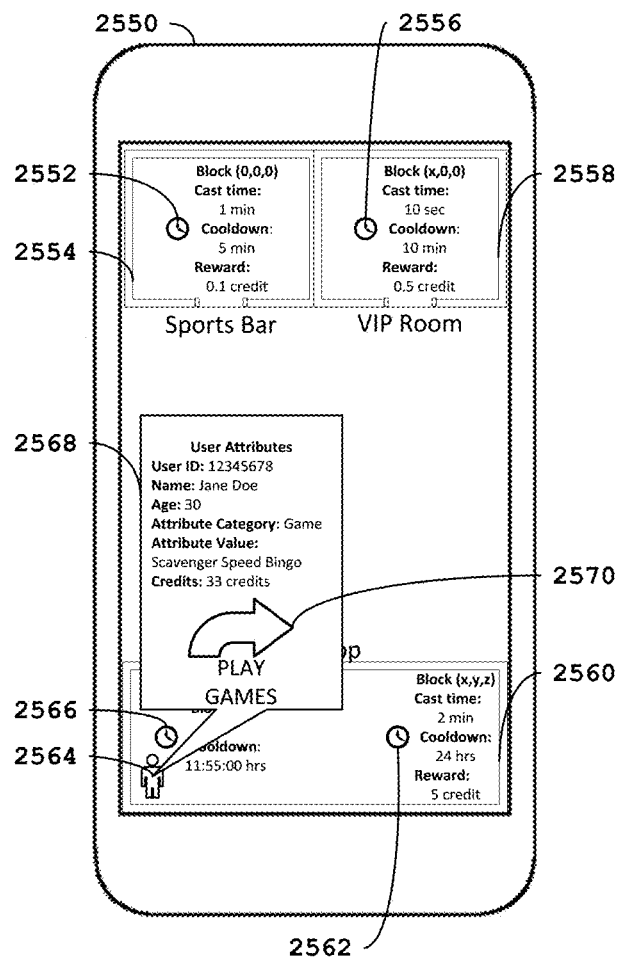
FIG. 25B shows a graphical user interface of the rewards system as proof-of-work or proof-of-stake.

FIG. 25B shows a graphical user interface of the rewards system as proof-of-work or proof-of-stake. The illustrative wireless device 2550 contains a graphical user interface of the reward system as proof-of-work or proof-of-stake. The graphical user interface contains rewards 2552, 2556, 2562, and 2566 with variable cast time, cooldown, and reward. Furthermore, the illustrative reward collected by user 2564 at geofence 2566 started a cooldown period (e.g., 12 hrs.). Also, the user 2564 location is displayed on the map relative to other areas such as Sports Bar 2554, VIP Room 2558, and Gift Shop 2560. Furthermore, the interactive popup with user attributes displays a plurality of attributes including the collected rewards such as credits (e.g., 33 credits) 2568 and the ability to play games using the credits 2570.

Figure 26:
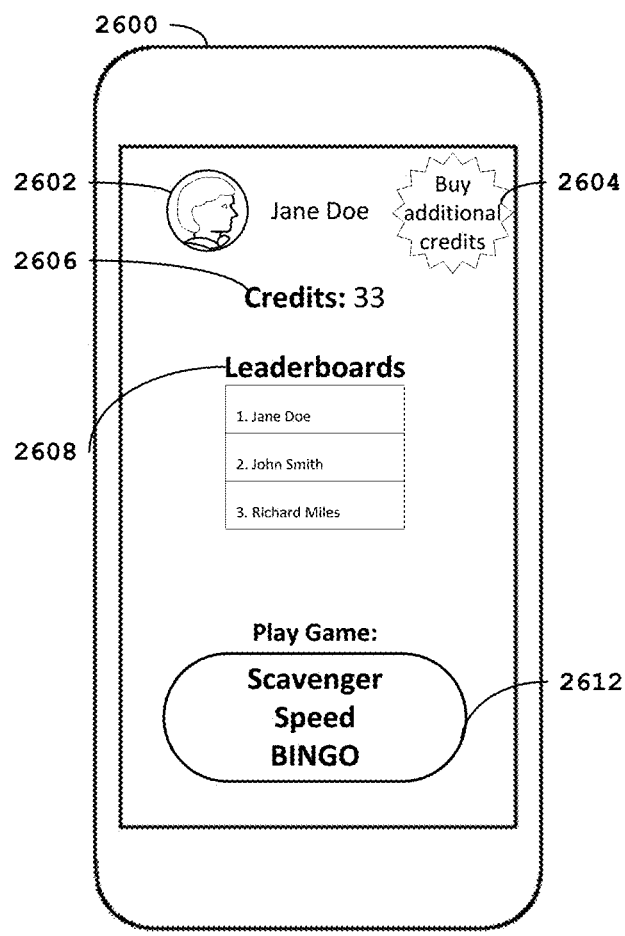
FIG. 26 shows the user dashboard interface.

FIG. 26 shows the user dashboard interface. The illustrative wireless device 2600 contains a graphical user interface of the user dashboard interface. By way of example and not of limitation, a user dashboard interface is provided to access the user profile 2602, the ability to buy additional credits 2604, display the credits associated with a user profile 2606, display gaming leaderboards 2608, and a list of available games for a particular geofence 2612. Thus, geofences could host a variety of games by indoor location and user profile.

After launching Scavenger Speed Bingo in the wireless device, the game interface is presented to the user. The gameplay could be configured to work in sequence to enable participation in every round of Scavenger Speed Bingo given sufficient credits. The Broadband Gaming System detects a winner by matching five numbers in a row, column or diagonal. Once a winner has been found, the application displays the winner and winning time which is different for each participating player. The implementation of leaderboards is used for analytics of the game.

Figure 27:
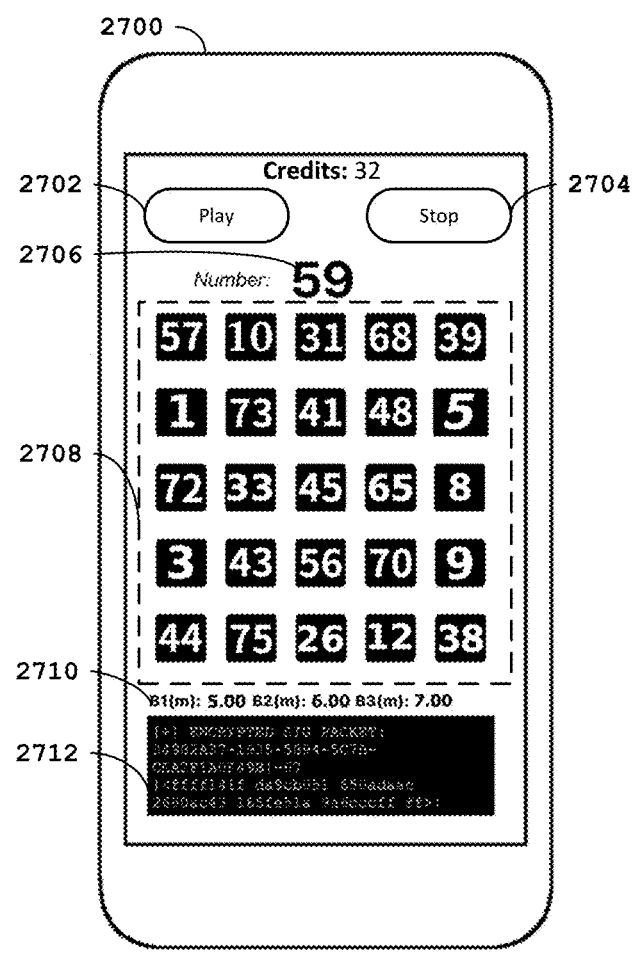
FIG. 27 shows the game interface.

FIG. 27 shows the game interface. By way of example and not of limitation, a game named Scavenger Speed Bingo is illustrated to demonstrate a set of capabilities of the dual channel location-based authentication for secure delivery of hyperlocal data objects. The wireless device 2700 Receives a SIG packet 2712 with a SIG hash to request a precomputed outcome 2706. A bingo board 2708 is a data object associated with a user profile. Equally important, the illustrative user location is displayed in the text label 2710 with distances to multiple NBHA gateways B1, B2, and B3. The play button 2702 places a bet and triggers the advertisement of a SIG packet with a SIG hash requesting a transaction. Thus, a bet placed by a user involves the broadband gaming system, transactional system, and verification system. As a result, the wireless device receives the outcome without being involved in the outcome generation process. The system and method are resilient to users with a poor connection or standing at the perimeter. For instance, a placed bet inside the perimeter of a geofence would trigger the outcome to be delivered to a user profile. If a user steps outside the geofence then the precomputed outcome is attributed to the user profile. In this embodiment, the wireless device acts as a graphics terminal capable of displaying data objects and advertise secure SIG hashes. Whereas, the broadband gaming system, transactional system, and verification system keep the critical operations secure and independent. Furthermore, a status of the session is stored to establish a point of recovery. A subsequent transaction (e.g., another bet) must be conducted inside the geofence. Otherwise, the NBHA gateway short-range wireless scanner would not be able to discover the advertisement packet generated by the wireless device requesting a transaction and data object which is a feature by design. Thus, the solution provides the secure delivery of hyperlocal data objects using dual channel location-based authentication. Lastly, the Stop button 2704 ends the game and releases the short-range wireless radio of the wireless device 2700.

Figure 28:
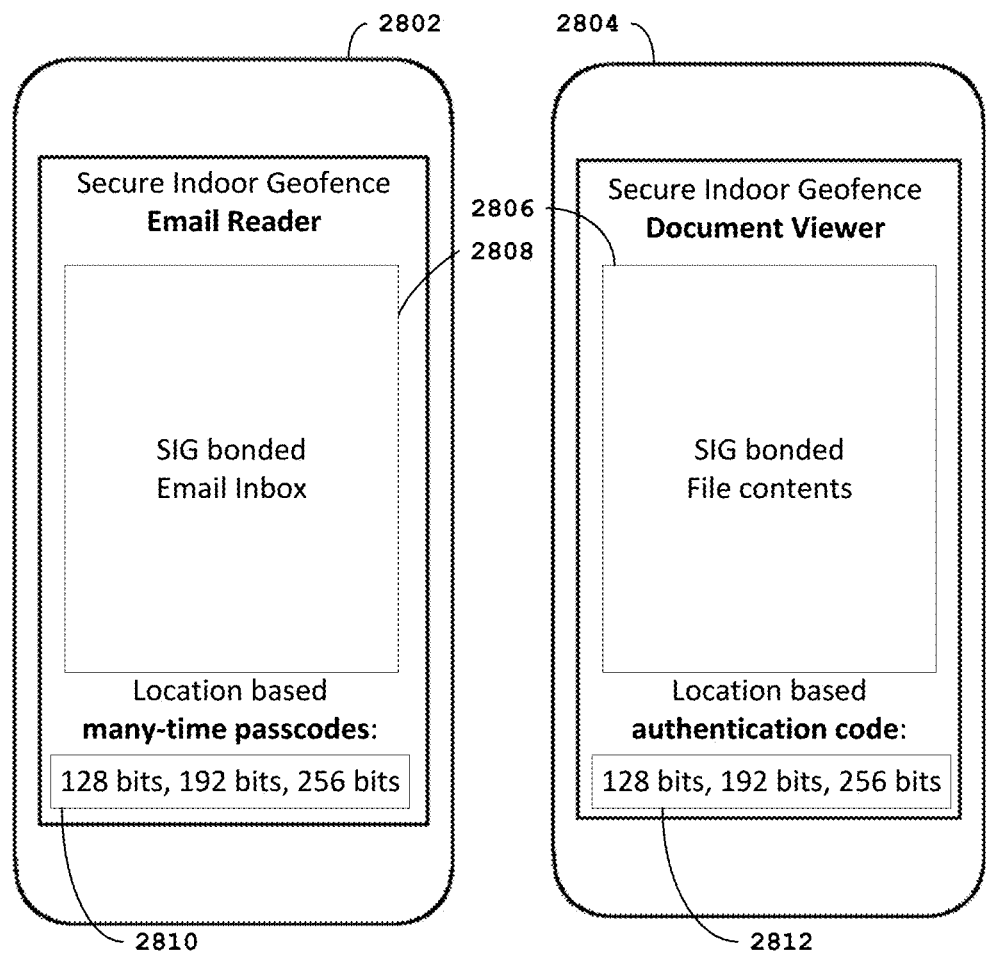
FIG. 28 shows a SIG e-mail reader and a SIG document viewer.

Referring to FIG. 28, there is shown an SIG e-mail reader 2802 and a SIG document viewer 2804 according to embodiments of the present invention. The mobile applications illustrated in FIG. 28 use data objects such as plaintext, biometrics, identifiers, tags, ciphertext, keys, hashes, one-time passcodes for application-specific operations.

The SIG e-mail reader 2802 contains a SIG bonded email inbox 2808, and a generated location based many-time passcodes 2810 to keep the application alive. Many-time passcodes are continuously updated and dynamically received in the Secure Indoor Geofence as a keep-alive flag.

In another embodiment, the SIG document viewer 2804 contains a SIG bonded file reader 2806, and a single authentication code 2812.

Figure 29A:
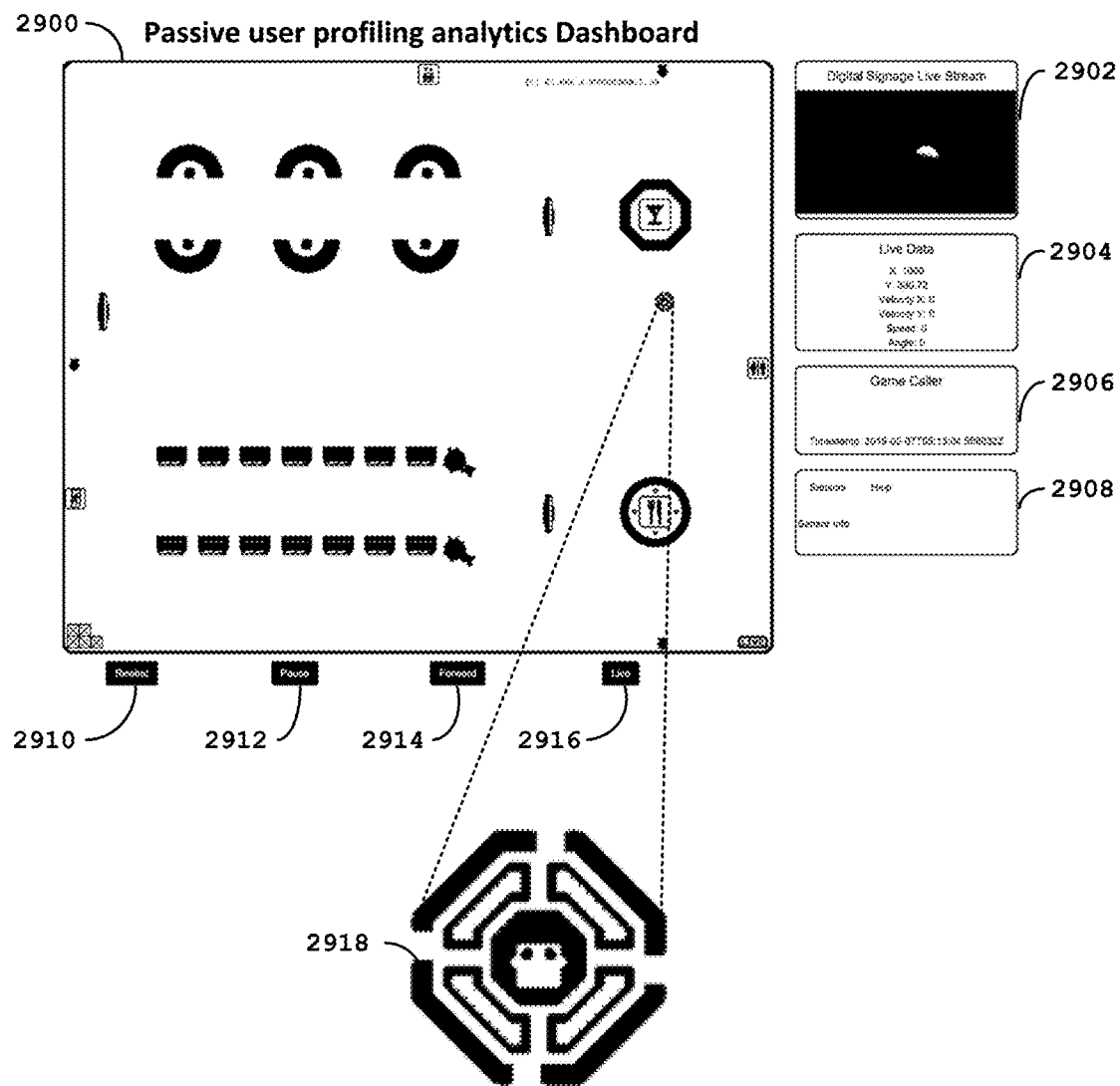
FIG. 29A shows an interface for a passive user profiling analytics dashboard.

The interface in FIG. 29A illustrates a passive user profiling analytics dashboard comprised of an interactive window 2900, a plurality of time controls including rewind 2910, pause 2912, forward 2914, live 2916, a digital signage live stream window 2902, a live data window 2904, a game caller window 2906, a sensors window 2908, and a maximized avatar 2918.

The reference table in FIG. 29B shows the categories and attributes of wireless network-based passive user profiling comprising a tracking category 2920, a demographics category 2922, a lifestyle category 2924, and a social category 2926. In addition, a color-coded tracking field 2928, a color-coded demographics field 2930, a color-coded lifestyle field 2936, a color-coded social field 2938. The color-coded fields are displayed around an avatar 2932, 2934 for color-based signatures of attribute intensity.

The tracking attributes include residence time $T_1$, number of associates $T_2$, number of visits $T_3$, indoor location (geofence) $T_4$, device(s) ID(s) $T_5$, and number of devices $T_6$. The demographics attributes include gender $D_1$, age group (under 21, 21+) $D_2$, relationship (accompanied, single) $D_3$, children (yes, no) $D_4$, and net worth (average, above average, very high) $D_5$. The lifestyle attributes include activity level (sedentary, moderate, active) $L_1$, exercise (walking distance, pace) $L_2$, and diet (types of cuisine) $L_3$. The social attributes are crowd level (light, moderate, heavy) $S_1$, location cost (average, expensive, very expensive) $S_2$, and exclusive services (yes, no) $S_3$.

Figure 30:
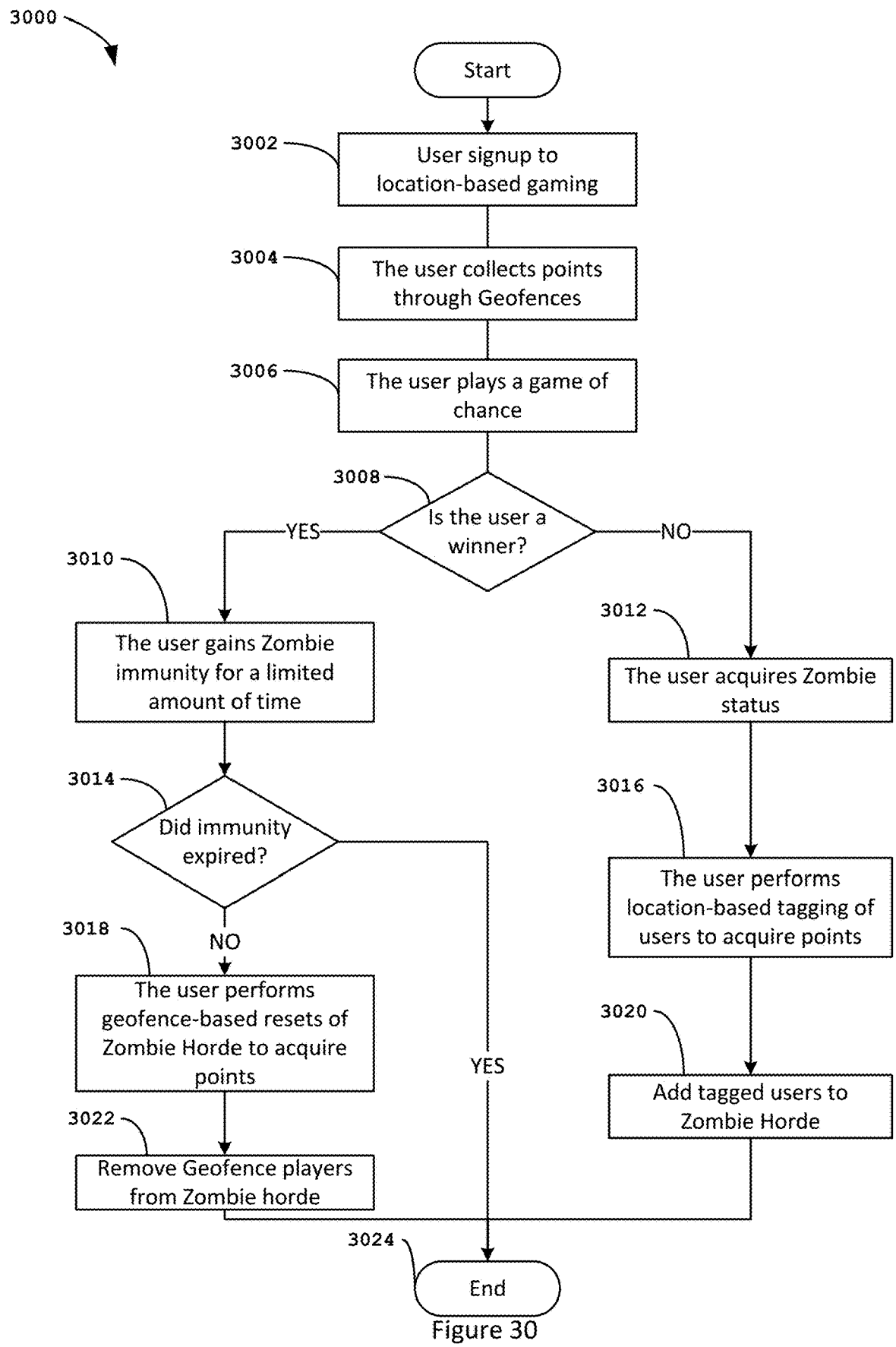
FIG. 30 shows a flowchart of location-based Zombie Apocalypse game.

The illustrative FIG. 30 shows a flowchart of location-based Zombie Apocalypse game 3000. The game starts with a process for user signup to location-based gaming. The game method continues at block 3004 where the user collects points by to traveling to or through one or more geofences. The gateways that enable a user to collect points may be specified through a game interface as list. This list may include one gateway, multiple gateways, all gateways on a particular property, all gateways on a particular property floor, etc.

The game method continues at block 3006, where the user plays a game of chance. At decision diamond 3008, one of a remote network component or a gateway component determines if the user is a winner of the game. if the user is determined to be a winner, the game method proceeds to block 3010 where user gains Zombie immunity for a specified amount of time. At decision diamond 3014, the game method determines if the immunity expired 3014, e.g. determines that the specified amount of time for the immunity has runout and/or expired. When it is determined that the user's immunity time has expired, the game method terminates at block 3024. When it is determined that the user's immunity time has not expired, the game method proceeds to block 3018, where the user performs geofence-based resets of a Zombie Horde to acquire points. After these geofence-based reset(s), the game method proceeds to block 3022, where players within a geofence (i.e., Geofence players) are removed from the Zombie Horde and the game terminates at block 3024.

If, at decision diamond 3008, the user is determined not to be a winner of the game of chance, then the game method proceeds to block 3012 where the user acquires Zombie status. Next the game method proceeds to block 3016, in which the user performs location-based tagging of users to acquire points. When the user comes within a predefined distance or proximity of another player/user that is not already part of the Zombie Horde, that player/user is identified as "tagged" and added as a tagged user to Zombie Horde at block 3020 and the game then terminates at block 3024.

Figure 31A:
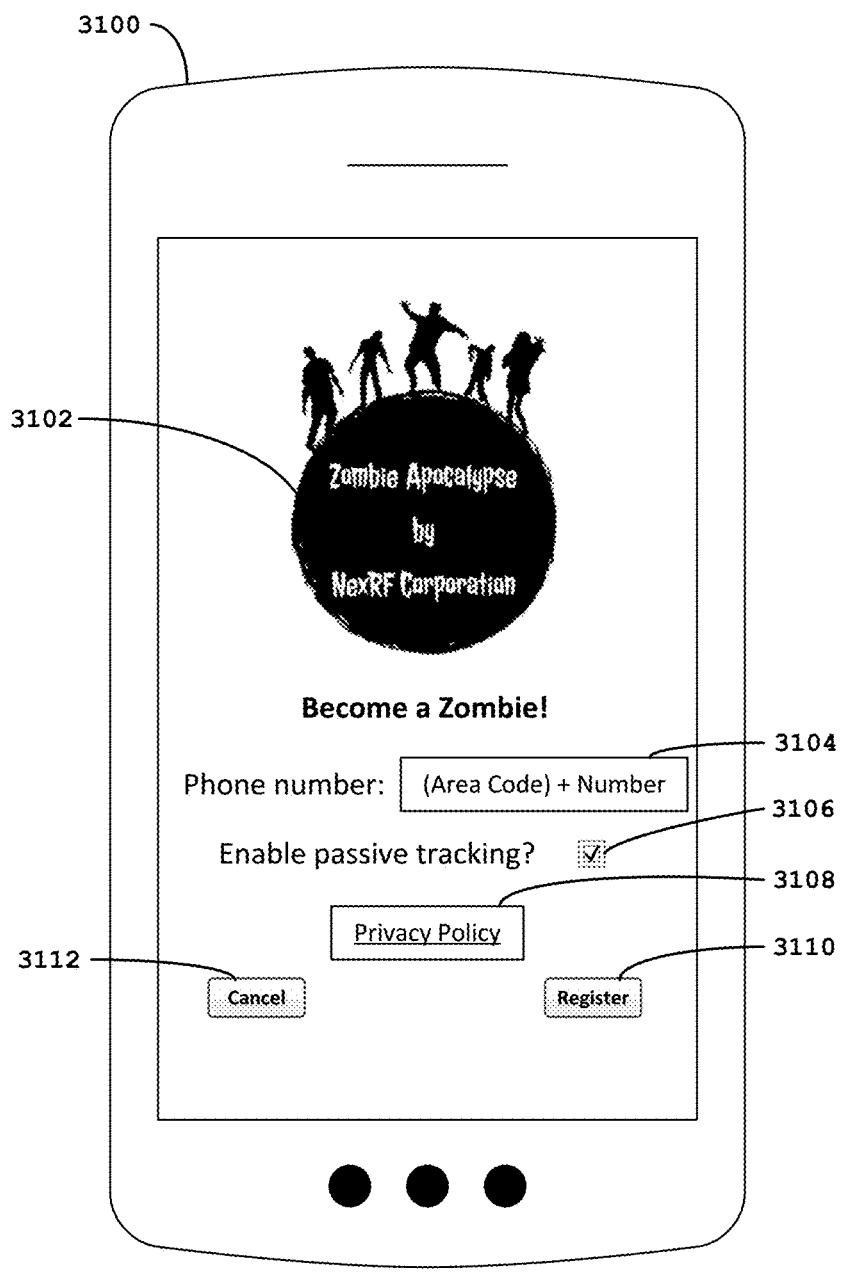
FIG. 31A shows a location-based registration interface for an illustrative game of Zombie Apocalypse.

The illustrative embodiment of FIG. 31A shows a location-based registration interface for an illustrative game of Zombie Apocalypse running on a mobile device 3100, a graphic design of the game 3102, a phone number 3104, a checkbox for wireless network-based passive user profiling 3106, a privacy policy 3108, a cancel button 3112, and a registration button 3110.

Figure 31B:
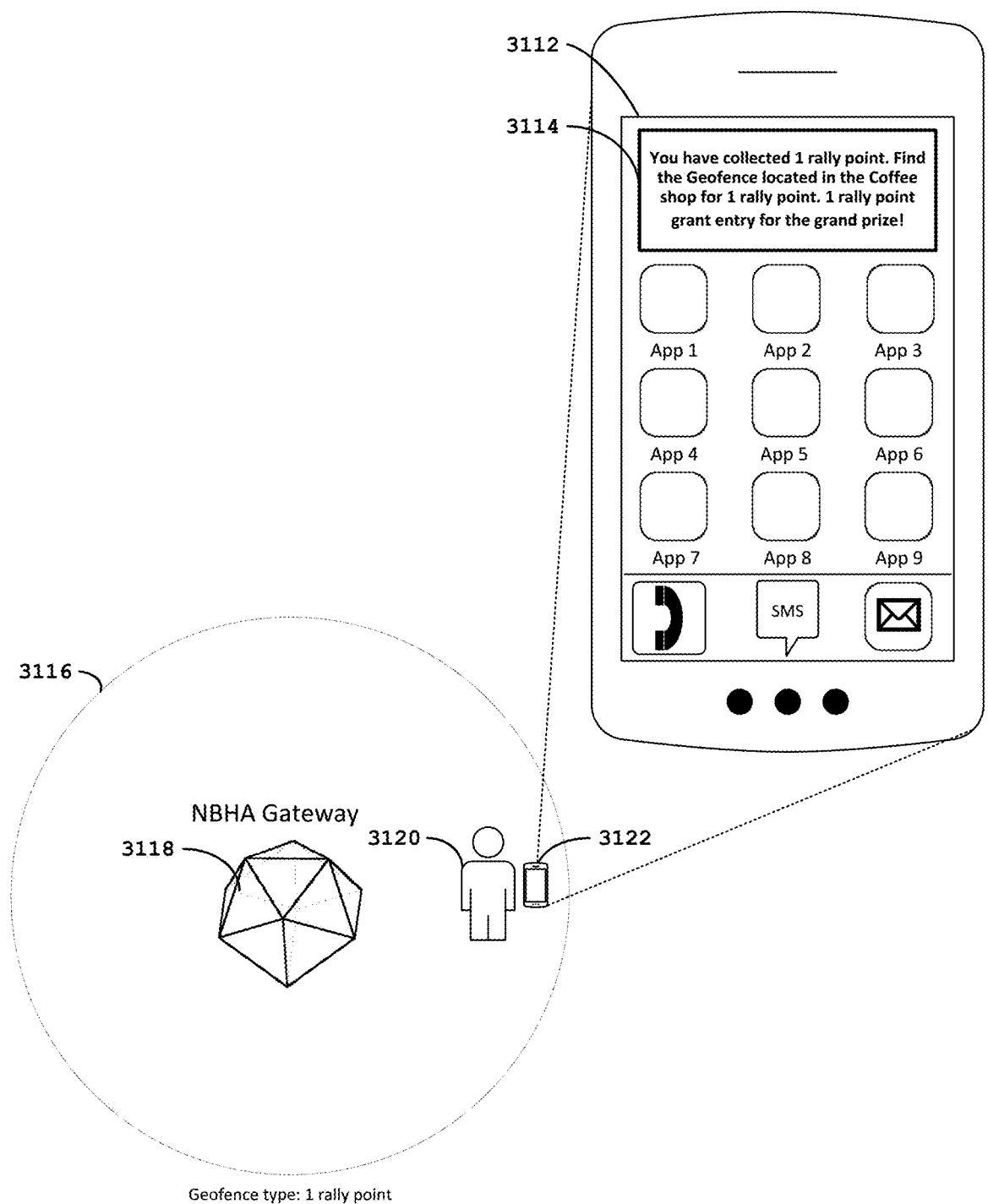
FIG. 31B shows a location-based gameplay for a game of Zombie Apocalypse.

The illustrative embodiment of FIG. 31B shows a location-based gameplay for a game of Zombie Apocalypse that includes a NBHA gateway 3118, a user 3120, a mobile device in the home screen 3112, a notification (e.g., SMS, background notifications) 3114, and a mobile device 3122 in a Geofence 3116.

Figure 31C:
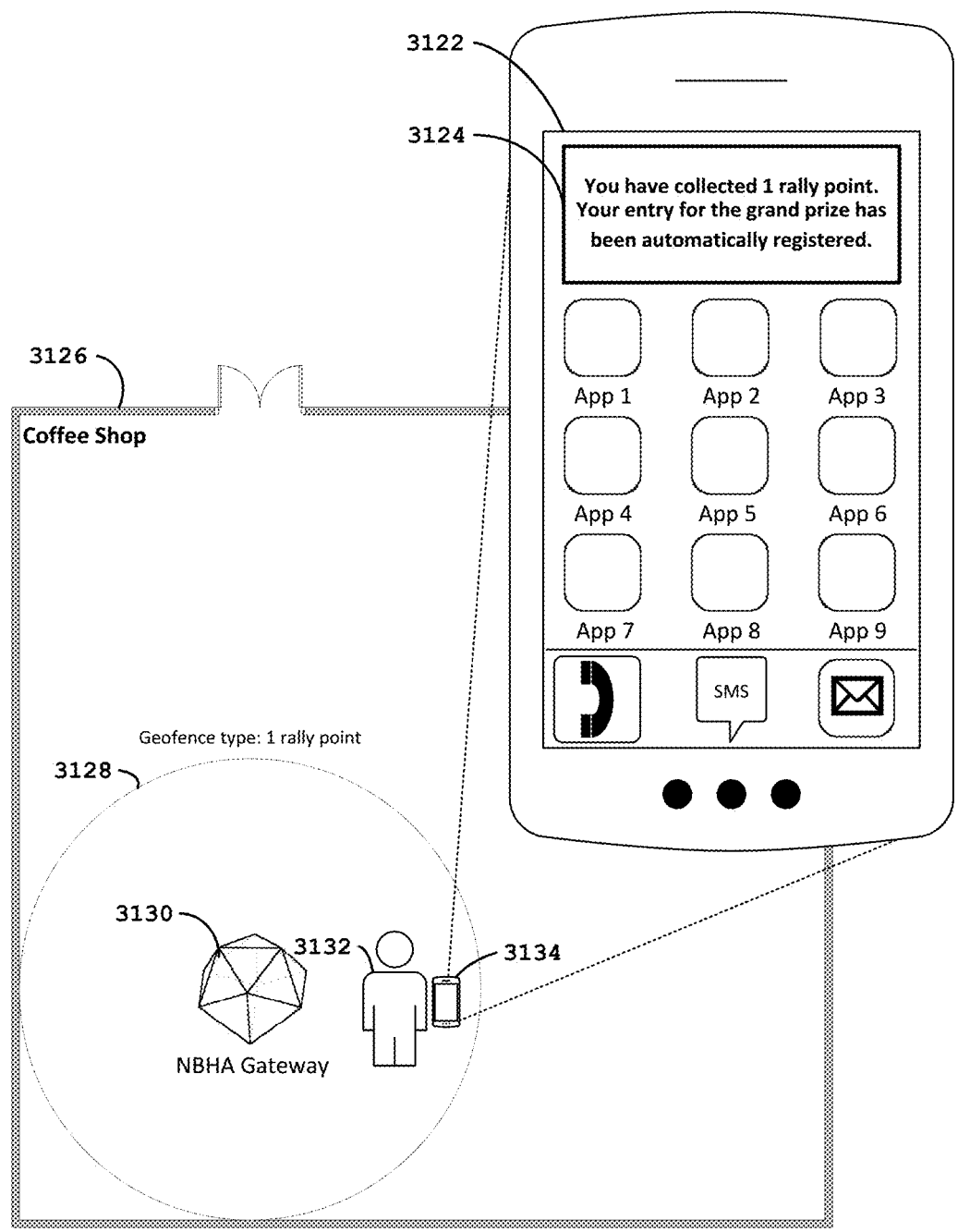
FIG. 31C shows a location-based gameplay for a game of Zombie Apocalypse in a Coffee shop.

The illustrative embodiment of FIG. 31C shows a location-based gameplay for a game of Zombie Apocalypse in a Coffee shop 3126, a mobile device in the home screen 3122, a message (e.g., SMS, background notifications) 3124, a NBHA gateway 3130, a user 3132, and a mobile device 3134 in a Geofence 3128.

Figure 31D:
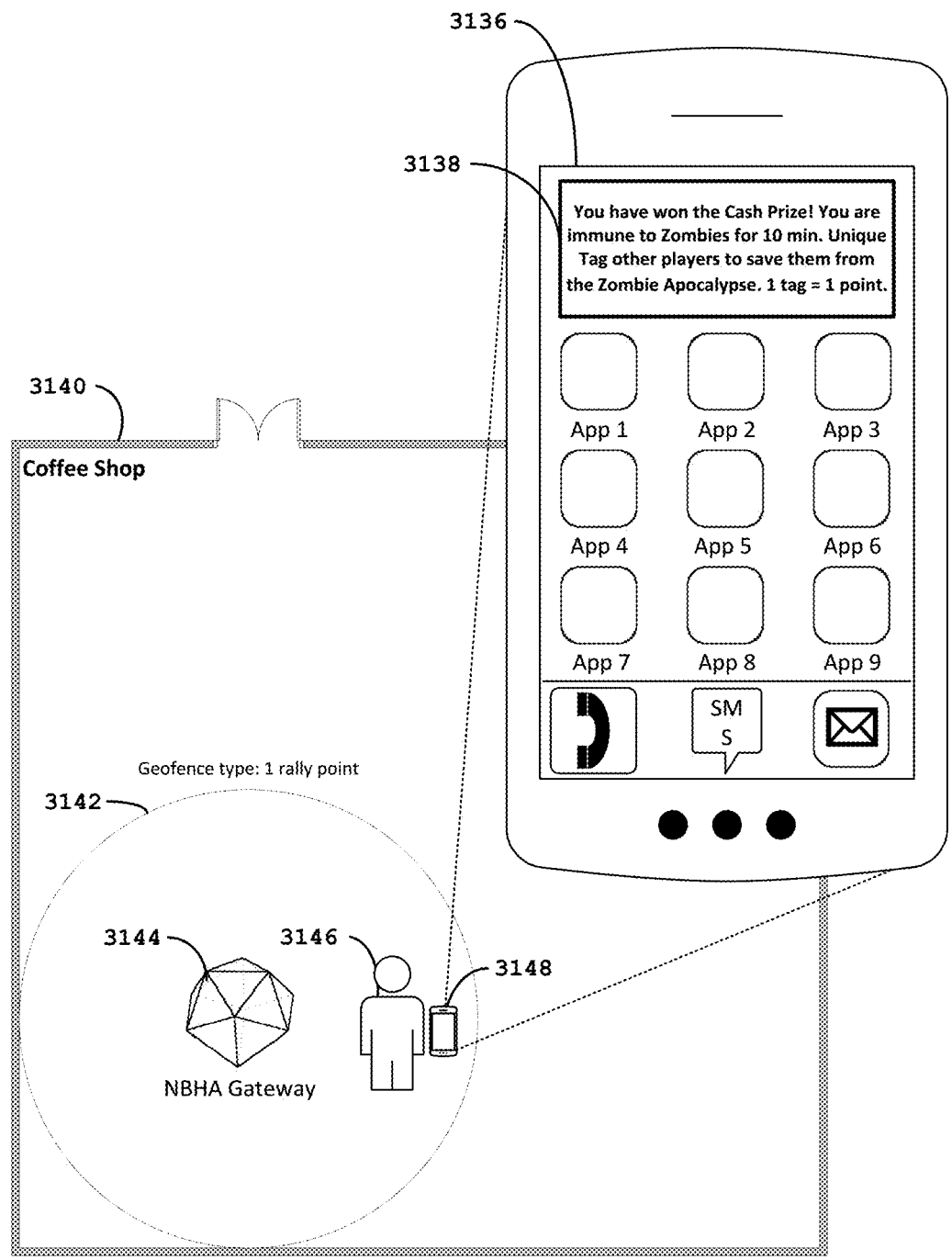
FIG. 31D shows a location-based gameplay of a winning player for a game of Zombie Apocalypse in a Coffee shop.

The illustrative embodiment of FIG. 31D shows a location-based gameplay of a winning player for a game of Zombie Apocalypse in a Coffee shop 3140, a mobile device in the home screen 3136, a message (e.g., SMS, background notifications) 3138, a NBHA gateway 3144, a user 3146, and a mobile device 3148 in a Geofence 3142.

Figure 31E:
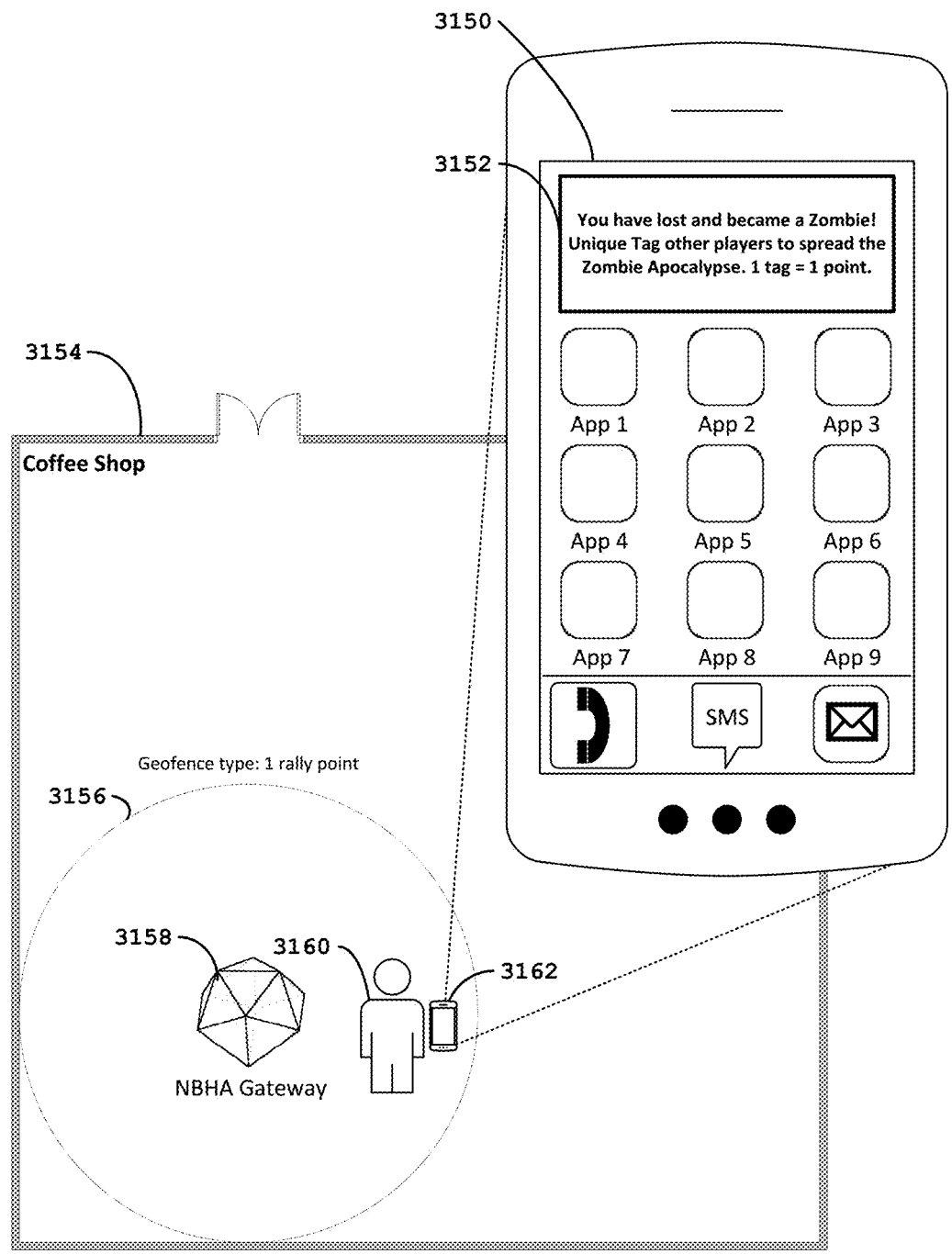
FIG. 31E shows a location-based gameplay of a losing player for a game of Zombie Apocalypse in a Coffee shop.

The illustrative embodiment of FIG. 31E shows a location-based gameplay of a losing player for a game of Zombie Apocalypse in a Coffee shop 3154 comprised of a mobile device in the home screen 3150, a message (e.g., SMS, background notifications) 3152, a NBHA gateways 3158, a user 3160, and a mobile device 3162 in a Geofence 3156.

Figure 31F:
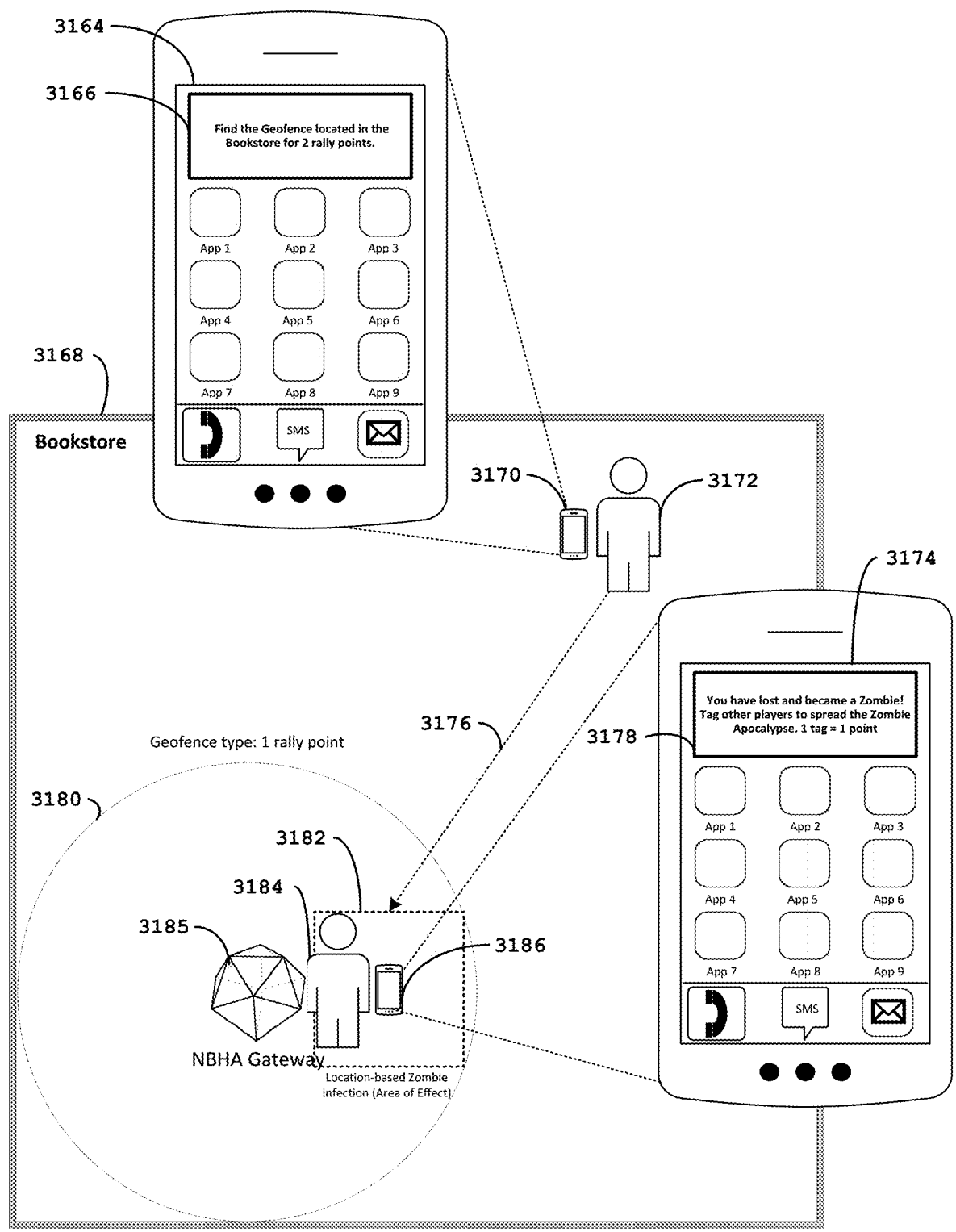
FIG. 31F shows a location-based gameplay interaction among users of Zombie Apocalypse in a Bookstore.

The illustrative embodiment of FIG. 31F shows a location-based gameplay interaction among users of Zombie Apocalypse in a Bookstore 3168, a mobile device in the home screen 3164, a message (e.g., SMS, background notifications) 3166, a mobile device 3170 not in a geofence, a user 3172 not in a geofence, a user moving 3176 to Geofence 3180, a mobile device in the home screen 3174, a message (e.g., SMS, background notifications) 3178, a NBHA gateway 3185, a user 3184 in a geofence 3180, a mobile device 3186 in a geofence 3180, and a location-based zombie infection known as Area of Effect (AoE) 3182.

Figure 31G:
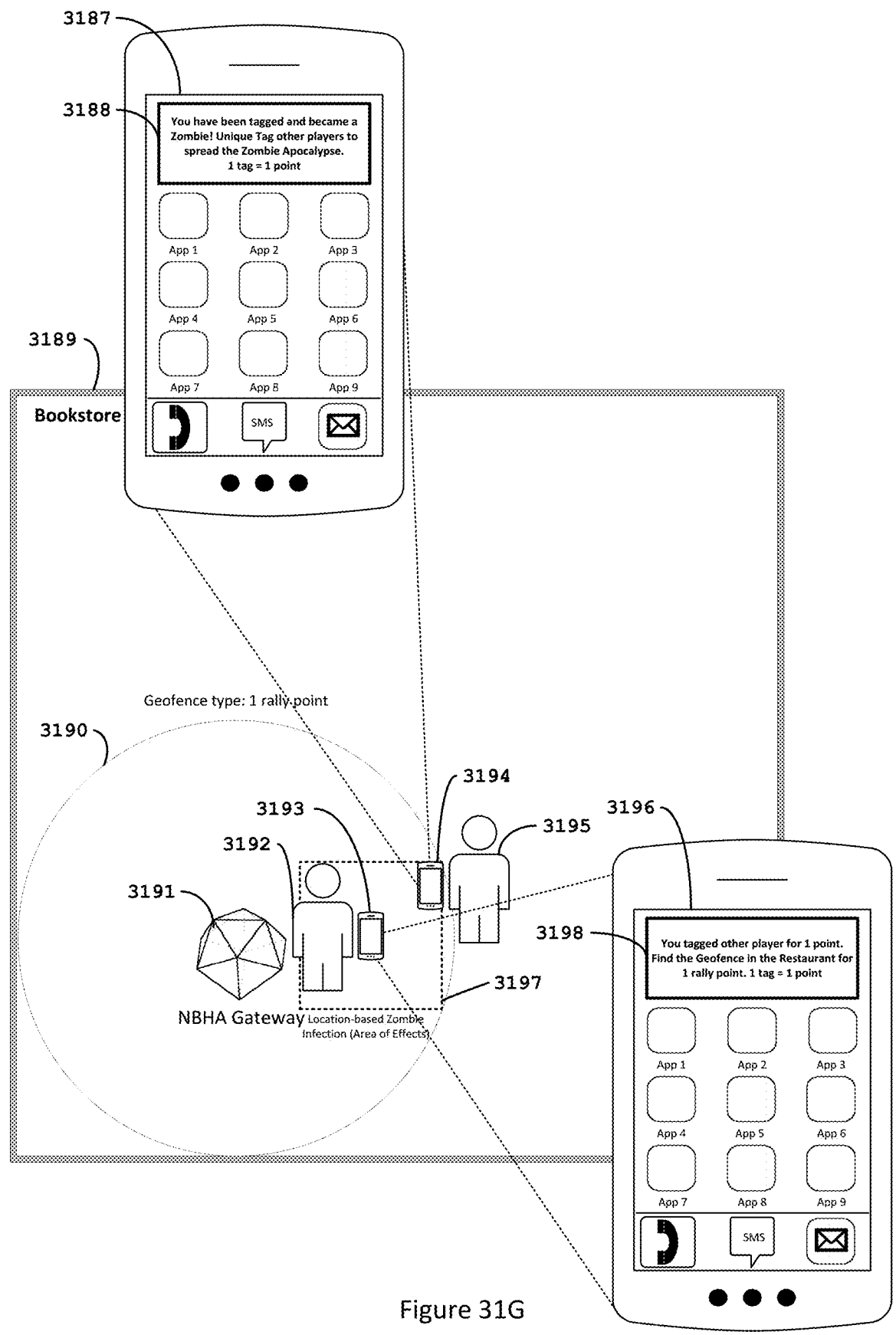
FIG. 31G shows a location-based tagging of users using Zombie Apocalypse in a Bookstore.

The illustrative embodiment in FIG. 31G shows a location-based tagging of users using Zombie Apocalypse in a Bookstore 3189, a mobile device in the home screen 3187, a message (e.g., SMS, background notifications) 3188, a mobile device 3194 in a geofence 3190, a user 3195 entering geofence 3190, a NBHA gateway 3191, a user 3192 in a geofence 3190, a mobile device 3193 in a geofence 3190, a mobile device in the home screen 3196, a message (e.g., SMS, background notifications) 3198, and a location-based Zombie infection known as Area of Effect (AoE) 3197.

Figure 32A:
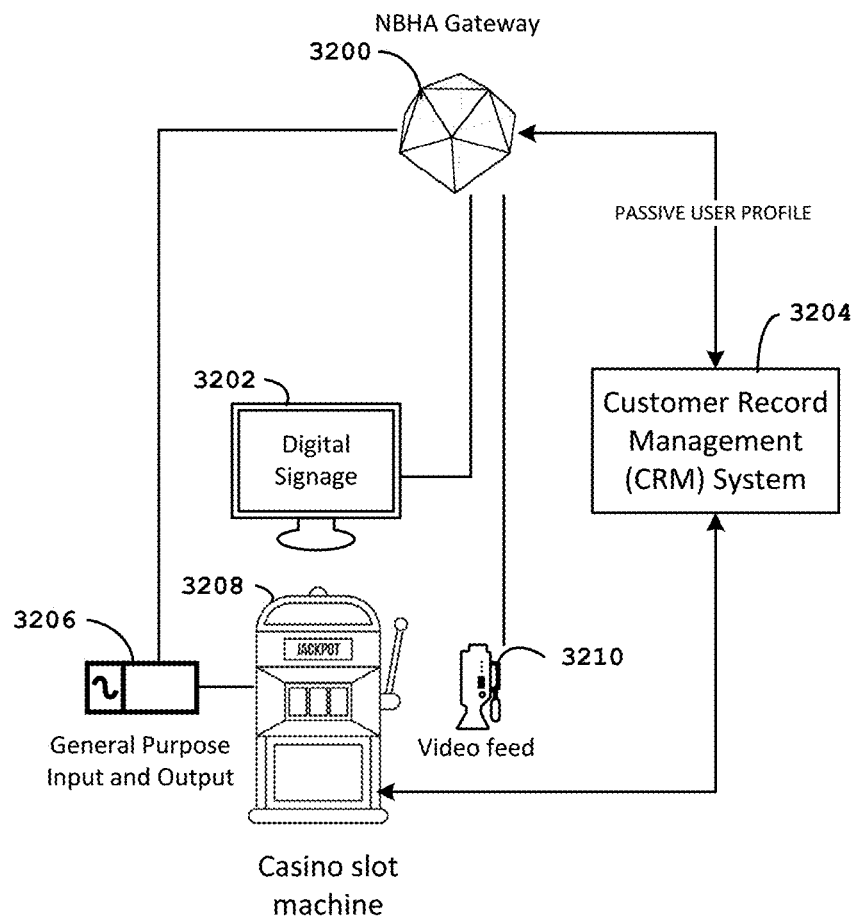
FIG. 32A shows an architecture of wireless network-based passive user profiling for a casino slot machine.
Figure 32B:
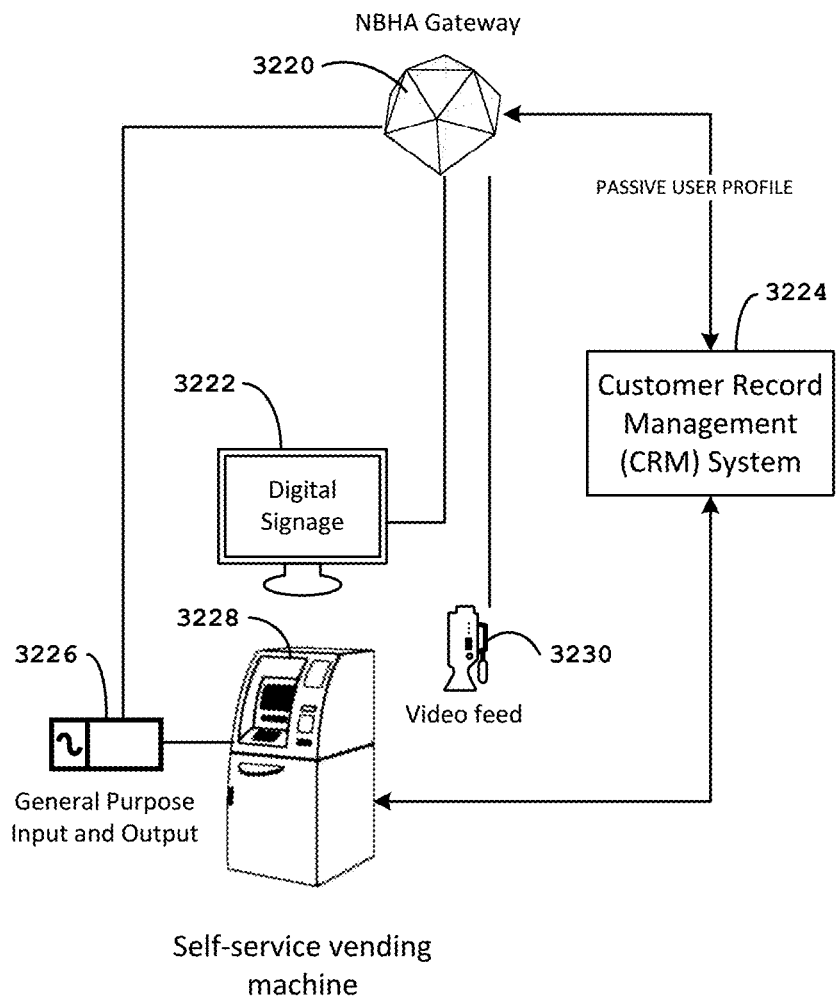
FIG. 32B shows an architecture of wireless network-based passive user profiling for a self-serving vending machine.
Figure 32C:
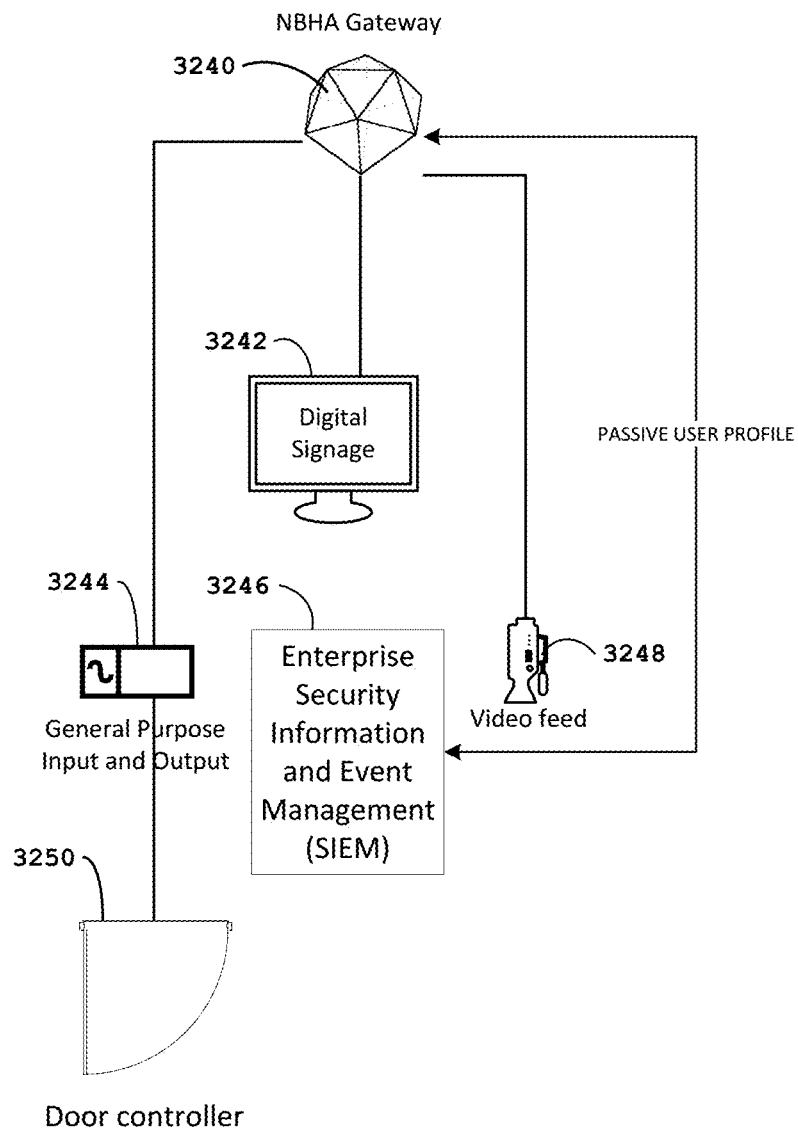
FIG. 32C shows an architecture of wireless network-based passive user profiling for an Enterprise Security Information and Event Management (SIEM) system.

Illustrative embodiments of wireless network-based passive user profiling for gaming are described in FIG. 32A, marketing is described in FIG. 32B, and security is described in FIG. 32C. Wireless network-based passive user profiling for gaming improves the personalized gameplay and promotions tailored for a user with a plurality of devices emanating Bluetooth signals. Wireless network-based passive user profiling for marketing enables predictive analytics about consumers with a plurality of wireless devices in the 2.4 GHz band. Wireless network-based passive user profiling for security helps identify adversarial devices in a secure perimeter.

The illustrative embodiment in FIG. 32A illustrates an architecture of wireless network-based passive user profiling for a casino slot machine 3208 equipped with a NBHA gateway 3200, a digital signage screen 3202, a general-purpose input and output (I/O) 3206 for kinetic interaction (e.g., vibrations, lights, actuators), a video feed 3210, and a customer record management system 3204.

The illustrative embodiment in FIG. 32B illustrates an architecture of wireless network-based passive user profiling for a self-serving vending machine 3228 encompassed by a NBHA gateway 3220, a digital signage screen 3222, a general-purpose input and output (I/O) 3226 for kinetic interaction (e.g., handicap assist), a video feed 3230, and a customer record management system 3224.

The illustrative embodiment in FIG. 32C illustrates an architecture of wireless network-based passive user profiling for an Enterprise Security Information and Event Management (SIEM) system 3246 enhanced with a NBHA gateway 3246, a digital signage screen 3242, a general-purpose input and output (I/O) 3244, a door controller 3250, and a video feed 3248.

Figure 33:
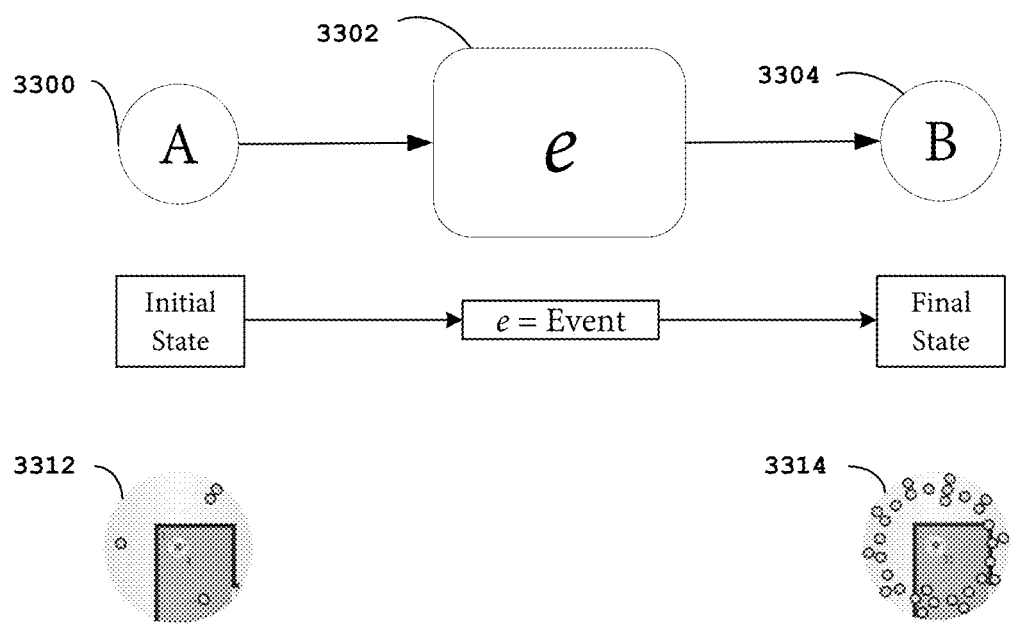
FIG. 33 shows event-based A/B testing for time-based customer loyalty and anonymous tracking analytics.

Referring to FIG. 33, there is shown event-based A/B testing for time-based customer loyalty and anonymous tracking analytics. The flowchart of FIG. 33 illustrates event-based A/B testing through a system and method for time-based customer loyalty and anonymous tracking analytics. An initial state A 3300 is modified through an event 3302 to produce a final state B 3304. For instance, if an event e is introduced in the range of Gateway 1, the crowd size will increase 775% from the initial state 3312 because the analytics shows a more significant number of wireless devices in the scanning area 3314.

The event based A/B testing provides an objective metric for analyzing a variety of different "events." Note, the term "event" refers to an occurrence, outcome, or activity. For example, video content displayed on digital signage is an "event" that may be subjected to event-based A/B testing by determining the impact of the video content on the migratory customer pattern. A variety of other "events" will readily suggest themselves to persons of ordinary skill in the art having the benefit of this disclosure.

Figure 34:
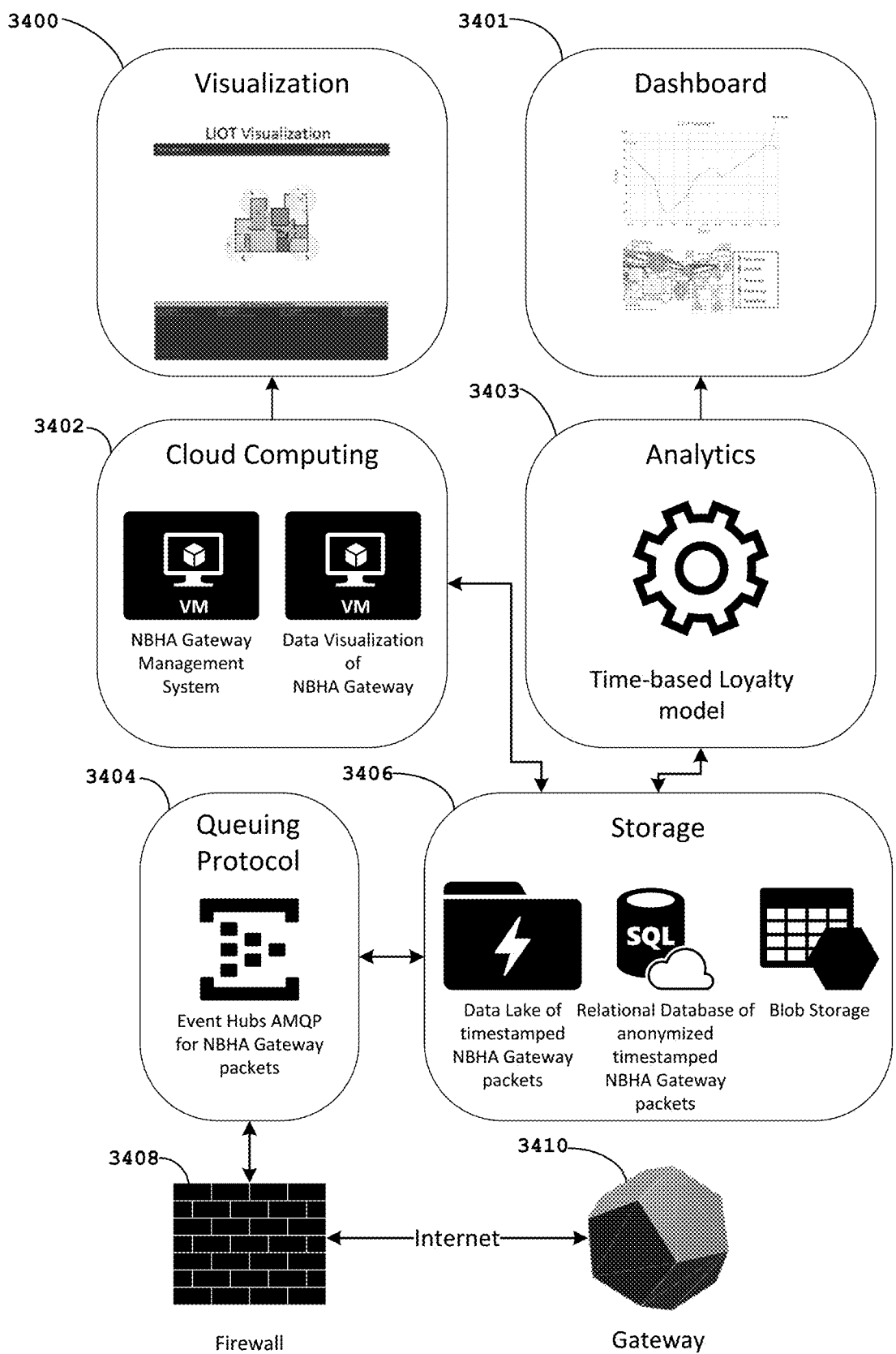
FIG. 34 shows a data flow diagram from a gateway to a data visualization application and an analytics dashboard.

Referring to FIG. 34, there is shown a data flow diagram from a gateway to a data visualization application and an analytics dashboard. The flowchart of FIG. 34 shows a data flow diagram from a NBHA gateway 3410 to a data visualization application 3400 and an analytics dashboard 3401.

The system and method including a firewall 3408, a queueing protocol 3404, a cloud storage component 3406, a cloud computing component 3402, and an analytics engine 3403. The queuing protocol 3404 includes an event hubs AMQP for NBHA gateway packets. Cloud storage 3406 includes a data lake of timestamped NBHA gateway packets, a relational database of anonymized timestamped NBHA gateway packets, and blob storage. Cloud computing 3402 includes a virtual machine for the NBHA system and a virtual machine for data visualization of the NBHA gateway. An analytics engine is encompassing a time-based behavioral model 3403 (e.g., loyalty model).

Figure 35:
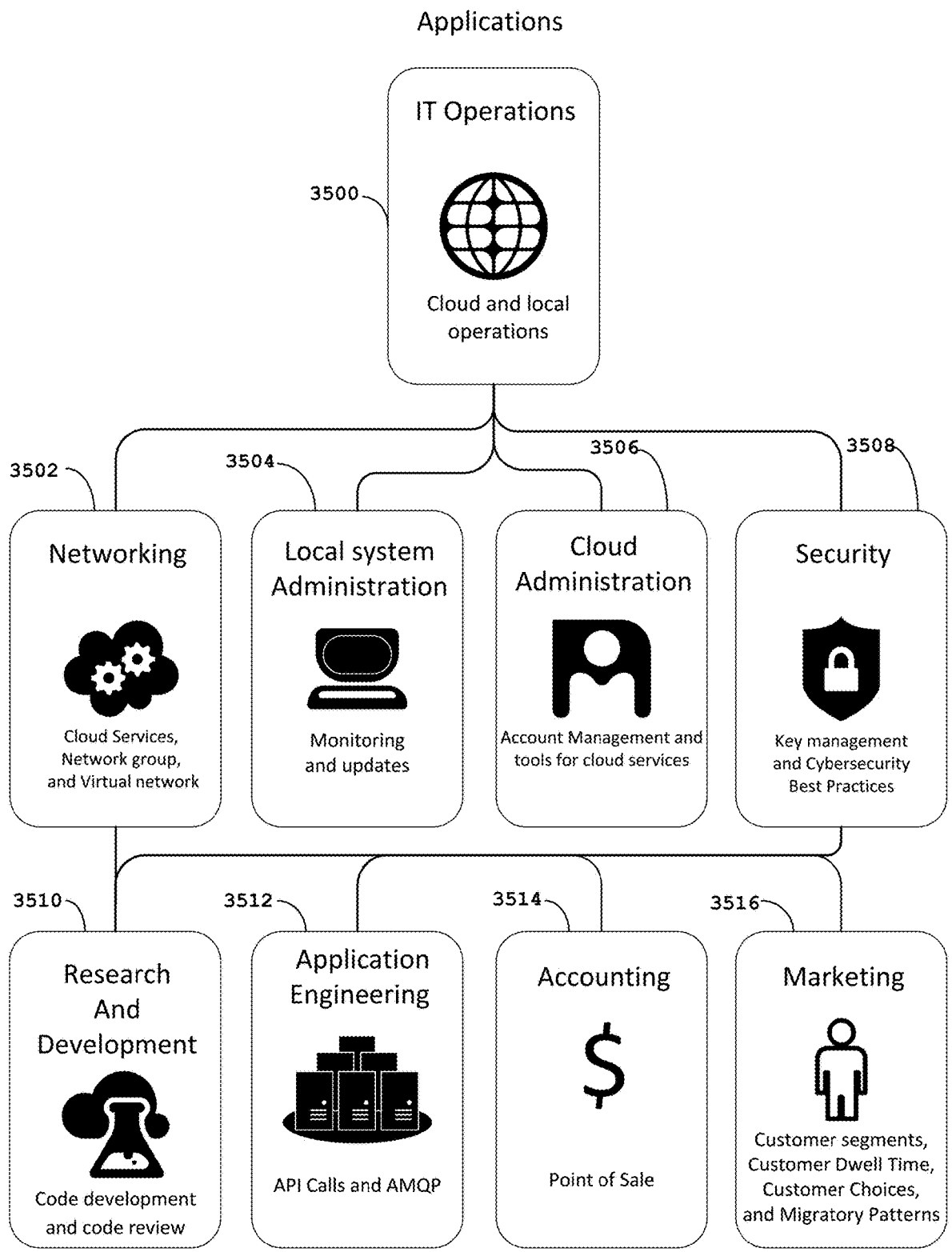
FIG. 35 shows illustrative applications for the Network Based Hyperlocal Authentication (NBHA) system.

Referring to FIG. 35, there is shown illustrative applications for the Network Based Hyperlocal Authentication (NBHA) system. Referring to FIG. 35, there is shown an infrastructure of applications comprising IT operations 3500, networking 3502, local system administration 3504, cloud administration 3506, security 3508, research and development 3510, application engineering 3512, accounting 3514, and marketing 3516. IT operations 3500 including cloud and local operations. Networking 3502 includes cloud services, network groups, and virtual networks. Local system administration 3504 provides monitoring and updates. Cloud administration 3506 uses account management and tools for cloud services. Security 3508 is used for key management and cybersecurity best practices. Research and development 3510 for code development and code review. Application engineering 3512 uses Application Programming Interface (API) calls and an Advanced Message Queuing Protocol (AMQP). Accounting 3514 tracks sales. Finally, marketing 3516 is used to define customer classification, define customer choices, quantify customer dwell time, and define migratory patterns.

Figure 36:
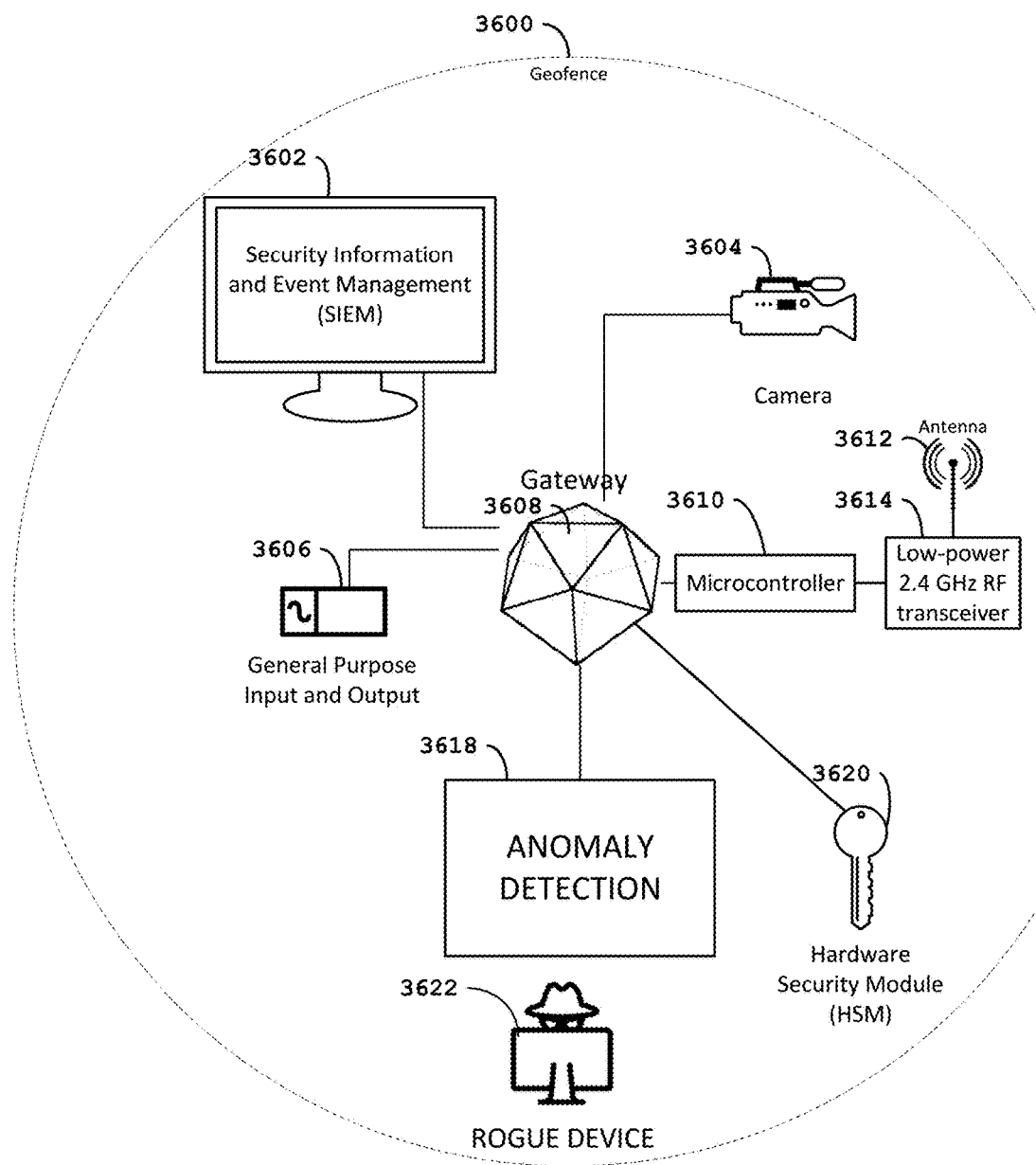
FIG. 36 shows an NBHA gateway being used for anomaly detection and the detection of rogue devices.

Referring to FIG. 36, there is shown an NBHA gateway being used for anomaly detection and the detection of rogue devices. The NBHA gateway 3608 is communicating with an anomaly detection module 3618, which is running on an illustrative network component, e.g., a server, which is not shown. The anomaly detection module 3618 detects rogue device 3622 within geofence 3600.

By way of example and not of limitation, the NBHA gateway and NBHA system are integrated with a Security Information and Event Management (SIEM) system 3602, a security camera 3604, a microcontroller 3610, a low-power 2.4 GHz RF transceiver 3614, an antenna 3612, a General Purpose Input and Output 3606, and a Hardware Security Module 3620 for anomaly detection.

Figure 37:
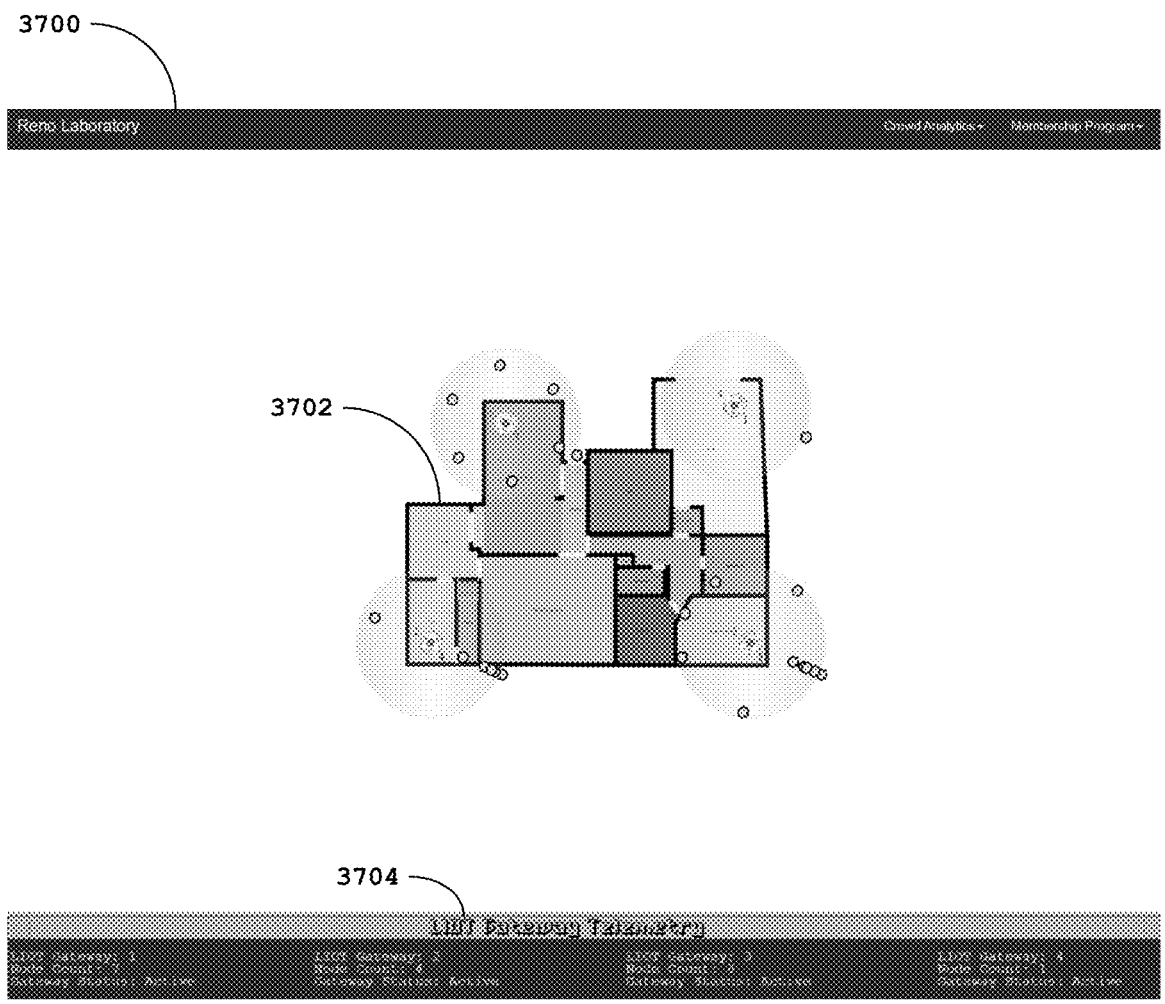
FIG. 37 shows a 2D Visualization using a web browser interface.

Referring to FIG. 37 there is shown a 2D Visualization using a web browser interface. The 2D visualization 3700 includes a web browser interface having a map 3702 and an NBHA gateway telemetry dashboard 3704.

Figure 38:
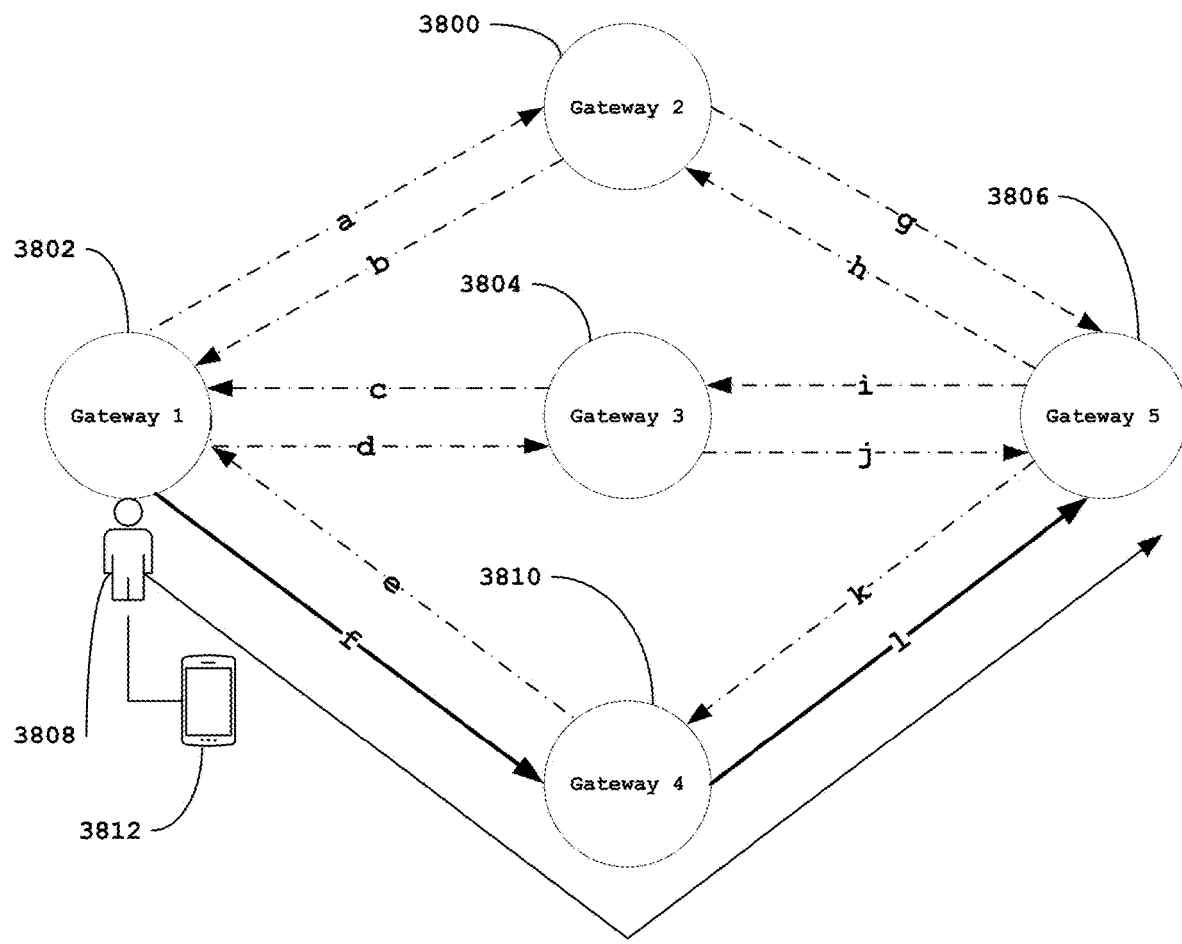
FIG. 38 shows a directed graph and an incidence matrix for calculating migratory patterns.

Referring to FIGS. 38, there is shown a directed graph and an incidence matrix for calculating migratory patterns. The illustrative directed graph includes NBHA gateways 3802, NBHA gateway 3800, NBHA gateway 3804, NBHA gateway 3810, and NBHA gateway 3806 having edges a, b, c, d, e, f, g, h, i, j, k, and l.

An anonymous customer 3808 with a detectable wireless device 3812 following a path [f, 1]. In this illustrative embodiment, the incidence matrix follows the rules: 1 if an edge is leading away from a vertex, −1 if an edge is leading to a vertex, and 0 for all others. The incidence matrix is used to calculate migratory patterns.

Figure 39:
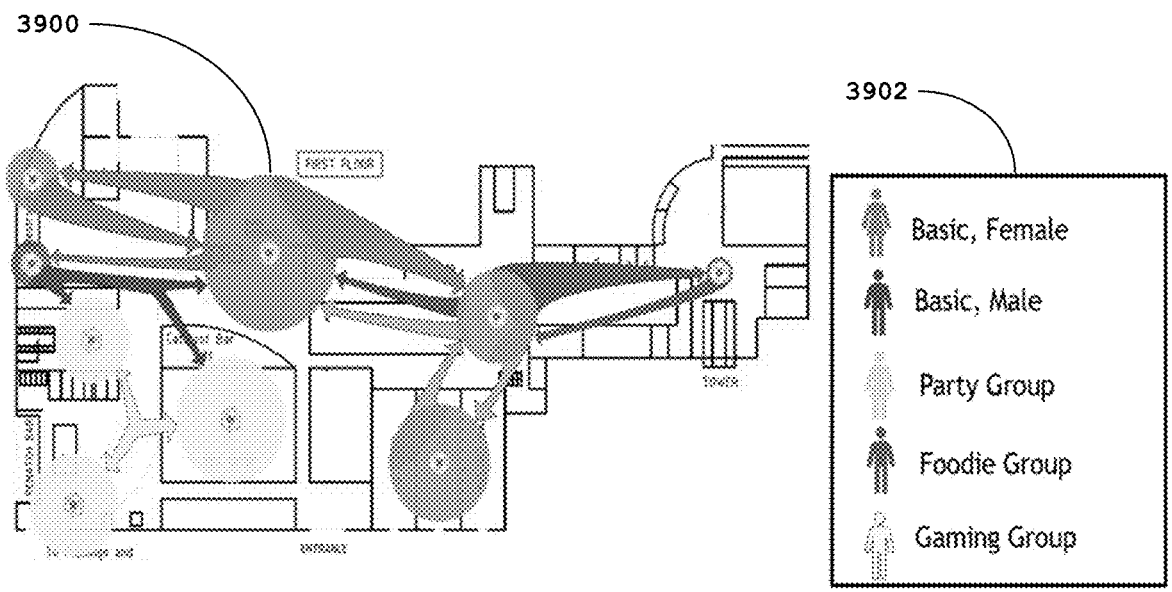
FIG. 39 shows a random dataset of migratory patterns and customer classification.

Referring to FIG. 39, there is shown a random dataset of migratory patterns and customer classification. The migratory patterns are presented in a 2D visualization 3900, and customer classification is provided in a list 3902.

Figure 40:
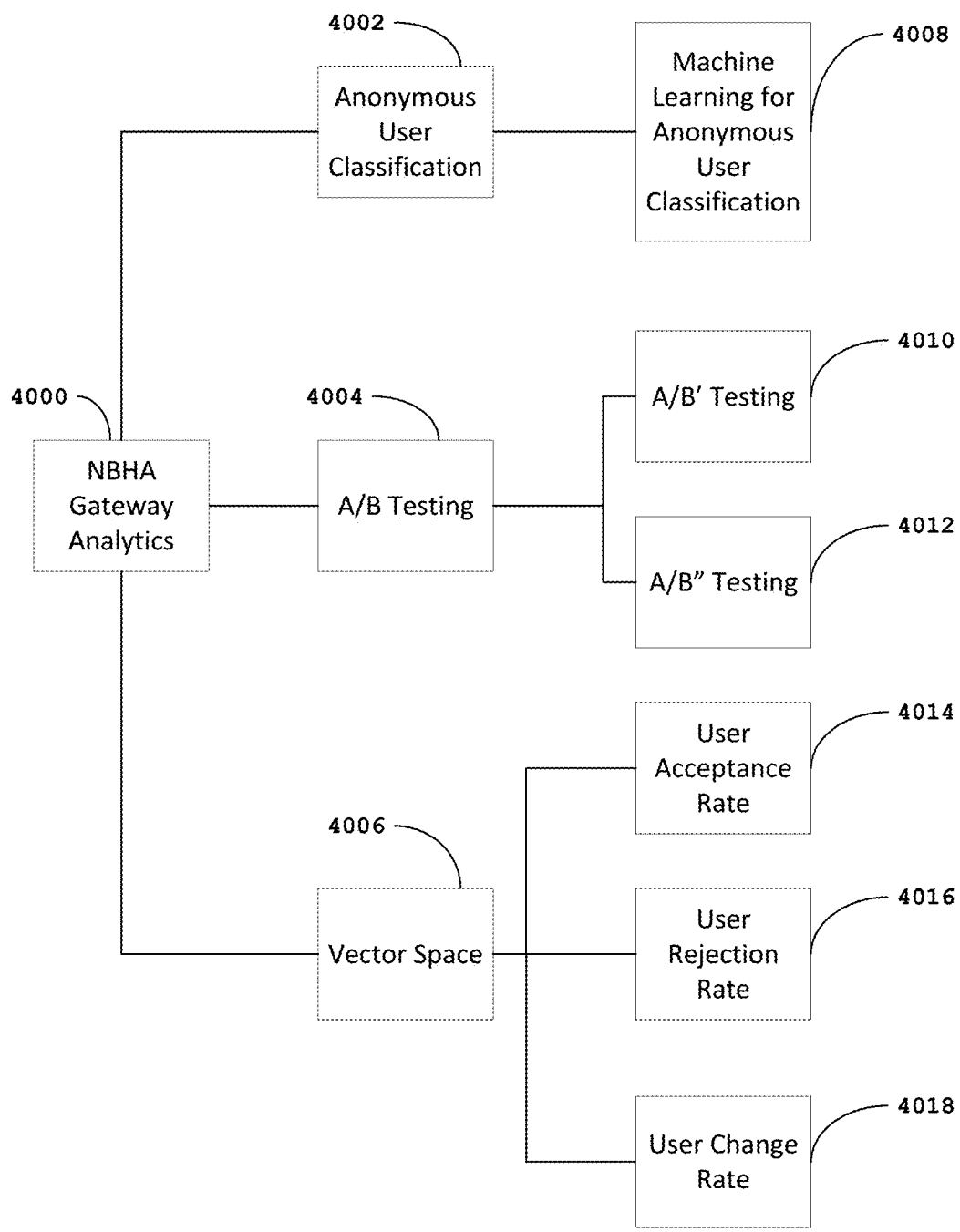
FIG. 40 shows illustrative gateway analytics.

Referring to FIG. 40, there is shown illustrative gateway analytics. FIG. 40 illustrates the analytics 4000 that include anonymous user classification 4002, A/B testing 4004, and vector space 4006. The anonymous user classification includes a machine learning module for anonymous user classification 4008. A/B testing for the general population analytics is performed through an A/B' testing module 4010. Additionally, A/B Testing for user classification is performed through A/B" testing module 4012. The vector space 4006 includes user acceptance rate 4014, user rejection rate 4016, and user change rate 4018.

Figure 41:
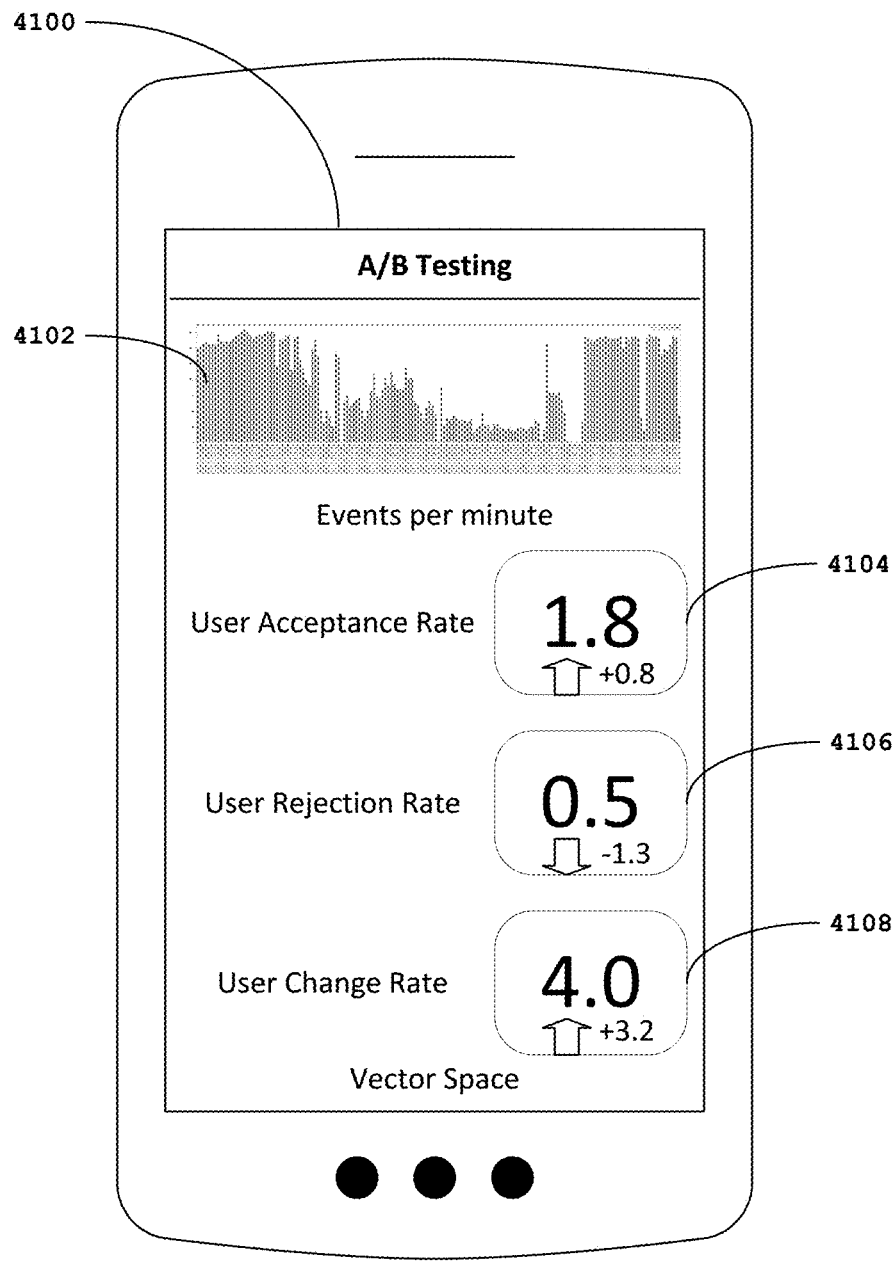
FIG. 41 shows a Graphical User Interface (GUI) for A/B Testing.

Referring to FIG. 41, there is shown an embodiment of a Graphical User Interface (GUI) for A/B Testing. The A/B testing 4100 includes events per minute 4102 and an illustrative vector space for user acceptance rate 4104, user rejection rate 4106, and user change rate 4108. The frequency of the vector space is computed over a period, including per minute, hourly, daily, weekly, monthly, or yearly.

By way of example, the A/B testing results are deemed as important corporate trade secrets visible on a smartphone device that are continuously being authenticated using the SIG Protocol as described above.

Figure 42:
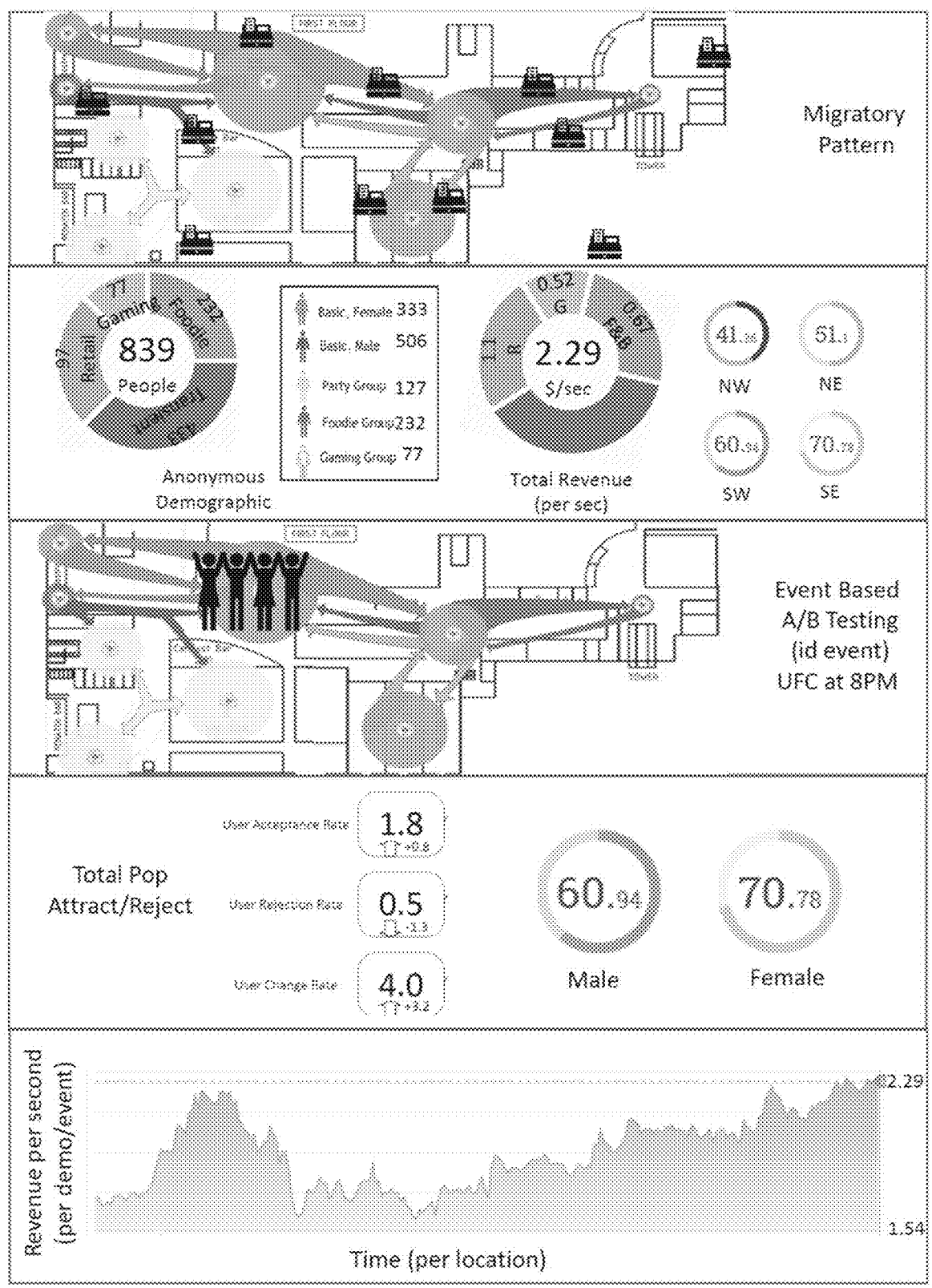
FIG. 42 shows an illustrative NBHA gateway telemetry dashboard.

Referring to FIG. 42, there is shown an illustrative dashboard. In the top portion of the dashboard, a migratory pattern for a different casino demographics is presented. Below, the migratory pattern is a numerical description of the total number of people associated with each demographic profile. The anonymous patron tracking solution is compared to a financial velocity, which is defined as dollars generated per unit time in a local area and a global area. The third level of the dashboard presents an event time and an event location for the event based A/B testing described above. The attraction (or acceptance as shown in FIG. 42) and rejection is shown in the fourth level. Finally, a total revenue generated per second for a particular area is plotted over time to determine the profitability of different areas within an illustrative casino property.

The systems and methods presented above may integrate with biometric solutions, cameras, and one-time authentication systems and methods. The systems and methods presented above may be integrated with camera based technologies. Note, that cameras cannot see through walls and, typically, require sufficient light to capture quality images. Cameras are also easily detectable. System integration with the NBHA systems enables NBHA gateways to secure specific areas and monitor these spaces for RF leakage from wireless devices that can be easily hidden.

By way of example and not of limitation, NBHA gateways having RGB camera functionality may capture RF emissions from the various smartphones in the secure area and identify RF emissions from unauthorized client devices and authorized client devices. For example, an unauthorized smartphone may be identified, and an associated timestamp may be collected. The timestamp may then be used to identify images of the unauthorized users. Biometric images of the registered users may be accessed to exclude these authenticated users from the RGB camera image(s) having the timestamp associated with the unauthorized smartphone device. The remaining camera images identify the face(s) of the unauthorized user(s). The images of the unauthorized users are then communicated to security personnel so they can locate the unauthorized users and remove them from the secure area.

It is to be understood that the detailed description of illustrative embodiments is provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A network based hyperlocal authentication system that continuously secures communications, the system comprising:

a gateway establishing a secure broadband communications channel with a remote network server, wherein the gateway receives one or more authentication credentials from the remote network server, wherein the gateway includes a gateway short-range wireless transmitter;

the gateway short-range wireless transmitter transmits the authentication credentials to a wireless client device having a client short-range wireless receiver;

a client device application, corresponding to the wireless client device, receives the authentication credentials from the gateway;

the client device application registers and authenticates using the authentication credentials to authenticate to the remote network server;

the client device application requests an exclusive local key from the remote network server;

the remote network server generates the exclusive local key for the wireless client device and transmits the exclusive local key to the gateway;

the gateway transmits the exclusive local key to the client device application with the gateway short-range wireless transmitter;

the client device application, having the exclusive local key, requests a cryptographic material from the remote network server, and the client device application receives the cryptographic material from the remote network server; and the client device application encrypts and decrypts communications to the remote network server with a shared secret that includes the exclusive local key received from the gateway and the cryptographic material received from the remote network server.

2. The network based hyperlocal authentication system of claim 1 wherein the gateway further includes a scanner that detects one or more client device identifiers and a signal strength for each client device identifier.

3. The network based hyperlocal authentication system of claim 1 further comprising a message broker associated with the remote network server, wherein the message broker communicates with a plurality of gateways and a plurality of wireless client devices.

4. The network based hyperlocal authentication system of claim 1 wherein the short-range wireless transmitter and short-range wireless receiver include a Bluetooth transceiver.

5. The network based hyperlocal authentication system of claim 1 further comprising a data file that is accessible to the client device application when the client device application transmits the shared secret to the remote network server; and the data file being inaccessible to the client device application when the shared secret is not transmitted to the remote network server.

6. The network based hyperlocal authentication system of claim 1 further comprising a secure communication channel that is secured by the client device application when the client device application transmits the shared secret to the remote network server; and the communication channel security being compromised when the client device application is not able to transmit the shared secret to the remote network server.

7. The network based hyperlocal authentication system of claim 1 wherein the gateway is associated with an automobile and the client device application is associated with a user's wireless client device, further comprising:

a secure communication channel that is secured by the client device application when the client device application transmits the shared secret to the remote network server; and the communication channel security being compromised when the client device application is not able to transmit the shared secret to the remote network server.

8. A network based hyperlocal authentication system that continuously authenticates and performs cryptographic operations to secure communications between a wireless client device and a remote network server, the system comprising:

a message broker associated with the remote network server, wherein the message broker communicates with a plurality of gateways and a plurality of wireless client devices;

the plurality of gateways, in which each gateway establishes a secure broadband communications channel with a remote network server, wherein each gateway receives one or more authentication credentials from the remote network server;

each gateway having a short-range wireless transmitter that transmits the unique authentication credentials to each wireless client device having short-range wireless receiver;

each gateway further includes a scanner that detects one or more client device identifiers and a signal strength for each client device identifier;

each of the wireless client devices executes a client device application, which receives the authentication credentials from the gateway;

each client device application registers and authenticates using the authentication credentials to authenticate to the remote network server;

each client device application requests an exclusive local key from the remote network server;

the remote network server generates the exclusive local key for each client device and transmits each exclusive local key to the gateway transmitting the authentication credentials;

the gateway transmits each exclusive local key to each client device application with the gateway short-range wireless transmitter;

each client device application, having the associated exclusive local key, requests a cryptographic material from the remote network server, and each client device application receives the cryptographic material from the remote network server; and each client device application encrypts and decrypts communications to the remote network server with a shared secret that includes the exclusive local key received from the gateway and the cryptographic material received from the remote network server.

9. The network based hyperlocal authentication system of claim 8 wherein the short-range wireless transmitter and short-range wireless receiver include a Bluetooth transceiver.

10. The network based hyperlocal authentication system of claim 8 further comprising a data file that is accessible to the client device application when the client device application transmits the shared secret to the remote network server; and the data file being inaccessible to the client device application when the shared secret is not transmitted to the remote network server.

11. The network based hyperlocal authentication system of claim 8 further comprising a secure communication channel that is secured by the client device application when the client device application transmits the shared secret to the remote network server; and the communication channel security being compromised when the client device application is not able to transmit the shared secret to the remote network server.

12. The network based hyperlocal authentication system of claim 8 wherein the gateway is associated with an automobile and the client device application is associated with a user's wireless client device, further comprising:

a secure communication channel that is secured by the client device application when the client device application transmits the shared secret to the remote network server; and the communication channel security being compromised when the client device application is not able to transmit the shared secret to the remote network server.

13. A network based hyperlocal authentication method that continuously authenticates and performs cryptographic operations to secure communications between a wireless client device and a remote network server, the method comprising: establishing a secure broadband communications channel between a gateway and the remote network server, wherein the gateway receives one or more authentication credentials from the remote network server; transmitting, with the gateway having a short-range wireless transmitter, the authentication credentials to the wireless client device having a short-range wireless receiver; receiving, with a client device application corresponding to the wireless client device, the authentication credentials from the gateway; challenging, with the client device application, the authentication credentials to the remote network server; requesting, with the client device application, an exclusive local key from the remote network server; generating, with the remote network server, the exclusive local key for the wireless client device and transmitting the exclusive local key to the gateway; transmitting, with the gateway, the exclusive local key to the client device application with the gateway short-range wireless transmitter; requesting, with the client device application having the exclusive local key, a cryptographic material from the remote network server, and the client device application receiving the cryptographic material from the remote network server; encrypting, with the client device application, communications to the network server with a shared secret that includes the exclusive local key received from the gateway and the cryptographic material received from the remote network server; decrypting, with the client device application, communications to the remote network server with the shared secret that includes the exclusive local key received from the gateway and the cryptographic material received from the remote network server.

14. The network based hyperlocal authentication method of claim 13 wherein the gateway further includes a scanner that detects one or more client device identifiers and a signal strength for each client device identifier.

15. The network based hyperlocal authentication method of claim 13 wherein the remote network server includes a database that stores encrypted contact tracing data in a dynamically encrypted database for anonymity.

16. The network based hyperlocal authentication method of claim 13 wherein the short-range wireless transmitter and short-range wireless receiver include a Bluetooth transceiver.

17. The network based hyperlocal authentication method of claim 13 wherein the remote network server is communicatively coupled to each gateway with at least one of a Wide Area Network (WAN) or Local Area Network (LAN).

18. The network based hyperlocal authentication method of claim 13 further comprising accessing a data file with the client device application when the client device application transmits the shared secret to the remote network server; and the data file being inaccessible to the client device application when the shared secret is not transmitted to the remote network server.

19. The network based hyperlocal authentication method of claim 13 further comprising securing a communication channel when the client device application transmits the shared secret to the remote network server; and the communication channel security being compromised when the client device application is not able to transmit the shared secret to the remote network server.

20. The network based hyperlocal authentication method of claim 13 wherein the gateway is associated with an automobile and the client device application is associated with a user's wireless client device, further comprising:

securing a communication channel when the client device application transmits the shared secret to the remote network server; and the communication channel security being compromised when the client device application is not able to transmit the shared secret to the remote network server.

* * * * *